US011281369B2

(12) United States Patent
Aghaei et al.

(10) Patent No.: US 11,281,369 B2
(45) Date of Patent: Mar. 22, 2022

(54) TOUCH-BASED INTERACTIVE LEARNING ENVIRONMENT

(71) Applicant: Apple Inc., Cupertino, CA (US)

(72) Inventors: Behzad Aghaei, Cupertino, CA (US); Timothy V. Isted, Los Gatos, CA (US); Maxwell O. Drukman, San Francisco, CA (US); Donald M. Firlik, Cupertino, CA (US); Christopher A. Lattner, San Jose, CA (US); Kenneth S. Orr, Cupertino, CA (US); Andreas Wendker, Mountain View, CA (US)

( * ) Notice: Subject to any disclaimer, the term of this patent is extended or adjusted under 35 U.S.C. 154(b) by 0 days.

(21) Appl. No.: 16/351,353

(22) Filed: Mar. 12, 2019

(65) Prior Publication Data

US 2019/0205028 A1 Jul. 4, 2019

Related U.S. Application Data

(62) Division of application No. 15/173,515, filed on Jun. 3, 2016, now Pat. No. 10,268,366.
(Continued)

(51) Int. Cl.
*G06F 3/048* (2013.01)
*G06F 3/04883* (2022.01)
(Continued)

(52) U.S. Cl.
CPC ...... *G06F 3/04883* (2013.01); *A63F 13/2145* (2014.09); *A63F 13/537* (2014.09);
(Continued)

(58) Field of Classification Search
CPC .... G06F 3/048; G06F 3/04883; G06F 3/0484; G06F 3/04842; G06F 3/04847;
(Continued)

(56) References Cited

U.S. PATENT DOCUMENTS 5,060,154 A 10/1991 Duncan, IV
5,421,730 A 6/1995 Lasker, III et al.
(Continued)

OTHER PUBLICATIONS

Lewis, "Using Clones in a Target Game Programming in Scratch 2.0" Published on Jul. 25, 2013 by YouTube.com, https://youtube/qJPHr99smlc?t=3m12s, 3 pages.
(Continued)

*Primary Examiner* — Mahelet Shiberou
(74) *Attorney, Agent, or Firm* — Kilpatrick, Townsend & Stockton

(57) ABSTRACT

In an example method, a user interface is presented by a device on a touch sensitive surface of the device. The device presents a keyboard image on a touch sensitive surface of the device. The device then receives a first touch input selecting a key of the keyboard image and responsive to receiving the first touch input, displays a primary character associated with the selected key. While maintenance of physical contact is detected by the touch sensitive surface, the device receives a touch gesture starting at the key of the keyboard image and continuing in a diagonal direction along a face of the key. Responsive to receiving the touch gesture, the device displays an alternative character associated with the selected key.

20 Claims, 50 Drawing Sheets

Related U.S. Application Data

(60) Provisional application No. 62/171,992, filed on Jun. 5, 2015.

(51) Int. Cl.

| | |
|---|---|
| G06F 3/04886 | (2022.01) |
| G09B 5/02 | (2006.01) |
| G09B 19/00 | (2006.01) |
| G06F 3/0484 | (2022.01) |
| G06F 8/30 | (2018.01) |
| G06F 8/38 | (2018.01) |
| G06F 9/445 | (2018.01) |
| G06F 3/04847 | (2022.01) |
| A63F 13/2145 | (2014.01) |
| G06F 40/274 | (2020.01) |
| A63F 13/537 | (2014.01) |
| A63F 13/63 | (2014.01) |
| G06F 3/04842 | (2022.01) |
| G06F 8/33 | (2018.01) |

(52) U.S. Cl.
CPC ............ *A63F 13/63* (2014.09); *G06F 3/0484* (2013.01); *G06F 3/04842* (2013.01); *G06F 3/04847* (2013.01); *G06F 3/04886* (2013.01); *G06F 8/31* (2013.01); *G06F 8/38* (2013.01); *G06F 9/445* (2013.01); *G06F 40/274* (2020.01); *G09B 5/02* (2013.01); *G09B 19/00* (2013.01); *G09B 19/0053* (2013.01); *A63F 2300/209* (2013.01); *G06F 8/33* (2013.01)

(58) Field of Classification Search
CPC ...... G06F 3/04886; G06F 40/274; G06F 8/31; G06F 8/38; G06F 8/33; G06F 9/445; A63F 13/2145; A63F 13/537; A63F 13/63; A63F 2300/209; G09B 19/00; G09B 19/0053
See application file for complete search history.

(56) References Cited

U.S. PATENT DOCUMENTS

| | | | |
|---|---|---|---|
| 5,602,982 A | 2/1997 | Judd | |
| 5,606,674 A | 2/1997 | Root | |
| 5,704,029 A | 12/1997 | Wright, Jr. | |
| 5,805,911 A | 9/1998 | Miller | |
| 6,008,799 A | 12/1999 | Van Kleeck | |
| 6,367,068 B1 | 4/2002 | Vaidyanathan et al. | |
| 6,377,965 B1 | 4/2002 | Hachamovitch | |
| 6,751,603 B1 | 6/2004 | Bauer | |
| 6,931,385 B1 | 8/2005 | Halstead et al. | |
| 7,117,450 B1 | 10/2006 | Chaudhri | |
| 7,322,023 B2 | 1/2008 | Shulman | |
| 7,712,053 B2 | 5/2010 | Bradford | |
| 7,877,738 B2 | 1/2011 | Goldstein et al. | |
| 7,921,361 B2 | 4/2011 | Gunn | |
| 7,956,847 B2 | 6/2011 | Christie | |
| 8,333,660 B2 | 12/2012 | Uno | |
| 8,335,993 B1 * | 12/2012 | Tan ..................... | G06F 3/04886 715/773 |
| 8,356,277 B1 | 1/2013 | Bank et al. | |
| 8,423,982 B2 | 4/2013 | Goldstein et al. | |
| 8,558,800 B2 * | 10/2013 | Kang .................... | G06F 3/0236 345/173 |
| RE45,694 E * | 9/2015 | Shin ..................... | G06F 3/04886 |
| 9,189,211 B1 | 11/2015 | Nicholson | |
| 9,338,594 B1 | 5/2016 | Onnen et al. | |
| 9,383,973 B2 | 7/2016 | Villar | |
| 9,436,437 B2 | 9/2016 | Jacobsen | |
| 9,448,772 B2 | 9/2016 | Gulwani | |
| 9,619,043 B2 * | 4/2017 | Pate ..................... | G06F 3/0489 |
| 10,108,335 B2 | 10/2018 | Isted et al. | |
| 10,268,366 B2 | 4/2019 | Aghgaei et al. | |
| 10,430,072 B2 | 10/2019 | Aghgaei et al. | |
| 10,929,008 B2 | 2/2021 | Isted et al. | |
| 10,942,645 B2 | 3/2021 | Aghaei et al. | |
| 2002/0095658 A1 | 7/2002 | Shulman et al. | |
| 2003/0014239 A1 * | 1/2003 | Ichbiah ................ | G06F 3/0488 704/7 |
| 2003/0131337 A1 | 7/2003 | Perumainar | |
| 2005/0079478 A1 | 4/2005 | McKeagney et al. | |
| 2005/0125773 A1 | 6/2005 | Hawley et al. | |
| 2006/0036996 A1 | 2/2006 | Low | |
| 2006/0036997 A1 | 2/2006 | Low | |
| 2007/0139382 A1 * | 6/2007 | Kotipalli ............. | G06F 3/04886 345/168 |
| 2007/0180429 A1 | 8/2007 | Gogh | |
| 2007/0220478 A1 | 9/2007 | Wyganowski | |
| 2007/0296704 A1 | 12/2007 | Park | |
| 2008/0040656 A1 | 2/2008 | Lammel | |
| 2008/0119238 A1 | 5/2008 | Kwon | |
| 2008/0263063 A1 | 10/2008 | Sceppa | |
| 2009/0179780 A1 * | 7/2009 | Tambe .................. | G06F 3/0237 341/23 |
| 2009/0254880 A1 | 10/2009 | Gryko et al. | |
| 2009/0267901 A1 * | 10/2009 | Park ..................... | G06F 3/0234 345/172 |
| 2009/0280456 A1 | 11/2009 | Ishaq et al. | |
| 2010/0070448 A1 | 3/2010 | Omoigui | |
| 2010/0153880 A1 | 6/2010 | Dinn | |
| 2010/0242017 A1 | 9/2010 | Stenberg | |
| 2010/0287525 A1 | 11/2010 | Wagner | |
| 2010/0288756 A1 | 11/2010 | Uchiyama | |
| 2010/0289756 A1 | 11/2010 | Anzures et al. | |
| 2011/0063231 A1 | 3/2011 | Jakobs | |
| 2011/0107309 A1 | 5/2011 | Baron | |
| 2011/0246943 A1 | 10/2011 | Fujibayashi | |
| 2011/0302518 A1 * | 12/2011 | Zhang .................. | G06F 3/0234 715/773 |
| 2012/0040326 A1 | 2/2012 | Larson-Rutter et al. | |
| 2012/0092267 A1 | 4/2012 | Haug | |
| 2012/0144345 A1 | 6/2012 | Munter | |
| 2013/0006957 A1 | 1/2013 | Huang | |
| 2013/0007700 A1 | 1/2013 | Villar | |
| 2013/0024844 A1 | 1/2013 | Bienkowski et al. | |
| 2013/0076642 A1 | 3/2013 | Rampson et al. | |
| 2013/0085754 A1 | 4/2013 | Cohen | |
| 2013/0097551 A1 | 4/2013 | Hogan | |
| 2014/0009427 A1 | 1/2014 | Kang | |
| 2014/0113257 A1 | 4/2014 | Spiridonov | |
| 2014/0123049 A1 * | 5/2014 | Buxton ................ | G06F 3/04886 715/773 |
| 2014/0170606 A1 | 6/2014 | Chong et al. | |
| 2014/0173563 A1 | 6/2014 | Dias et al. | |
| 2014/0245226 A1 | 8/2014 | Butscher | |
| 2014/0282375 A1 | 9/2014 | Gulwani | |
| 2014/0313135 A1 | 10/2014 | Pisters | |
| 2014/0359574 A1 | 12/2014 | Beckwith | |
| 2015/0044653 A1 | 2/2015 | Levine | |
| 2015/0066539 A1 | 3/2015 | Sheffer et al. | |
| 2015/0106786 A1 | 4/2015 | Ossher | |
| 2015/0185981 A1 | 7/2015 | Mesguich Havilio | |
| 2015/0268826 A1 | 9/2015 | Langholz | |
| 2015/0331673 A1 | 11/2015 | Mihalcea | |
| 2015/0347354 A1 | 12/2015 | Hatcher | |
| 2015/0364060 A1 | 12/2015 | Gupta | |
| 2015/0370690 A1 | 12/2015 | Rodmell | |
| 2016/0062745 A1 | 3/2016 | Rao | |
| 2016/0070441 A1 | 3/2016 | Paek et al. | |
| 2016/0070468 A1 * | 3/2016 | Alfut ................... | G06F 3/04886 715/773 |
| 2016/0078101 A1 | 3/2016 | Somaiya | |
| 2016/0093232 A1 | 3/2016 | Chong et al. | |
| 2016/0093301 A1 | 3/2016 | Bellegarda | |
| 2016/0103607 A1 | 4/2016 | Chen | |
| 2016/0111018 A1 | 4/2016 | Sousa | |
| 2016/0132368 A1 | 5/2016 | Nano | |
| 2016/0196042 A1 | 7/2016 | Laute | |
| 2016/0274773 A1 | 9/2016 | Koga | |
| 2016/0354694 A1 | 12/2016 | Isted et al. | |
| 2016/0357431 A1 | 12/2016 | Aghaei | |

(56) References Cited

U.S. PATENT DOCUMENTS

| | | | |
|---|---|---|---|
| 2016/0357432 A1 | 12/2016 | Aghaei et al. | |
| 2016/0358505 A1 | 12/2016 | Isted et al. | |
| 2017/0124142 A1 | 5/2017 | Becker et al. | |
| 2018/0101163 A1 | 4/2018 | Raue et al. | |
| 2018/0165254 A1 | 6/2018 | Talati | |
| 2018/0349108 A1 | 12/2018 | Brebner | |
| 2019/0114075 A1* | 4/2019 | Jung | G06F 3/04815 |
| 2019/0205028 A1 | 7/2019 | Aghaei et al. | |
| 2020/0004414 A1 | 2/2020 | Aghaei et al. | |

OTHER PUBLICATIONS

Eagle et al., "Wu's Castle: Teaching Arrays and Loops in a Game," ITiCSE '08 Proceedings of the 13th annual conference on Innovation and technology in computer science education, Jun. 2008, 5 pages.

Swadling, "Elm compiler running on my iPad," retrieved from the Internet URL<https://twitter.com/mxswd/status/375386337844551681>, Sep. 4, 2013, 2 pages.

Karel, "Karel (programming language)," Wikipedia [online], retrieved from the Internet URL<http://en.wikipedia.org/wiki/Karel (programming language)>, May 2015, 3 pages.

Mavis Beacon, "Mavis Beacon Teaches Typing", Version 15, Enhanced Educator Version User's Guide, 2001, 92 pgs.

U.S. Appl. No. 15/173,533, "Non Final Office Action", dated Nov. 27, 2019, 11 pgs.

Non-Final Office Action for U.S. Appl. No. 15/173,533, dated Apr. 6, 2018, 11 pages.

Final Office Action for U.S. Appl. No. 15/173,573, dated Mar. 30, 2018, 10 pages.

Non-Final Office Action for U.S. Appl. No. 15/173,553, dated Jul. 13, 2018, 10 pages.

Non-Final Office Action for U.S. Appl. No. 15/173,515, dated May 22, 2018, 13 pages.

"Notice of Allowance," dated Dec. 10, 2018 in U.S. Appl. No. 15/173,515. 16 pages.

"Final Office Action," dated Apr. 18, 2019 in U.S. Appl. No. 15/173,533. 21 pages.

"Final Office Action," dated Jul. 15, 2020 in U.S. Appl. No. 15/173,533. 23 pages.

"Notice of Allowance," dated Oct. 28, 2020 in U.S. Appl. No. 15/173,533. 5 pages.

"Notice of Allowance," dated Jul. 31, 2019 in U.S. Appl. No. 15/173,553. 8 pages.

"Non-Final Office Action," dated Oct. 11, 2017 in U.S. Appl. No. 15/173,573. 11 pages.

"Notice of Allowance," dated Jul. 31, 2018 in U.S. Appl. Application No. 15/173,573. 5 pages.

"Notice of Allowance," dated Nov. 4, 2020 in U.S. Appl. No. 16/539,389. 7 pages.

* cited by examiner

FIG. 2A

Carrier 6:13 PM 95%
Playgrounds Undo Moon Rover: Moving Hand in ?

Overcoming Obstacles

Artificial Intelligence is a big deal in space - and now we know enough to program a simple AI!

To start off, we will teach our rover to move towards its goal. To start, choose your own moon color, rover style, and the number of stars in the sky.

setMoonColor ( )
let roverImage =
setRover(roverImage)
numberOfStars(20)

Next, let's make our rover move forward to reach the rocket. In programming terms, we want the rover to keep moving forward as long as its position hasn't reached the goal's position. Add a while loop and the moveForward( ) function to get the code below:

while roverPosition != goalPosition {
    moveForward( )
}

When you're done, hit Play to watch it work!

write your code here

When the rocket ship signals Earth, move on to jumping over obstacles.

Overcoming Obstacles

Artificial Intelligence is a big deal in space - and now we know enough to program a simple AI!

To start off, we will teach our rover to move towards its goal. To start, choose your own moon color, rover style, and the number of stars in the sky.

setMoonColor (⊞)
let roverImage = 🖼
setRover(roverImage)
numberOfStars (30)

220

Next, let's make our rover move forward to reach the rocket. In programming terms, we want the rover to keep moving forward as long as its position hasn't reached the goal's position. Add a while loop and the moveForward( ) function to get the code below:

```
while roverPosition != goalPosition {
    moveForward( )
}
```

When you're done, hit Play to watch it work!

while  condition  {
    looped code
}

510

When the rocket ship signals Earth, move on to jumping obstacleAhead ( )   gameStart ( )   Comparison expression

Moon Rover: Moving

Overcoming Obstacles

Artificial Intelligence is a big deal in space - and now we know enough to program a simple AI!

To start off, we will teach our rover to move towards its goal. To start, choose your own moon color, rover style, and the number of stars in the sky.

setMoonColor (⊞)
let roverImage = 🖼
setRover(roverImage)
numberOfStars (30)

Next, let's make our rover move forward to reach the rocket. In programming terms, we want the rover to keep moving forward as long as its position hasn't reached the goal's position. Add a while loop and the moveForward( ) function to get the code below:

while roverPosition != goalPosition {
    moveForward( )
}

When you're done, hit Play to watch it work!

while roverPosition != goalPosition {
    looped code
}

When the rocket ship signals Earth, move on to jumping moveForward( )  518  jumpForward( )  if...  while...

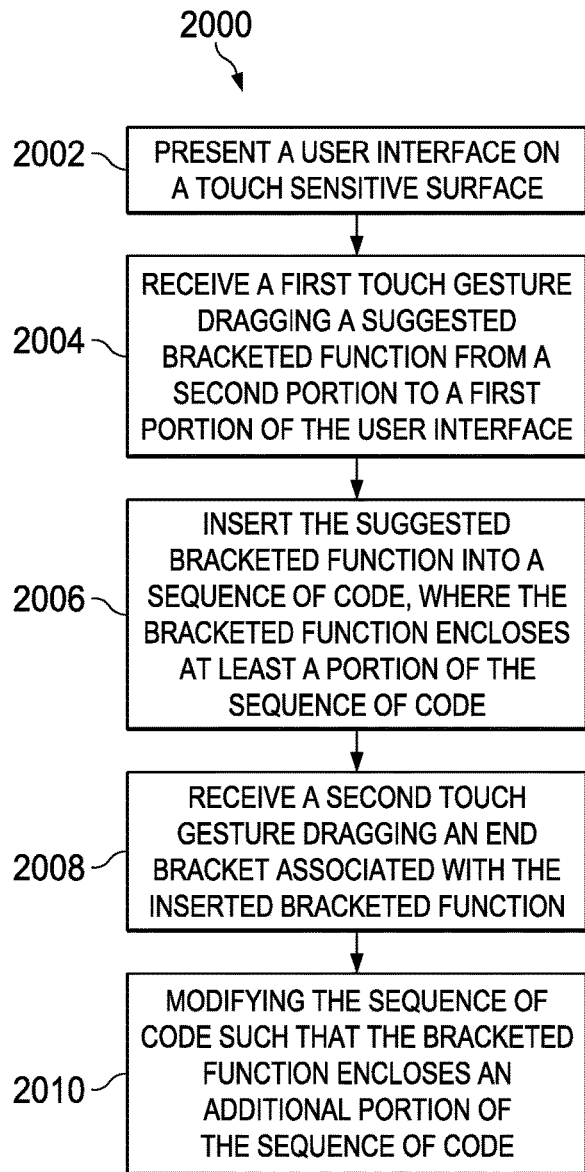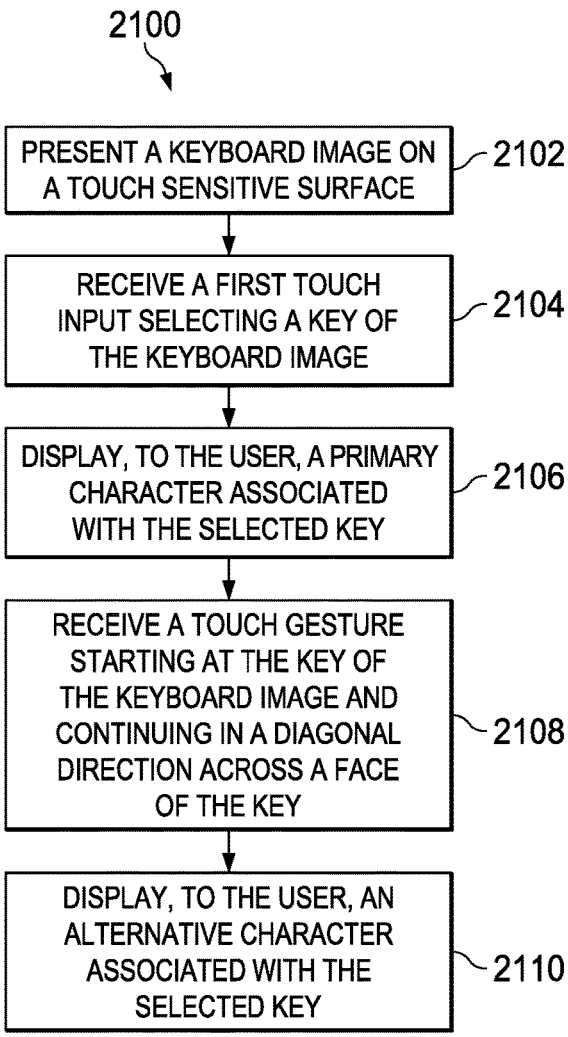
FIG. 20
FIG. 21

TOUCH-BASED INTERACTIVE LEARNING ENVIRONMENT

CROSS REFERENCE TO RELATED APPLICATIONS

This application is a divisional of U.S. patent application Ser. No. 15/173,515, filed Jun. 3, 2016, which claims priority to U.S. Provisional Patent Application No. 62/171,992, filed on Jun. 5, 2015, the entire contents of which are hereby incorporated by reference.

TECHNICAL FIELD

The disclosure relates generally to computer-based, interactive learning environments.

BACKGROUND

Learning how to program a computer to perform tasks from a textbook can be challenging for many students. To learn how to code quickly, a student will often write code, compile the code, and execute the code on a computer to see if they get the expected results. If the results are unexpected, the student will "debug" the code, compile the code, and execute the compiled code on the computer again. This learning process can be frustrating to students due to the delay between writing, compiling, and executing the code and seeing the results. Most students would prefer to see the results in near real-time in an interactive learning environment. The computers that students are learning to program come in variety of form factors, including smartphones, smart watches and tablet computers. The use of touched-based tablet computers in classrooms is becoming ubiquitous due to their portable nature and ease of use. Writing programming constructs using touch gestures presents a new challenge to designers of user interfaces for touch-based computers.

SUMMARY

Systems, methods, devices and non-transitory, computer-readable mediums are disclosed for a touch-based, interactive learning environment for software programming.

In general, in an aspect, a method includes presenting, by a device, a user interface on a touch sensitive surface of the device. The method further includes receiving, by the device, a first touch input selecting a numeral presented in the user interface, and responsive to receiving the first touch input, presenting a numeric keypad interface and a display element. The method further includes receiving, by the device, a second touch input selecting the display element, and responsive to receiving the second touch input, presenting a rotary interface including the display element. The method further includes, while the user is maintaining physical contact with the touch sensitive surface, receiving, by the device, a rotational touch gesture dragging the display element about the rotary interface, and responsive to receiving the rotational touch gesture, modifying the numeral.

Implementations of this aspect can include one or more of the following features.

In some implementations, modifying the numeral can include determining, by the device, an angular distance that the display element has been dragged about an origin, and modifying, by the device, the numeral based on the angular distance.

In some implementations, the method can further include determining, by the device, that the rotational touch gesture is a clockwise gesture, and increasing the numeral based on the determination.

In some implementations, the method can further include determining, by the device, that the rotational touch gesture is a counter-clockwise gesture, and decreasing, by the device, the numeral based on the determination.

In some implementations, the rotary interface can include a first circle and a second circle, where the first circle and second circle are concentric. The method can further include, while the user is maintaining physical contact with the touch sensitive screen, receiving, by the device, a second rotational touch gesture dragging the display element along the first circle, and responsive to receiving the second rotational touch gesture, modifying a first place value of the numeral. The method can further include, while the user is maintaining physical contact with the touch sensitive screen, receiving, by the device, a third rotational touch gesture dragging the display element along the second circle, and responsive to receiving the third rotational touch gesture, modifying a second place value of the numeral.

In some implementations, the numeral can correspond to an angular value, where the angular position of the display element on the rotary interface corresponds to the angular value.

In some implementations, the numeral can be modified based on a speed of the rotational touch gesture about the rotary interface.

In general, in another aspect, a method includes presenting, by a device, a keyboard image on a touch sensitive surface of the device. The method further includes receiving, by the device, a first touch input selecting a key of the keyboard image, and responsive to receiving the first touch input, displaying, to the user, a primary character associated with the selected key. The method further includes, while the user is maintaining physical contact with the touch sensitive surface, receiving, by the device, a touch gesture starting at the key of the keyboard image and continuing in a diagonal direction along a face of the key, and responsive to receiving the touch gesture, displaying, to the user, an alternative character associated with the selected key.

Implementations of this aspect can include one or more of the following features.

In some implementations, the method can further include, subsequent to receiving the touch gesture, receiving, by the device, an indication that the user released physical contact with the touch sensitive surface, and responsive to receiving the indication, inserting the alternative character into a text input area.

In some implementations, the face of the key can include an indication of the primary character, and an indication of the secondary character. The indication of the secondary character can be diagonally above the indication of the primary character. The indication of the secondary character can be diagonally below the indication of the primary character. The touch gesture can start at the key and continue towards the indication of the secondary character on the face of the key. The touch gesture can start at the key and continue away from the indication of the secondary character on the face of the key.

In some implementations, the method can further include, while the user is maintaining physical contact with the touch surface, receiving, by the device, a second touch gesture starting at the key of the keyboard image and continuing in a second diagonal direction along a face of the key. The method can further include, responsive to receiving the second touch gesture, displaying, to the user, a second alternative character associated with the selected key. The method can further include, subsequent to receiving the second touch gesture, receiving, by the device, an indication that the user released physical contact with the touch sensitive surface, and responsive to receiving the indication, inserting the second alternative character into a text input area.

Other implementations are directed to systems, devices and non-transitory, computer-readable mediums. Particular implementations provide at least the following advantages. Computer programming students are provided a touch-based interactive learning environment where they can follow interactive lesson plans and experiment with writing code using touch gestures almost exclusively. The touch-based interactive learning environment allows students to use their touched-based mobile computers to learn computer programming, thus freeing the student from being physically present in the classroom and using a cumbersome desktop computer with a conventional hardware keyboard and mouse.

Details of one or more implementations are set forth in the accompanying drawings and the description below. Other features, aspects, and potential advantages will be apparent from the description and drawings, and from the claims.

DESCRIPTION OF DRAWINGS

FIGS. 2A-E illustrate a user interface for a touch-based, interactive learning environment for software programming.

FIGS. 5A-G illustrate another user interface for a touch-based, interactive learning environment for software programming.

FIGS. 15A-C illustrate an example user interface for filling an array.

FIGS. 17A and 17B illustrate an example user interface for modifying the size of an array.

FIG. 20 is a flow diagram of an example process for presenting and inserting suggested bracketed functions using a user interface.

FIG. 21 is a flow diagram of an example process for presenting and selecting characters using a virtual keyboard.

FIGS. 24A-C illustrate a universal content bar for suggesting one or more contextually-determined sequences of software code based on a user's inputs.

Like reference symbols in the various drawings indicate like elements.

DESCRIPTION

Overview

Figure 1:
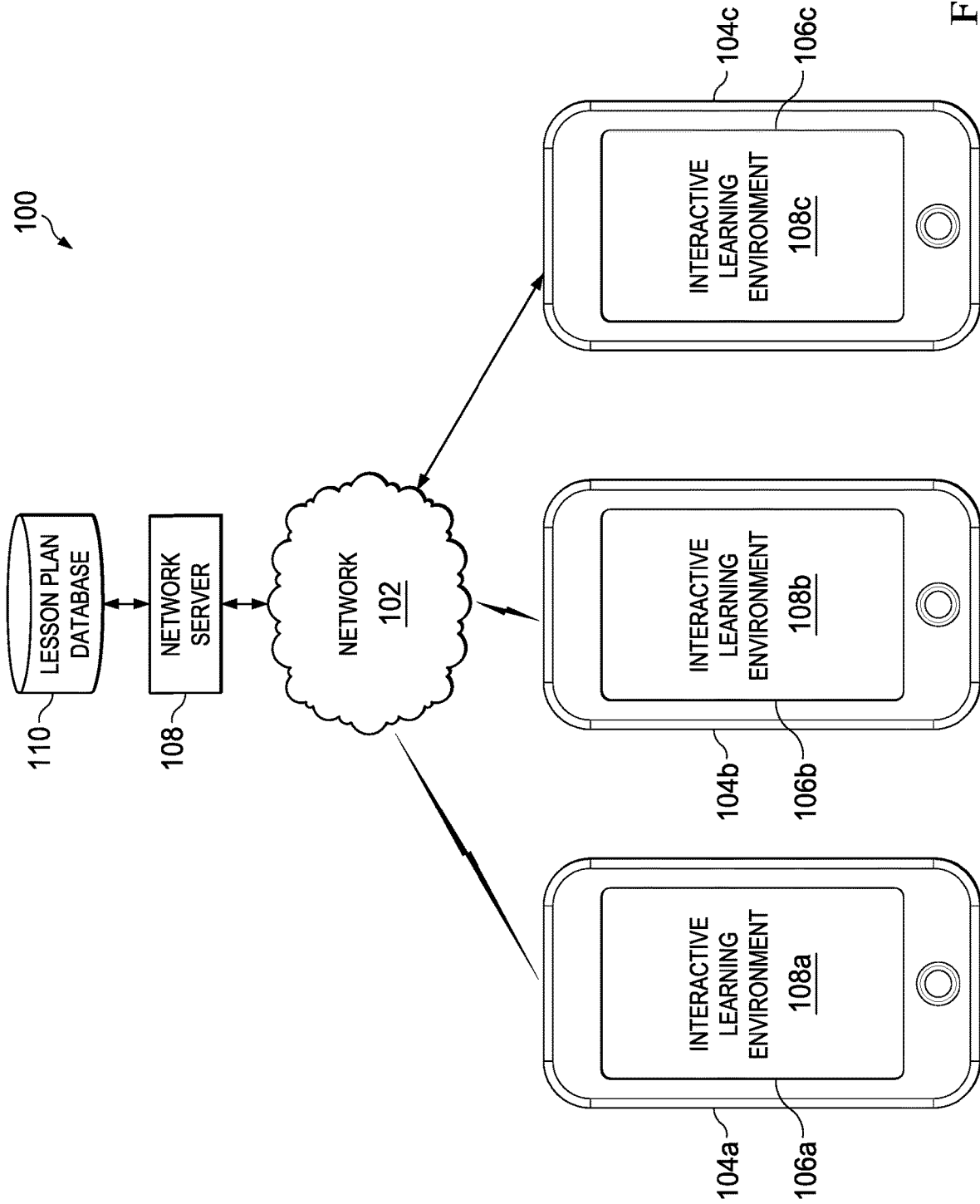
FIG. 1 is a block diagram of an example system for providing a touch-based, interactive learning environment for software programming.

FIG. 1 is a block diagram of an example system 100 for providing a touch-based, interactive learning environment for software programming. The system 100 includes a network 102 (e.g., the Internet, local area network (LAN)), several client devices 104a-c, each presenting a respective user interface 106a-c, a network server 108, and a lesson plan database 110.

In an example usage of the system 100, education lesson plans (e.g., instructional guides or support materials for one or more educational courses, activities, assignments, schoolwork, or homework) are stored on the lesson plan database 110. The network server 108 retrieves one or more lesson plans from the lesson plan database 110, and distributes the lesson plans to one or more client devices 104a-c via the network 102. Users (e.g., students and/or instructors) interact with the lesson plans by viewing and providing touch input and/or touch-based gestures in response to instructions presented by user interfaces 106a-c. Data regarding each user's progress through the lesson plan and his work product can be transmitted from the client devices 104a-c to the network server 108 for storage, such that each user can later review and/or resume the lesson plan, and such that the user's work can be evaluated by an instructor or an administrator.

In some cases, the client devices 104a-c can include a touch-sensitive input device (e.g., a touch-sensitive display screen or other touch-sensitive surface) that enables users to interact with the system 100 by touching and/or performing touch-based gestures on the client devices 104a-c. In some cases, the user interface 106a-c can be displayed on the touch-sensitive input device (e.g., displayed on the touch-sensitive display screen), such that a user can directly touch and/or perform touch-based gestures with respect to user interface 106a-c in an intuitive manner. In some cases, a user can touch a user interface 106a-c and/or perform touch-based gestures using one or more fingers, styluses, or combinations thereof.

In some cases, an education lesson plan can include educational materials presented using a software development tool, such as an integrated development environment (IDE). Example software development tools are disclosed in U.S. application Ser. No. 15/066,539, filed Mar. 10, 2016, the entirety of which is included herein by reference.

In some cases, education materials can be presented in a touch-based environment (e.g., a touch-based software development tool or IDE). As an example, FIG. 2A illustrates an example user interface 200 for a touch-based, interactive learning environment for software programming. The user interface 200 can present educational guides or other materials pertaining to a lesson plan. For example, as shown in FIG. 2A, the user interface 200 can present instructions guiding a user through a software programming lesson. In the example lesson shown, the user is learning how to impart motion or animate a rover vehicle and change various aspects of the moon environment, such as the type of rover vehicle, the color of the moon and the number of stars. In some cases, the user interface 200 can be presented as a part of the user interface 106a-c described with respect to FIG. 1.

The user interface 200 includes a menu bar 210, a code editing area 220, short form results area 225, a live view area 230, and a universal content bar 240.

The menu bar 210 displays one or more commands that are available to the user. A user can select one or more of these commands for execution (e.g., by tapping the portion of the menu bar 210 displaying the desired command). For example, as shown in FIG. 2A, the menu bar 210 can present a command 212a to reveal a list of interactive lesson plans (hereinafter also referred to as "playgrounds") for selection by the user. Each "playground" can present a different lesson plan to the user and each lesson plan can include one or more lessons. When the user selects command 212a, the user interface 200 exits from the current lesson and presents the user with a list of other available lessons. The menu bar 210 can present a command 212b to undo the last command, operation, or input by the user. The menu bar 210 can present a command 212c to "hand in" the user's work (e.g., by transmitting his work on the present assignment or lesson to an instructor). The menu bar 210 can present a command 212d to execute the software code shown in the present view (e.g., the software code shown in code editing area 220) such that he can preview the results of that executed software code in the live view area 230. The menu bar 210 can present a command 212e to share his current assignment with others (e.g., via an e-mail message sharing the source code or a recorded video of the work in progress), a command 212f to retrieve help or support information regarding the operation of the user interface 200, and a command 212g to move to the next lesson in the lesson plan or another "playground".

The code editing area 220 displays software code and other information associated with the present lesson plan. For example, as shown in FIG. 2A, the code editing area 220 can include a sequence of software code that includes various functions, sub-routines, variables, parameters, values, operators, syntax, and other programming constructs that collectively define a particular sequence of computer instructions. As shown in FIG. 2A, the code editing area 220 also can include one or more "comments" that provide the user with explanations, instructions, and/or other annotations regarding the software code. The software code shown in the code editing area 220 can be of any computer programming language (e.g., Objective-C, Swift, Java, C++, JavaScript, Perl, Python, and so forth).

The user can also edit the software code shown in the code editing area 220. For example, a user can input additional sequences of code, remove sequences of code, and/or modify sequences of code. As described in further detail below, in some cases, a user can modify the software code by tapping, touching, or performing touch-based gestures with respect to the user interface. In some cases, a user can also modify the software code by inputting commands into a "virtual" keyboard (e.g., a touch-based keyboard displayed on a touch-sensitive display screen).

In some cases, the software code shown in code editing area 220 can be a simplified or abridged version of an underlying sequence of software code. For example, in some cases, the software code shown in code editing area 220 can include only a portion of an underlying sequence of software code, while other portions of the underlying software code are hidden or otherwise unavailable to the user. This can be useful, for example, as selected sequences of software code can be displayed to a user to illustrate a particular concept, while not overwhelming the user with other sequences of software code that are unrelated or otherwise peripheral to the concept.

The live view area 230 displays in real-time the results of the executing software code shown in the code editing area 220. For example, when a user selects the command 212d, the software code shown in the code editing area 220 is compiled (e.g., translated from a programming language to a machine code), executed in real-time and the results of the executed software code are shown in the live view area 230. In some cases, if the code editing area 220 is showing an abridged or simplified version of an underlying sequence of software code, the underlying sequence of software code, in its entirety, can be compiled and executed, and the results can be shown in the live view area 230.

In some cases, the live view area 230 allows a user to see the results of modifications to the software code in real-time, greatly improving the learning experience. For example, a user can make a modification to the software code shown in the code editing area 220 (e.g., by inserting a new function), and then select the command 212d to see the result of that modification alongside the software code. In this manner, the user can make changes to the code, and then quickly and intuitively visualize the effect of those changes in real-time.

The universal content bar 240 displays suggested portions of software code that can be inserted into the code editing area 220 to complete a sequence of software code. In some cases, the universal content bar 240 can suggest one or more contextually-determined sequences of software code based on a user's inputs (e.g., characters or keystroke that were previously entered by the user) and the already-entered software code (e.g., the software code surrounding an insertion cursor on the code editing area 220). The user can select one or more of these suggested sequences of code by tapping on a particular selection or dragging a particular selection onto the code editing area 220 to insert the suggest sequence of code into the code editing area 220. In some cases, the universal content bar 240 can display one or more suggested sequences of code according to a list of suggestions that were created by an instructor. For example, an instructor can design a lesson plan involving a particular set of functions, and the universal content bar 240 can suggest those particular functions for insertion into the code editing area 220 based on the context.

The short form results area 225 is located between the code editing area 220 and the live view area 230 and is used to display, in "short form" the results of the user's code editing in the code editing area 220. In the example shown, the results of the user selecting a type of rover vehicle and selecting the color of the moon is shown. In some cases, the live view area 230 can show the results of equations, mathematical operations, or other commands shown in the code editing area 220. For example, if the code editing area 220 includes the command "x=1+2", the live view area 230 can display "x=3" beside the command.

As described above, in some cases, a user can modify the software code displayed in the code editing area 220 by tapping, touching, or performing touch-based gestures with respect to the user interface. In some cases, a user can tap a code construct that he wishes to modify. Code constructs are portions of text, numerals, symbols, and/or other elements that can be combined to form a sequence of software code. Code constructs can include, for example, a function, sub-routine, variable, parameter, value operator, syntax, or other programming construct. In response, the user interface 200 presents the user with options for modifying the selected code construct by, for example, presenting alternative functions, sub-routines, variables, parameters, values operators, or syntax to replace the selected code construct. The user can select one of the options to modify the selected code construct. Thus, a user can modify the software code without using a physical or virtual keyboard or mouse.

Figure 2B:
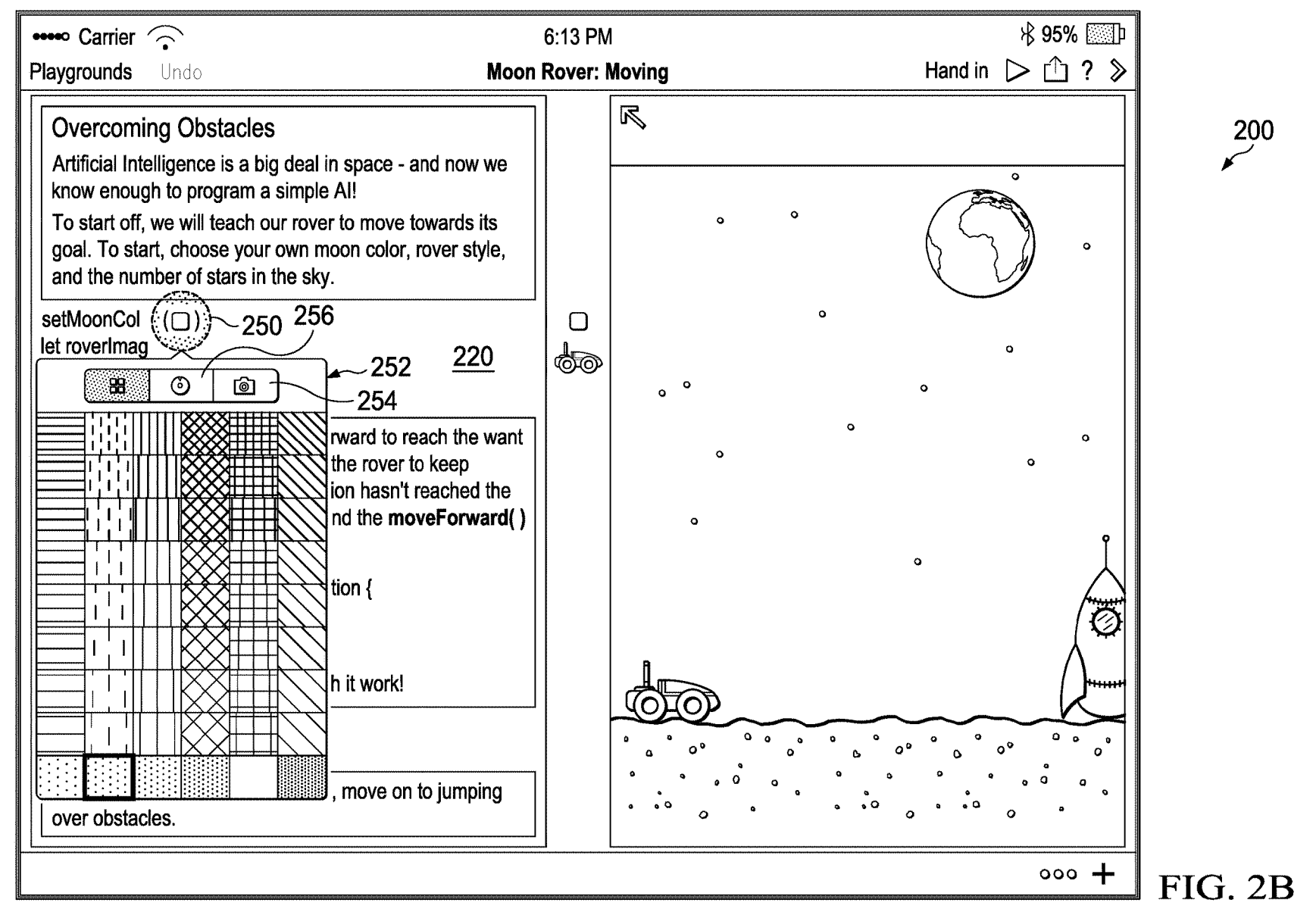

For example, as shown in FIG. 2B, a user can tap a portion of the code editing area 220 (e.g., a variable) displaying a color value (e.g., an integer value) defined in the software code (illustrated as the dotted circle 250). In response, the user interface 200 presents a color selection element 252 (e.g., a color "picker") that offers alternative color values to replace the selected color value. The user can select one of these alternative color values (e.g., by tapping on the desired color value) to replace the color value in the software code. As shown in FIG. 2B, in some cases, the color selection element 252 can present several alternative colors values in a grid or matrix, and allow the user to select from among the presented color values. In some cases, the user can instead opt to select an image file by selecting an icon 254 and invoking a photo library. The user can select a photo and then select a color from the selected photo as a replacement color value. In some cases, the user can instead opt to define his own color value using a color wheel by selecting an icon 256 and invoking a color wheel element, and a replacement color value can be determined based on the color value defined by the color wheel.

Figure 2C:
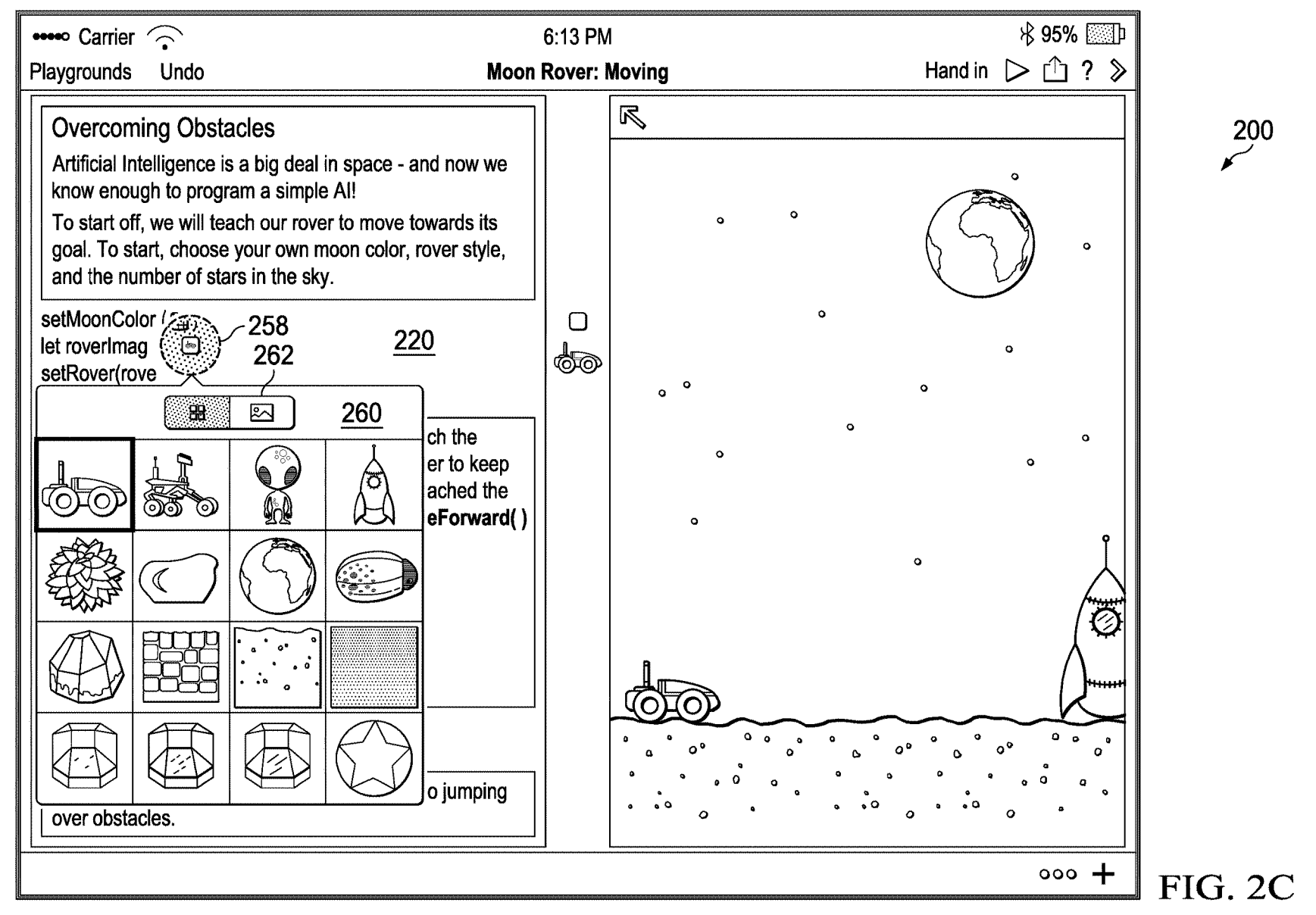

As another example, as shown in FIG. 2C, a user can tap a portion of the code editing area 220 displaying an image resource referenced in the software code (illustrated as the dotted circle 258). In response, the user interface 200 presents an image selection element 260 (e.g., an image "picker") that offers alternative images to replace the selected image for the rover vehicle. The user can select one of these alternative images by tapping on the desired image to replace the image of the rover vehicle in the software code. As shown in FIG. 2C, in some cases, the image selection element 260 can present several alternative images in a grid or matrix, and allow the user to select from among the presented images. In some cases, the user can instead opt to provide his own image file by selecting an icon 262 and invoking a file selection dialog, and a replacement image can be determined based on the selected image file.

Figure 2D:
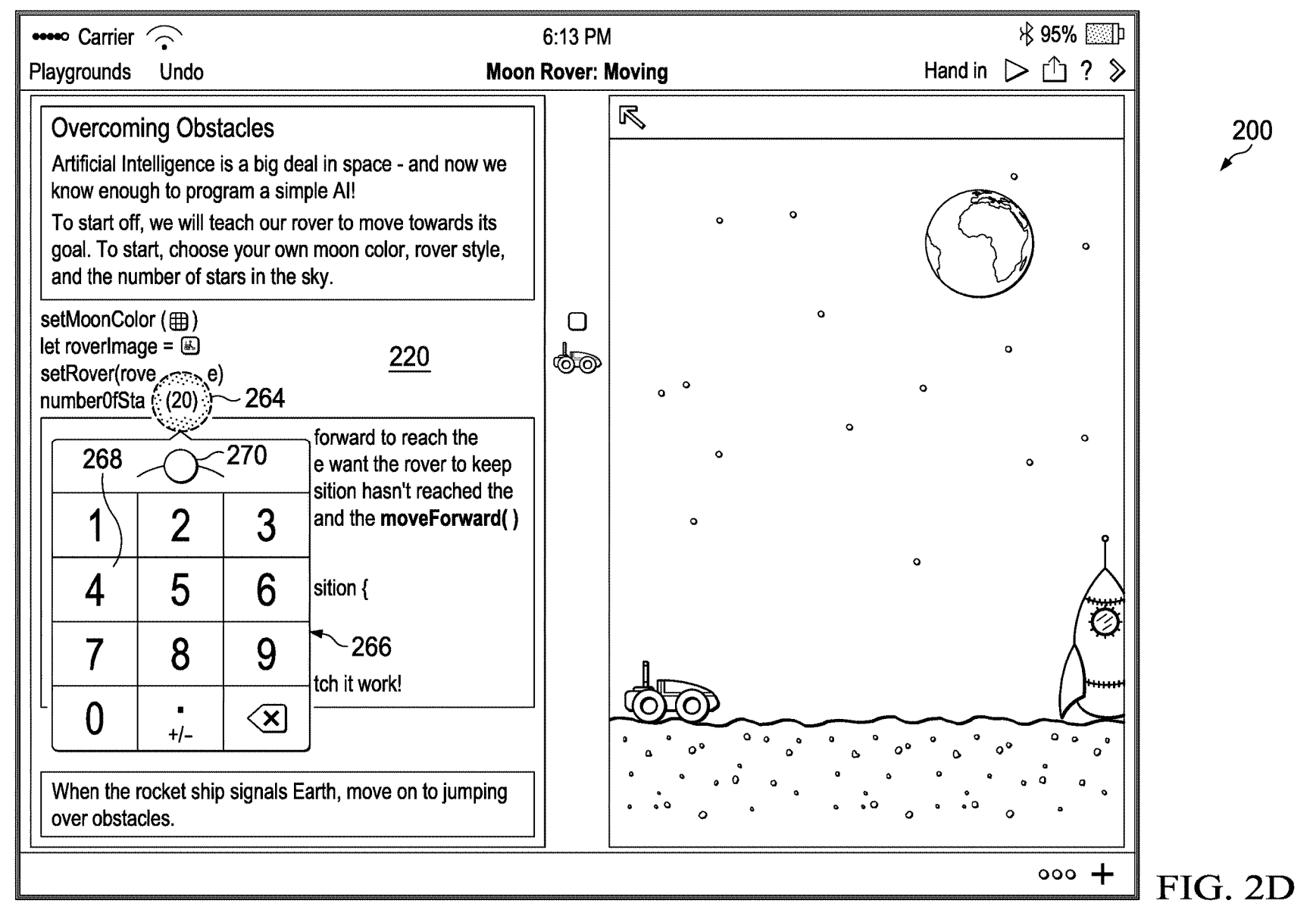

As another example, as shown in FIG. 2D, a user can tap a portion of the code editing area 220 displaying a numerical value (a variable) defined in the software code for the number of stars in the moon environment (illustrated as the dotted circle 264). In response, the user interface 200 presents a numeral selection element 266. As shown in FIG. 2D, the numeral selection element 266 can include a keypad element 268, and a control element 270 (e.g., a display element depicting a button, knob, or handle). The user can input a replacement numerical value using the keypad element 268 by tapping a sequence of digits and other characters using the keypad element 268 to replace the selected numerical value in the software code. The user can confirm his selection by tapping outside of the numeral selection element 266.

In some cases, the keypad element 268 can represent two or more characters and/or commands using a single key. For example, a single key can represent a main character or command, and one or more alternative characters or commands. A user can select from among these characters and/or commands by pressing and holding the key, and performing a directional gesture (e.g., a sliding gesture along the touch-sensitive surface). The user then releases his touch to confirm the selection.

Figure 3A:
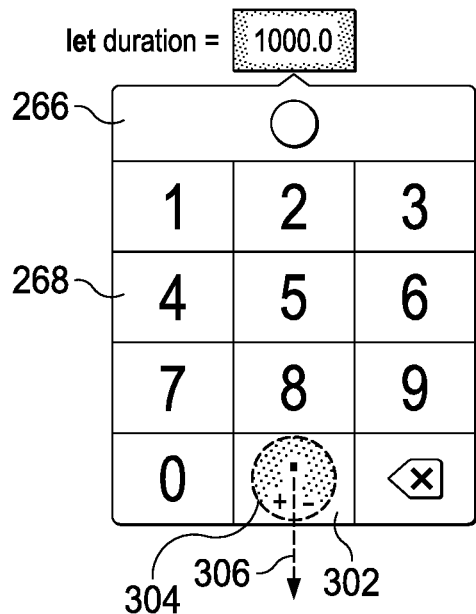
FIGS. 3A and 3B illustrate an example keypad element for inputting numbers.
Figure 3B:
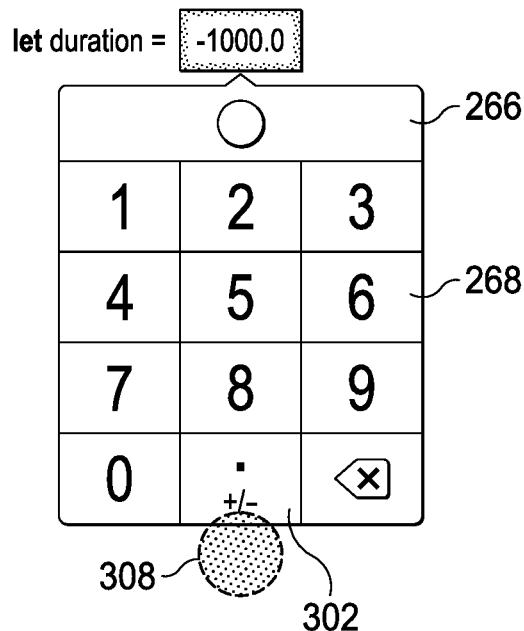

For example, as shown in FIG. 3A, the keypad element 268 can include a key 302 that represents a period character (i.e., "."), and a positive/negative toggle command. The user can select the period character by tapping on the key 302. Alternatively, the user can toggle the selected numerical from positive to negative (or vice versa) by pressing and holding the key 302 (illustrated as the dotted circle 304), and while maintaining his touch, performing a sliding or swiping gesture in a downward direction (illustrated as the dotted arrow 306). As shown in FIG. 3B, at the end of the gesture (illustrated as the dotted circle 308), the user interface indicates that the numerical value has been toggled from a positive value to a negative value. The user can then release his touch to confirm the selection. The user can toggle the selected numerical value back to a positive value by again pressing and holding the key 302, and while maintaining his touch, performing a sliding or swiping gesture in a downward direction. At the end of the gesture, the user interface indicates that the numerical value has been toggled from a negative value to a positive value. Although a downward direction is depicted in FIGS. 3A and 3B, this is merely an illustrative example. In practice, any direction can be used (e.g., upward, left, right, diagonal, and so forth).

Figure 2E:
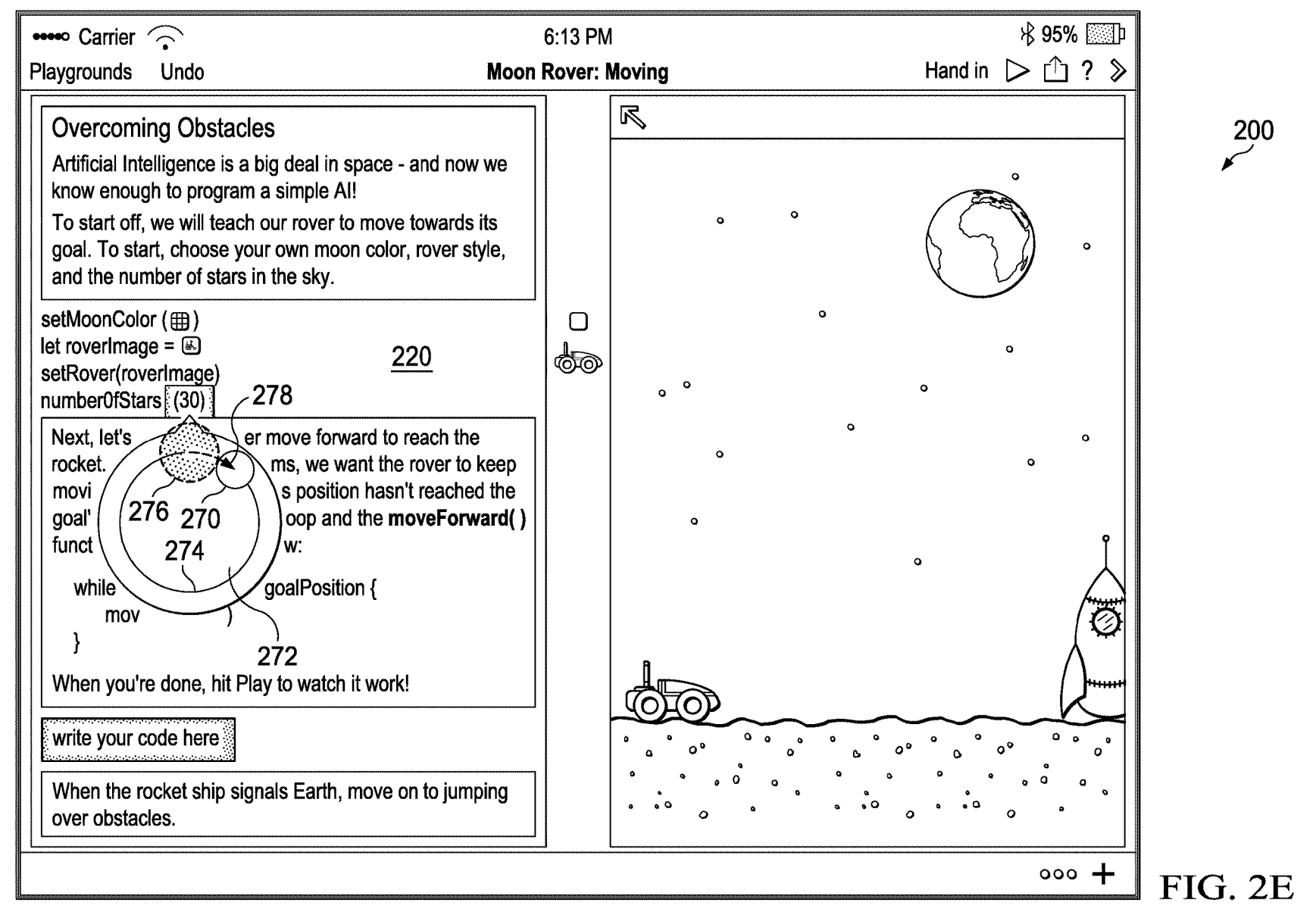

Referring now to FIG. 2E, the user can also modify the numerical value by pressing and holding the control element 270. In response, the user interface 200 replaces the keypad element 268 with a rotary element 272. While maintaining contact with the control element 270, the user can perform a rotational gesture with respect to a circle 274 of the rotary element 272 to simulate "dragging" the control element 270 around the circle 274 (illustrated as the dotted circle 276 and the dotted arrow 278). The selected numerical value changes according to the angular distance that the user drags the control element 270 around the circle 274 with respect to the origin (i.e., the center) of the circle. For example, if the user drags the control element 270 a relatively small angular distance around the circle 274, the numerical value can change by a relatively small amount. If the user instead drags the control element 270 a relatively large angular distance around the circle, the numerical value can change by a relatively large amount.

In some cases, the change in the numerical value can be proportionate to the angular distance that the control element 270 is dragged around the circle. For example, for each degree that the control element 270 is dragged by the user, the numerical value can change by a constant amount (e.g., 1 degree of movement results in 1 unit of change in the numerical value). In some cases, the change in the numerical value can depend on the speed at which the control element 270 is dragged. For example, when the control element 270 is dragged relatively slowly by the user (e.g., 1 degree per unit of time), the numerical value can change at a relatively slow rate (e.g., 1 degree of movement results in 1 unit of change in the numerical value). But, when the control element 270 is dragged relatively quickly by the user (e.g., 10 degrees per unit of time), the numerical value can change at a relatively faster rate (e.g., 1 degree of movement results in 10 units of change in the numerical value). In some cases, the relationship between the speed at which the control element 270 is dragged and the rate of change of the numerical value (e.g., the amount that the numerical value increases or decrease relative to the angular distance that the control element 270 is dragged) can be proportional or exponential, or defined any other relationship. This can be useful, for example, in providing the user with a control element that changes in "sensitivity" depending on the speed at which it is dragged.

In some cases, the user can drag the control element 270 one or more revolutions around the circle 274 to modify the selected numerical value by larger and larger amounts. The user can confirm his selection by releasing his hold on the control element 270.

In some cases, the user can drag the control element 270 around the circle 274 in a clockwise direction to increase the selected numerical value, and drag the control element 270 around the circle 274 in a counter-clockwise direction to decrease the selected numerical value.

In some cases, the selected numerical value can be an angular value (e.g., a particular angle expressed in degrees or radians). In these cases, the angular position of the control element 270 on the circle 274 can correspond with the angular value. For example, if the angular value is 0°, the control element 270 can be displayed at the top of the circle 274. To change the angular value to 90°, the user can drag the control element 270 clockwise to the right of the circle 274. As another example, to change the angular value to −90°, the user can drag the control element 270 counter-clockwise to the left of the circle 274. In this manner, the angular value can be intuitively presented and changed.

Figure 4A:
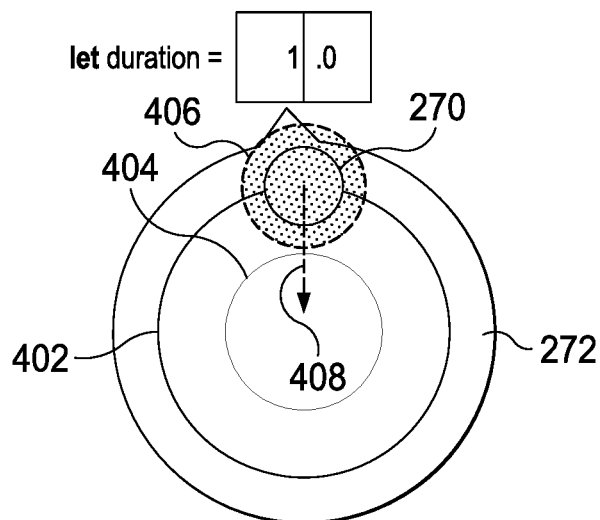
FIGS. 4A and 4B illustrate an example rotary element having two concentric circles.
Figure 4B:
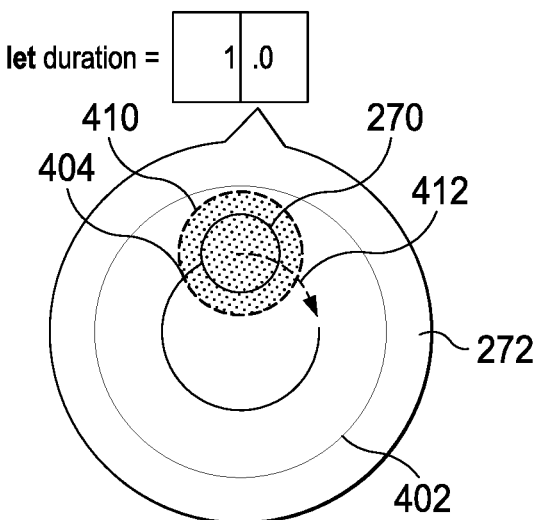

In some cases, the rotary element 272 can include more than one circle, and the user can drag the control element 270 around each of the circles to increase or decrease the selected numerical value by different increments. For example, as shown in FIGS. 4A and 4B, a rotary element 272 can include two concentric circles 402 and 404. The user can drag the control element 270 around the outer circle 402 to increase or decrease a first place value of the selected number (e.g., by increasing or decreasing a tens place of the number). The user can also drag the control element 270 onto the inner circle 404 (illustrated as the dotted circle 406 and dotted arrow 408). The user can then drag the control element 270 around the inner circle 404 (illustrated as the dotted circle 410 and the dotted arrow 412) to increase or increase a second place value of the selected number (e.g., by increasing or decreasing a tens place of the number). In this manner, the rotary element 272 can provide the user with multiple circles, such that the selected numerical value can change specific place values of the selected number.

Although two circles 402 and 404 are shown, this is merely an illustrative example. In practice, a rotary element can include any number of circles, each corresponding to a different place value of a value (e.g., ones, tens, hundred, thousands, and so forth, and tenths, hundredths, thousandths, and so forth).

In some cases, a rotary element 272 can include multiple concentric circles, and the user can drag the control element 270 around different circles to increase or decrease the selected numerical value by different increments. For example, a user can drag the control element 270 around a first circle to perform a relatively coarse adjustment (e.g., such that a particular angular distance corresponds to a relatively large change in the selected numerical value). The user can drag the control element 270 around a second circle to perform a relatively fine adjustment (e.g., such that the same angular distance corresponds to a relatively small change in the selected numerical value). In this manner, the rotary element 272 can allow the user to vary how coarsely or finely he wishes to adjust the selected numerical value.

In some cases, a rotary element 272 can include a place value selector element (e.g., a button or icon) that allows the user to select which place value he wishes to change. For example, the user can drag a control element around a circle to increase or decrease a units place value of a number. To change the tens place value of a number, the user can toggle a "tens" place value selector element (e.g., by select a "tens" button or icon), and dragging the control element around the circle. In this manner, the same control element and circle can be used to change different place values of a number, depending on which place value has been selected by a user.

As described above, the user interface 200 can include a universal content bar 240 that displays suggested sequences of software code that can be inserted into a code editing area 220 to complete a sequence of software code inserted by the user. The user can select one or more of these suggested sequences of code from the universal content bar 240 by tapping on a particular selection or dragging a particular selection onto the code editing area 220 to insert the suggest sequence of code into the code editing area 220.

Figure 5A:
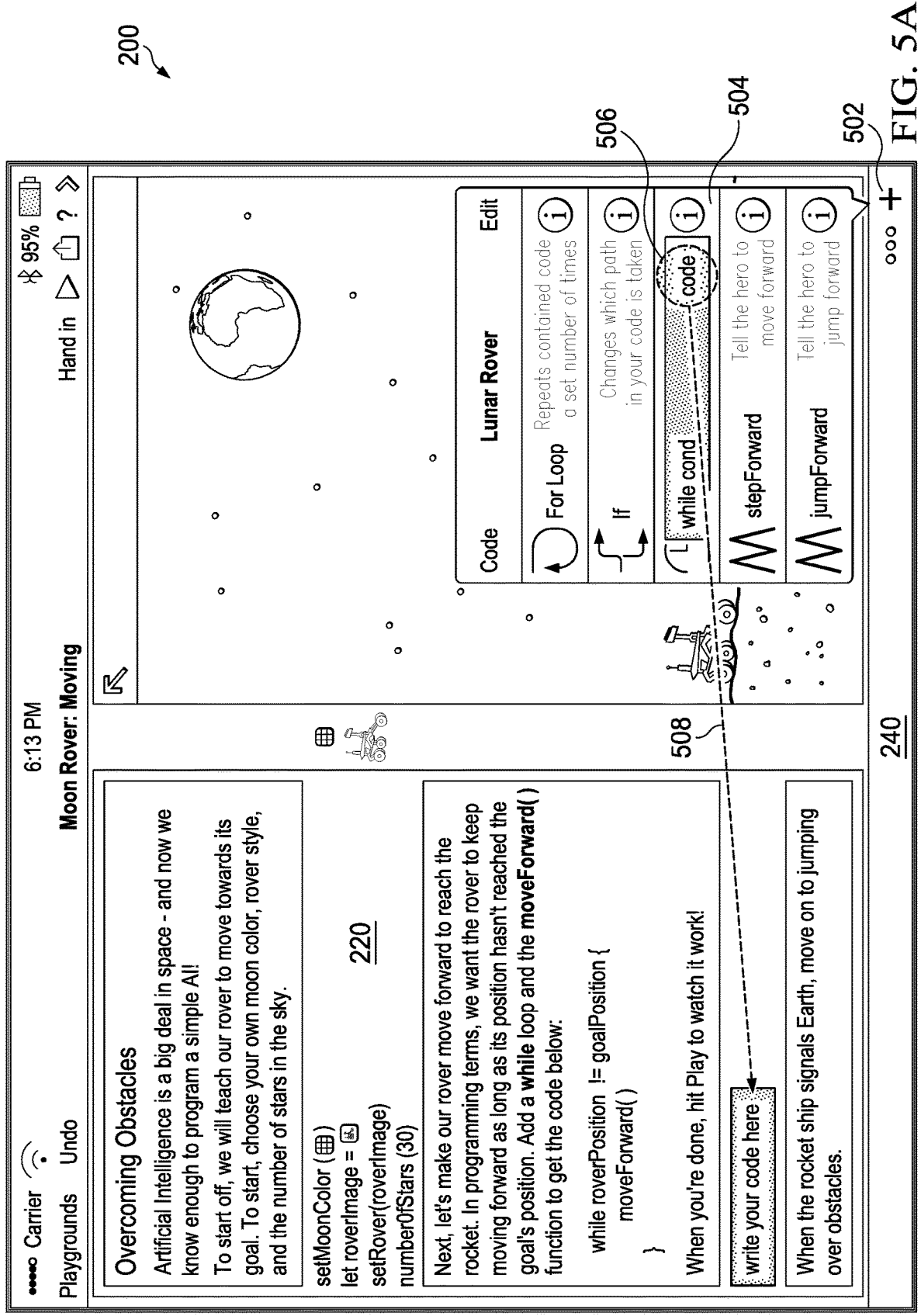

As an example, as shown in FIG. 5A, a user can select an icon 502 to invoke a list 504 of suggested sequences of software code. Some examples of suggested sequences of software code include but are not limited to, "while loops," "for loops," "do loops," conditional statements such as "if-then-else" statements and any other known programming construct. In some cases, the list 504 can include can one or more suggestions that were created by an instructor. For example, an instructor can design a lesson plan involving a particular set of functions, and the list 504 can suggest those particular functions for insertion into the code editing area 220. In some implementations, the user can select a suggested sequence of software code by touching and holding one of the sequence of software code (illustrated as the dotted circle 506), and dragging the sequence of software code to the code editing area 220 (illustrated as the dotted arrow 508). As shown in FIG. 5B, when the user releases his touch, the selected sequence of software code is inserted into the code editing area 220. In other implementations, the selected sequence is automatically inserted at the correct location in the code editing area 220.

Figure 5C:
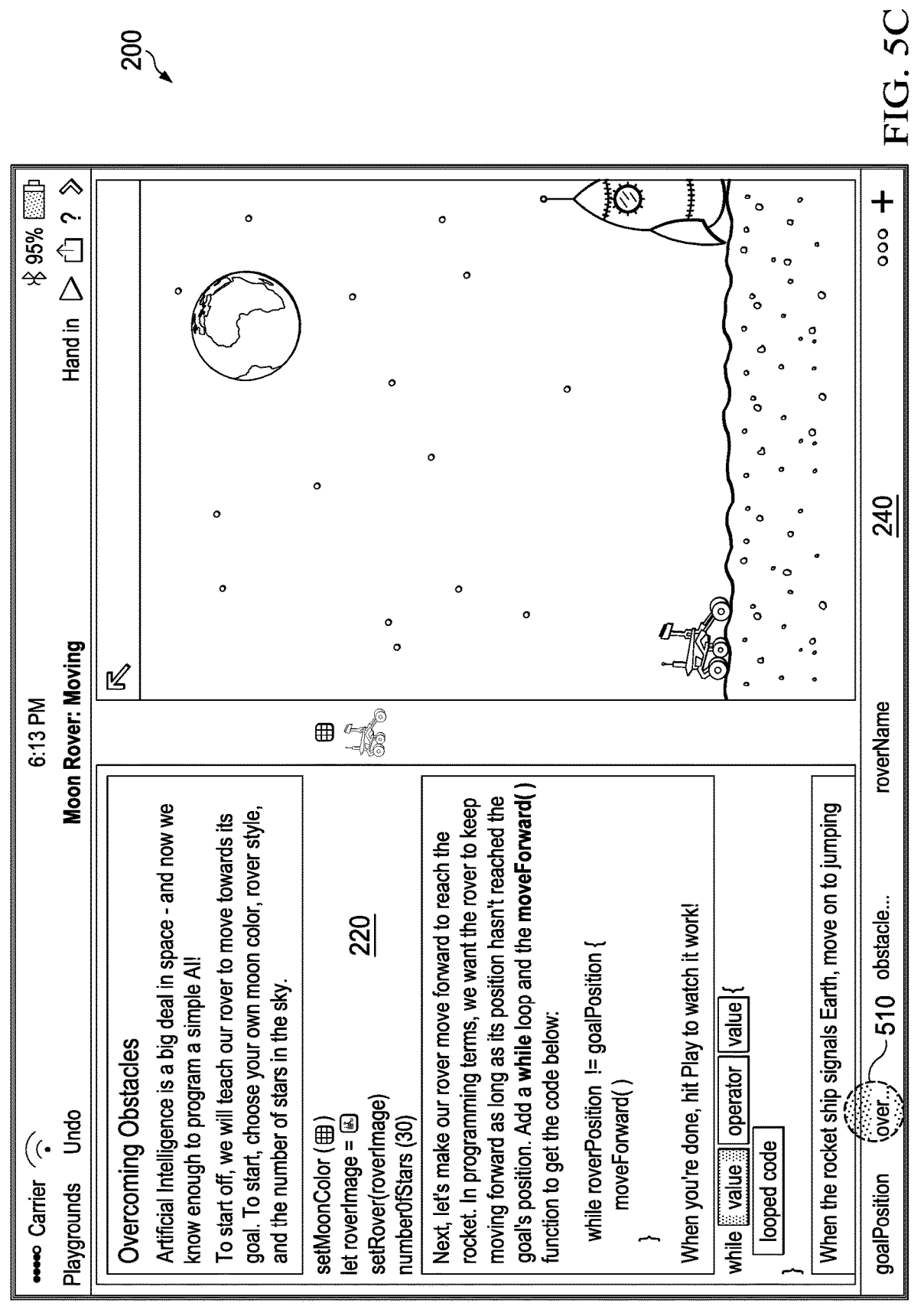

As described above, the universal content bar 240 also can suggest one or more contextually-determined sequences of software code based on a user's inputs (e.g., characters or keystroke that were previously entered by the user) and previously-entered software code (e.g., the software code surrounding an insertion cursor on the code editing area 220). For example, as shown in FIG. 5B, the universal content bar 240 can display several suggested sequences of software code based on the recently inserted sequence of code. These suggested sequences of software code can be segments of code that logically can be used to complete or add to the recently inserted sequence of code. For instance, if the recently inserted sequence of code is a particular function, the universal content bar 240 can suggest one or more variables, parameters, operators, or other constructions that logically can be inserted to add to the particular function. As an example, as shown in FIG. 5B, the user had recently inserted a "while" loop. In response, the universal content bar 240 can suggest functions that can be inserted and/or suggest that a conditional statement be inserted. As shown in FIG. 5C, the user can select one of the suggestions (illustrated as the dotted circle 508) to inserted a conditional statement.

In some cases, the universal content bar 240 can provide suggestions according in a hierarchical or "stemmed" manner. For example, the universal content bar 240 can initially provide several broad suggestions, and based on a user's selection, offer successively narrower or more specific suggestions until a suitably specific selection is made. For instance, in some cases, multiple functions, variables, parameters, or other programming constructs can each have a name that shares a common sequence of characters (e.g., a common "stem"). The universal content bar 240 can present several different stems, and upon selection of a particular stem, present one or more suggested programming constructs having the selected stem. This can be useful, for example, as it allows a user to navigate through a potentially large number of selections without being overwhelmed.

As an example, as shown in FIG. 5C, a "while" function and a conditional statement were recently inserted into the sequence of code shown in the code editing area 220. In response, the universal content bar 240 suggests one or more variables or functions (e.g., functions that return values when executed) that can be used as the first value in the conditional statement associated with the "while" function. As there are several possible variables or functions that can be used in this situation, the universal content bar 240 also displays several stems (illustrated as a sequence of characters followed by an ellipsis), each representing a different sequence of characters in a variable or function name. As shown in FIG. 5C, the user can select one of the suggested stems (illustrated as the dotted circle 510) to insert the selected stem into the code editing area 220.

Figure 5D:
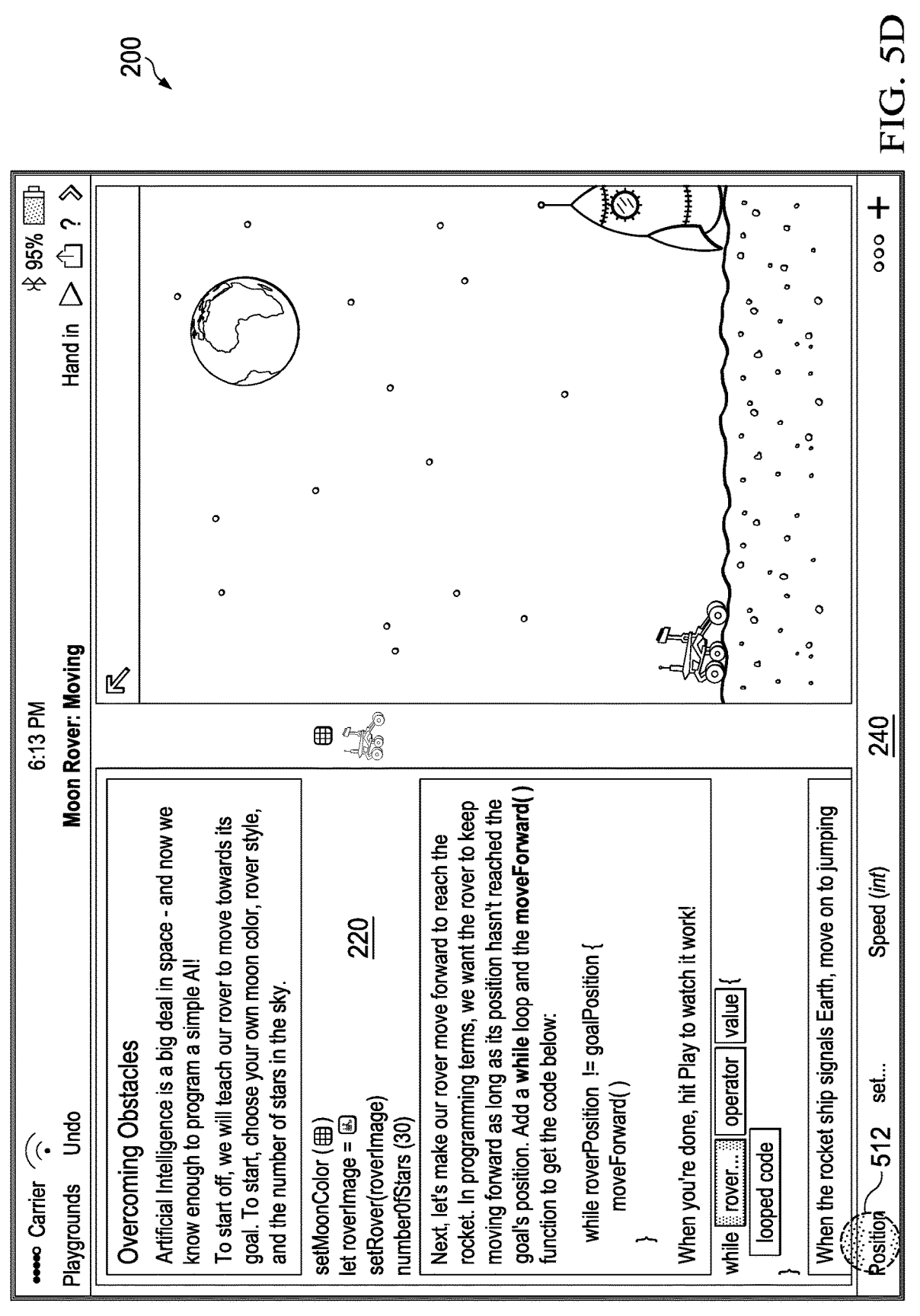

As shown in FIG. 5D, after the user has selected a stem, the universal content bar 240 updates to show additional suggestions to complete the stem or continue adding to the stem. For example, the universal content bar 240 can be updated to show one or more string of text to complete the stem or continue the stem (e.g., strings of text to complete the names of variables or functions sharing the selected stem, or strings of text to continue adding to the stem). The user can select one of the suggestions (illustrated as the dotted circle 512) to insert the complete variable into the code editing area 220.

Figure 5E:
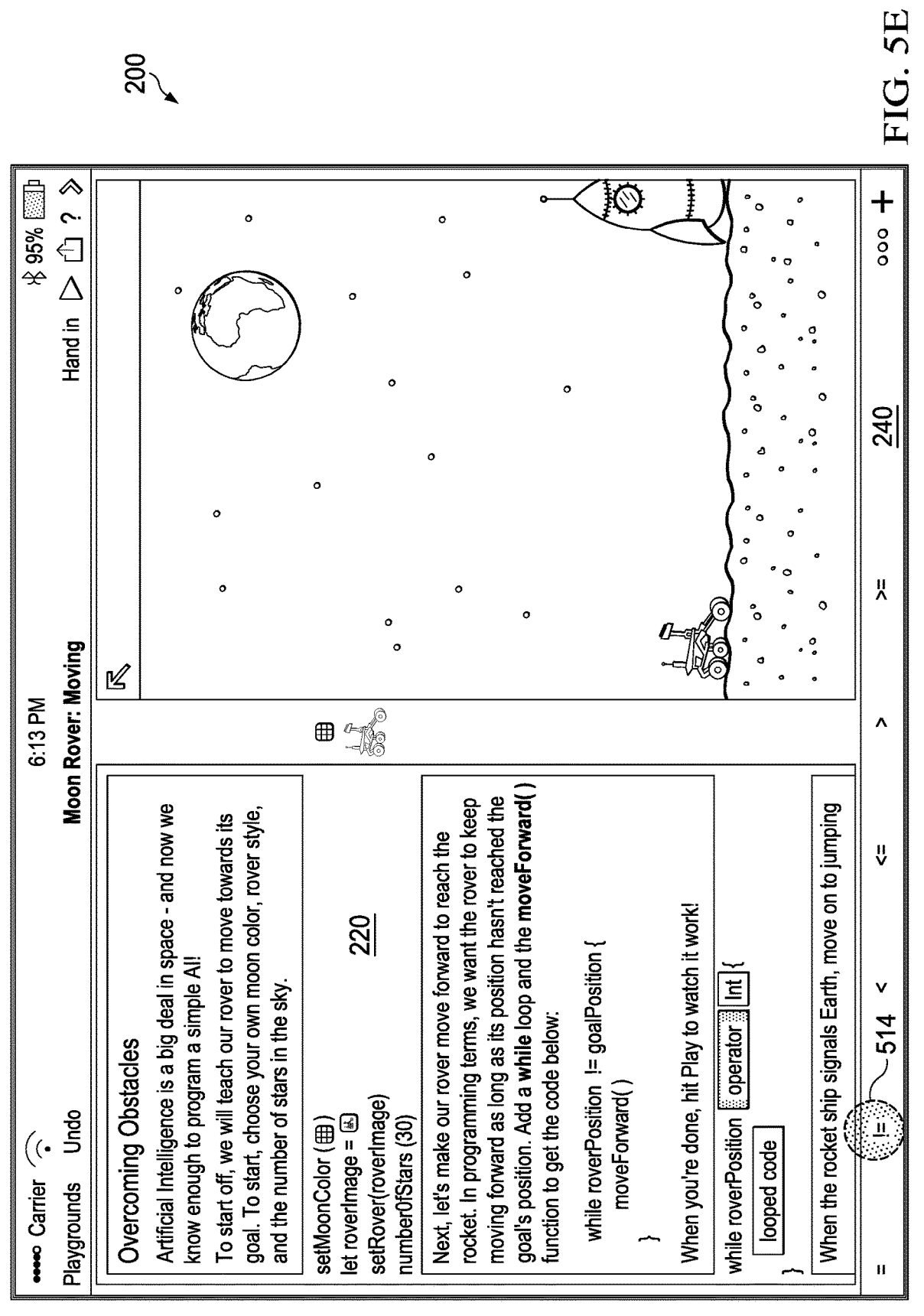

As shown in FIG. 5E, after a complete variable or function has been inserted, the universal content bar 240 suggests one or more operators that can be used in the conditional statement. The user can select one of the suggested operators (illustrated as the dotted circle 514) to insert the selected operator into the code editing area 220.

Figure 5F:
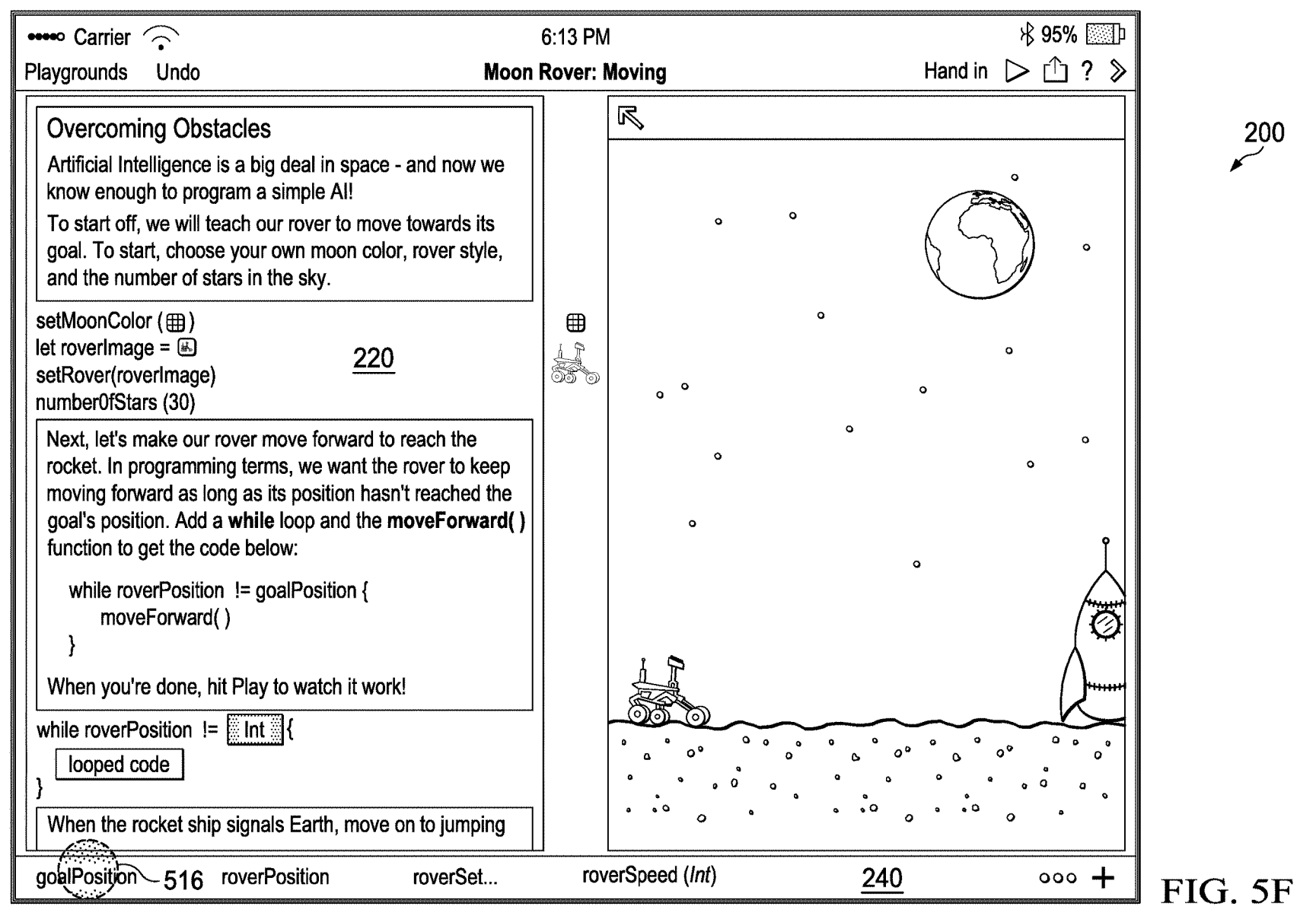

As shown in FIG. 5F, after an operator has been inserted, the universal content bar 240 suggests one or more variables or functions that can be used as the second value in the conditional statement. The user can select one of the suggested variables or functions (illustrated as the dotted circle 516) to insert the selected variable or function into the code editing area 220.

As shown in FIG. 5G, after the second item has been inserted, the universal content bar 240 suggests one or more functions can be executed if the conditional statement is true. The user can select one of the suggested functions (illustrated as the dotted circle 518) to insert the selected function into the code editing area 220.

In this manner, a user can modify the sequence of code displayed in the code editing area 220 without utilizing a physical or virtual keyboard. This can be beneficial, for example, as it allows users to more easily perform software programming tasks on a touch-sensitive device, where a physical keyboard or mouse might not be available or convenient. Further, this can be beneficial, as it allows the user to view the user interface 200 more clearly without a virtual keyboard obscuring or limiting the amount of information that can be shown on the user interface.

Although an example operation of the universal content bar 240 is shown, this is merely an illustrative example. In practice, the universal content bar 240 can provide suggestions regarding any function, sub-routine, variable, parameter, value, operator, syntax, or other programming construct, or combinations thereof.

Figure 6:
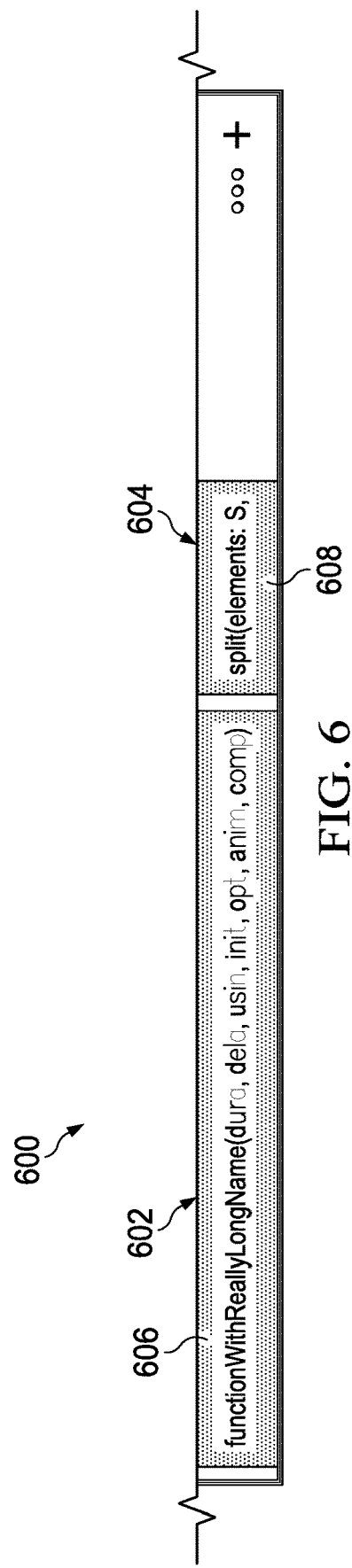
FIG. 6 illustrates an example universal content bar having multiple examples.

In some cases, a suggested sequence of code can be too lengthy to be displayed fully by the universal content bar 240. In these cases, the suggested sequences of code can be truncated, and the truncated sequences of code can be presented by the universal content bar 240. For example, FIG. 6 shows an example universal content bar 600 displaying two suggestions 602 and 604. In this example, the suggestion 602 represents a sequence of code that is too lengthy to be displayed fully by the universal content bar 600. Thus, the suggestion 602 has been truncated so that it can be displayed to the user. In this example, the suggestion 602 represents a function call with several parameters. Here, the suggestion 602 has been truncated so that the function name is displayed in its entirety, and a portion of each of the parameters is displayed. To indicate that only a portion of each of the parameters is displayed, the parameter names are gradually faded towards the point of truncation. In this manner, a user can readily read the name of the function, while also quickly previewing the parameters that are associated with the function.

In some cases, the suggestions shown in the universal content bar 240 can be highlighted in a manner that indicates whether the suggestion presents a full function call, or whether the suggestion indicates only a portion of a function call. For instance, as shown in FIG. 6, the suggestion 602 represents a full function call. This can be indicated, for example, by a highlight box 606 having rounded corners on the left and right sides. On the other hand, the suggestion 604 represents a partial function call (i.e., only the beginning of a function call). This can be indicated, for example, by a highlight box 608 having rounded corners on the left side, squared corners on the right side, and an ellipsis after the text of the suggestion.

Figure 7:
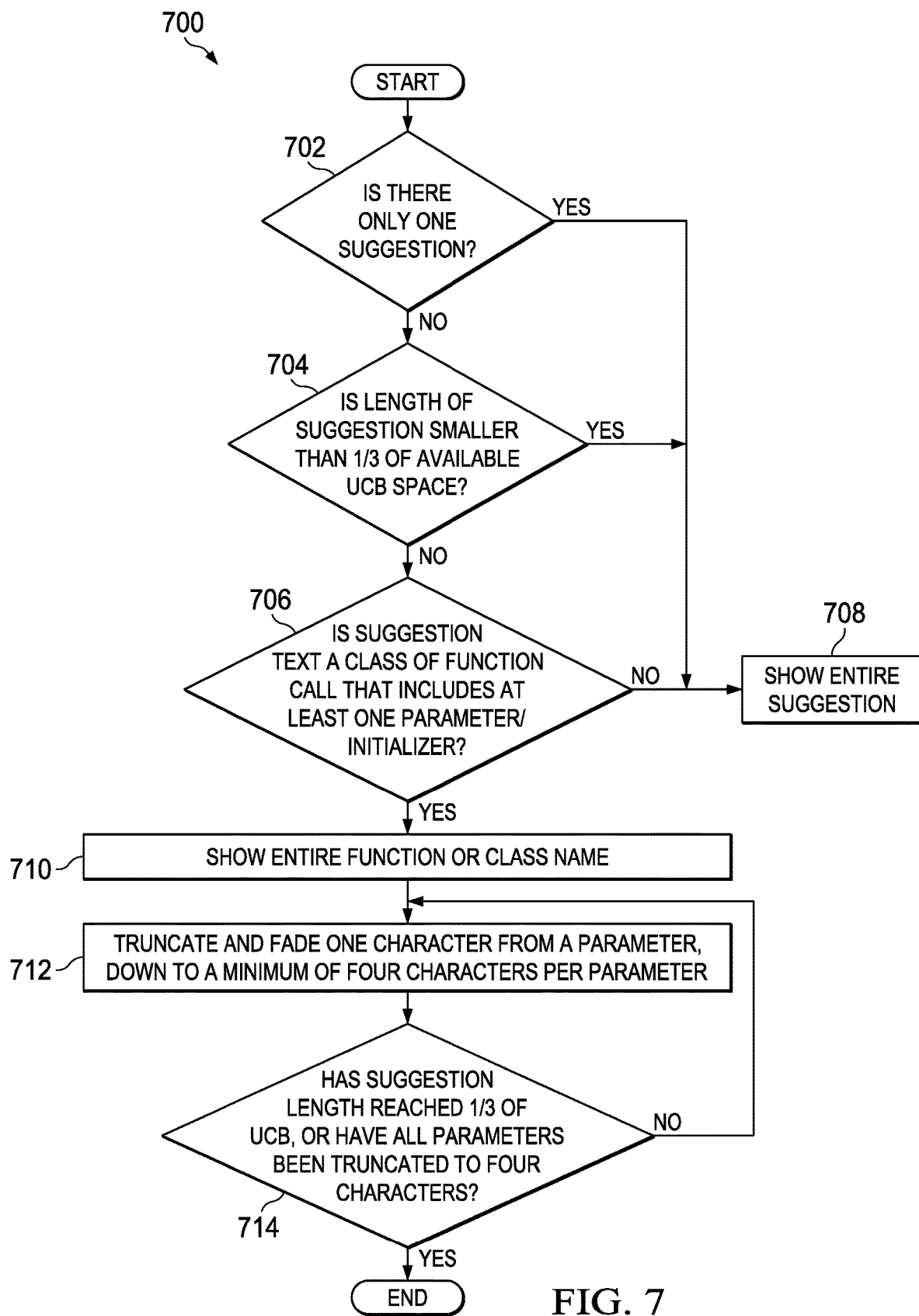
FIG. 7 is a flowchart of an example process for truncating and displaying suggestions on a universal content bar.

In some cases, the suggestions shown in the universal content bar 240 can be truncated so that they can fit into a predetermined portion of the universal content bar 240. An example process 700 for truncating suggestions is shown in FIG. 7. The process 700 can be performed for a single suggestion (e.g., a single suggested function, variable, parameter, or other programming construct) to be displayed on the universal content bar 240, or it can be repeated for each of several suggestions to be displayed on the universal content bar 240.

The process 700 begins by determining whether there is only a single suggestion to be displayed (step 702). If so, the entire suggestion is displayed on the universal content bar (step 708).

If there is more than one suggestion, a determination is made whether the present suggestion is smaller than a particular portion (e.g., one-third) of the available space on the universal content bar (step 704). If so, the entire suggestion is displayed on the universal content bar (step 708).

If the present suggestion is larger than the particular portion of the available space on the universal content bar, a determination is made whether the text of the present suggestion represents a class or functional call that includes at least one parameter or initializer (step 706). If not, the entire suggestion is displayed on the universal content bar (step 708).

If the text of present suggestion represents a class or functional call that includes at least one parameter or initializer, the entire function or class name is displayed on the universal content bar (710), and one character is truncated from each of the parameters (step 712). To indicate that a character has truncated, the parameter is gradually faded towards the point of truncation.

After the parameters have been truncated, a determination is made whether the length of the suggestion is smaller than the particular portion (e.g., one-third) of the available space on the universal content bar, or whether all of the parameters have been truncated to four characters (step 714). If not, additional characters are truncated from each of the parameters until the length of the suggestion is smaller than the particular portion (e.g., one-third) of the available space on the universal content bar, or until all of the parameters have been truncated to minimum of four characters.

If the length of the suggestion is smaller than the particular portion (e.g., one-third) of the available space on the universal content bar, or if all of the parameters have been truncated to four characters, the truncated suggestion is displayed on the universal content bar. If there is more than one suggestion, the process 700 is repeated for each of those suggestions.

Although the above process truncates suggestions to one-third of the available space on the universal content bar, this is merely an illustrative example. In practice, suggestions can be truncated according to other lengths. For example, in some cases, suggestions can be truncated to one half, one fourth, one fifth, one sixth, or any other portion of the available space on the universal content bar. This can beneficial, for example, so that different numbers of suggestions can be displayed on the universal content bar at once.

As described above, the universal content bar can suggest one or more contextually-determined sequences of software code based on a user's inputs (e.g., characters or keystrokes that were previously entered by the user) and previously-entered software code (e.g., the software code surrounding an insertion cursor on the code editing area 220). In some cases, two or more similar suggested sequence of codes can be grouped together, and one or more groups can be displayed by the universal content bar 240. The user can selected one of the groups to access each of the suggested sequences of code within that group. This can be useful, for example, as it allows the user to view suggested sequences of codes in a more organized and intuitive manner.

Figure 24A:
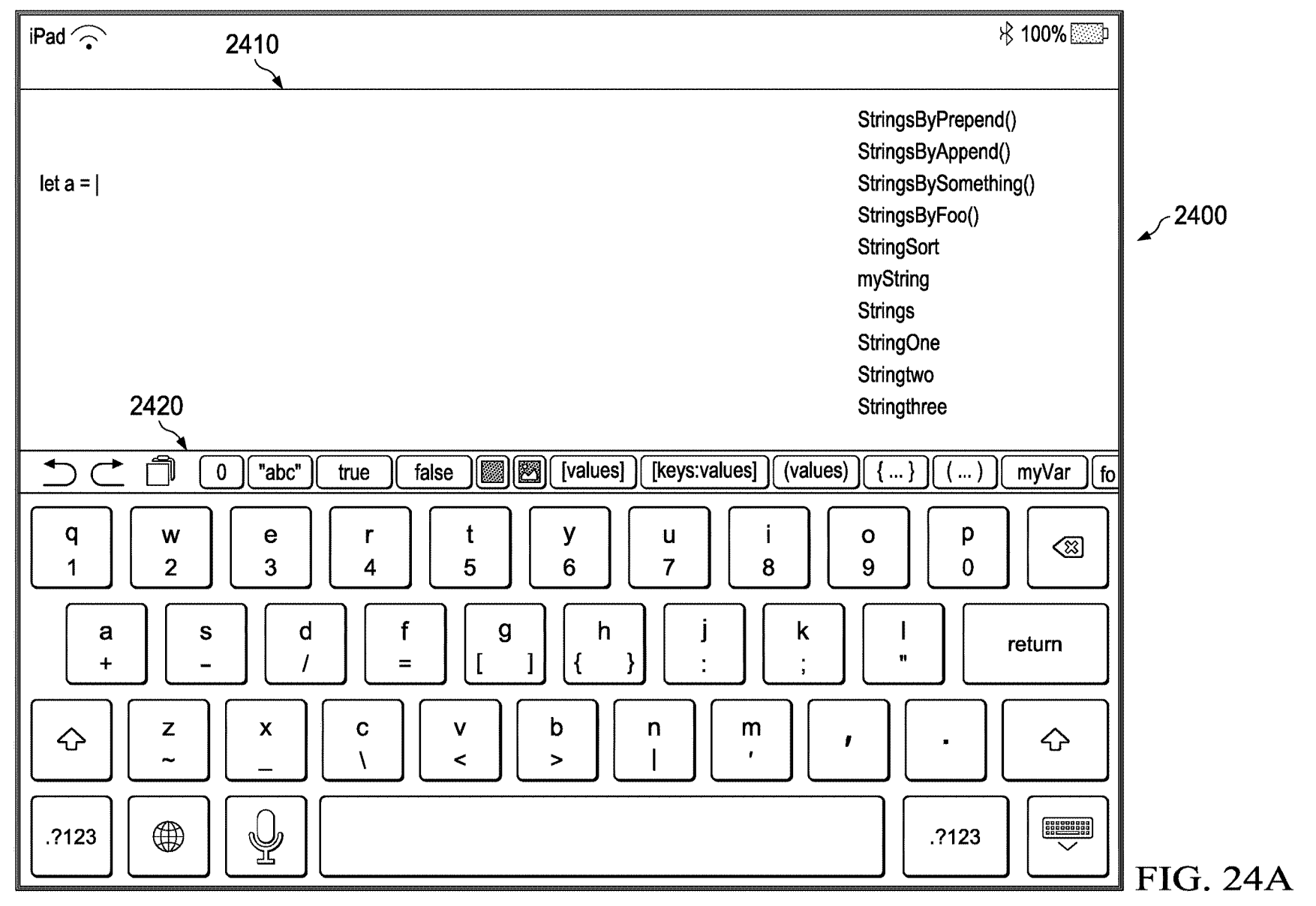

For example, FIG. 24A shows a user interface 2400 having a code editing area 2410 and a universal content bar 2420. In this example, the user has begun entering a sequence of code for assigning a value to a variable (e.g., "let a="), but has not yet completed the sequence of code (e.g., has not yet entered the value to be assigned to the variable). In response, the universal content bar 2420 displays contextually determined suggestions for completing the sequence of code (e.g., numerical values, strings, Boolean values, color values, images, arrays, variables, or any other items that could complete the sequence of code). In a similar manner as described above, a user can select one of these suggestions (e.g., by tapping on a particular selection), and the selected suggestion is inserted into the code editing area 2410 to complete the sequence of code.

Figure 24B:
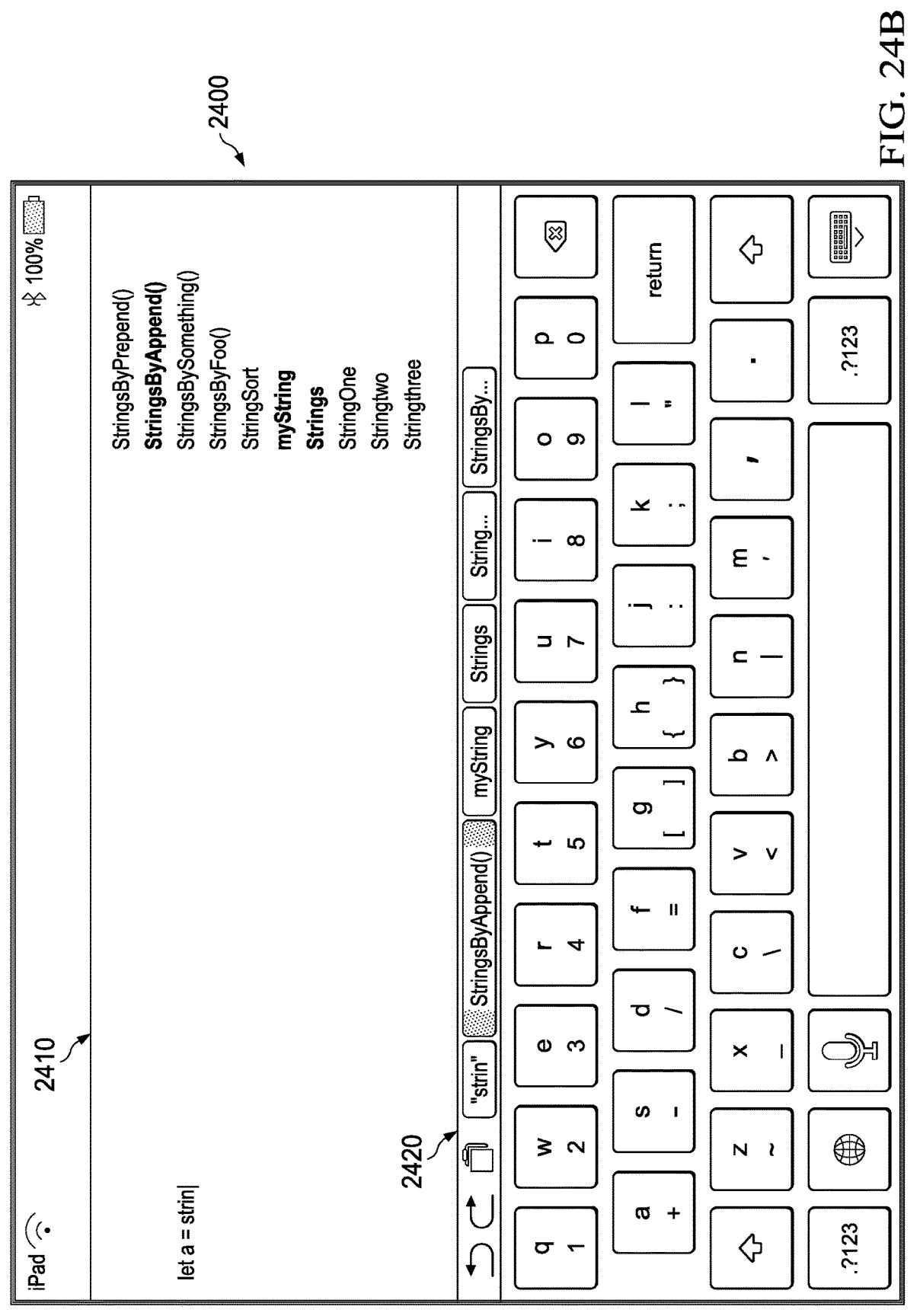

However, the user can also continue entering additional code, and the universal content bar 2420 can update to reflect the new entries. For example, as shown in FIG. 24B, the user has begun entering additional characters (e.g., a string of characters "strin"). In response, the universal content bar 2420 updates to display contextually determined suggestions for completing the sequence of code (e.g., items containing the string "strin"). In some cases, the suggestions begin with the inputted string (e.g., "StringsByAppend( )"). In some cases, the suggestions need not begin with the inputted string, and merely contains that string somewhere its name (e.g., "myString"). In a similar manner as described above, a user can select one of these suggestions (e.g., by tapping on a particular selection), and the selected suggestion is inserted into the code editing area 2410 to complete the sequence of code.

Figure 24C:
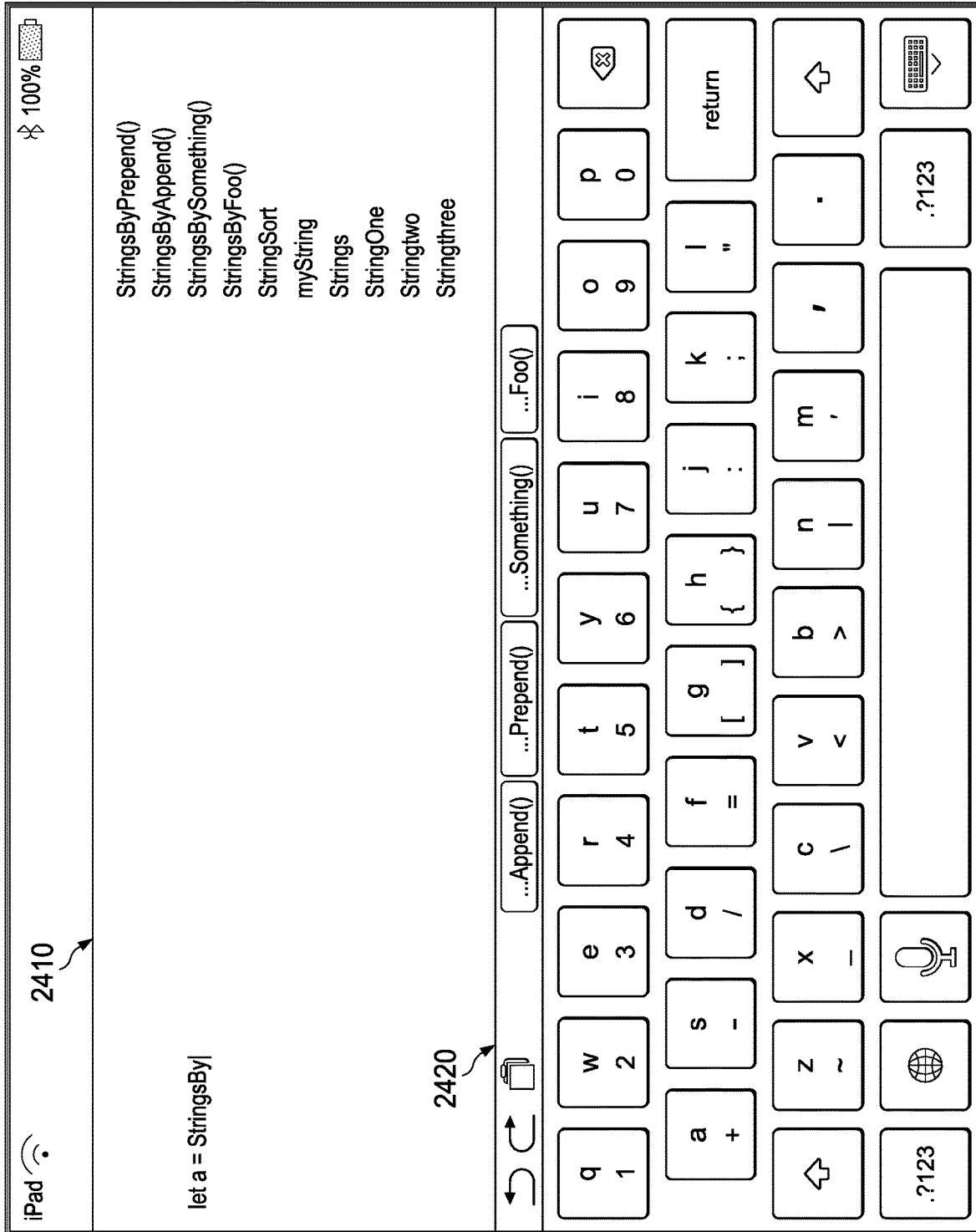

In some cases, universal content bar 2420 can group two or more similar suggested sequence of codes together, and one or more groups can be displayed by the universal content bar 240. For instance, as shown in FIG. 24C, in addition to displaying several suggestions that fully identify an item (e.g., "StringsByAppend( ), "myString," and "Strings"), the universal content bar 2420 also displays groups of items grouped according to a common stem. As an example, a group "String . . . " can include items beginning with the string "String." As an example, a group "StringsBy . . . " can include items beginning with the string "StringsBy."

A user can select one of these groups to view items within that group. For example, as shown in FIG. 24C, when a user selects the group "StringsBy . . . ," the string "StringsBy" is inserted into the code editing area 2410, and the universal content bar 2420 updates to display sequences of code to complete the entry. In this example, the universal content bar 2420 displays an item " . . . Append( )" (corresponding to a function "StringsByAppend( )"), " . . . Prepend( )" (corresponding to a function "StringsByPrepend( )"), " . . . Something( )" (corresponding to a function "StringsBySomething( )"), and " . . . Foo( )" (corresponding to a function "StringsByFoo( )"). In a similar manner as described above, a user can select one of these suggestions (e.g., by tapping on a particular selection), and the selected suggestion is inserted into the code editing area 2410 to complete the sequence of code.

Each suggestion on the universal content bar 2420 can be punctuated to indicate whether the suggestion corresponds to an individual suggested sequence of code, or a group of several different suggested sequences of code. For example, if the suggestion is a group, the suggestion can be displayed with an ellipsis at the end, indicating that multiple suggested sequences of code are contained within the suggested group. When a user selects the group, subsequent suggestions can be displayed with an ellipsis at the beginning, indicating that they can be selected to complete the initial selection. On the other hand, if the suggestion is an individual suggested sequence of code, the suggestion can be displayed without an ellipsis at the end.

In some cases, the universal content bar 2420 can display one or more individual suggested sequences code alongside one or more groups of suggestions. For example, as shown in FIG. 24B, the universal content bar 2420 can display a number of individual suggested sequences of code (e.g., "StringsByAppend( )," "myString," and "Strings), followed by a number of groups of suggestions (e.g., "String . . . ," and "StringsBy . . . "). This can be useful, for example, as it provides the user with a number of specific individual suggestions, while still allowing the user to select from among a group other possible suggestions as needed. In some cases, the universal content bar 2420 can present a fixed number of individual suggestion (e.g., one, two, three, four, or more suggestions), and the remaining space can be filled by one or more groups of suggestions. In some cases, the universal content bar 2420 can allot a particular amount of space to individual suggestions (e.g., 25%, 50%, 75%, or some other percentage of the universal content bar), and the remaining space can be filled by one or more groups of suggestions. Other ways of dividing a universal content bar 2420 between different types of suggestions are also possible.

Figure 8:
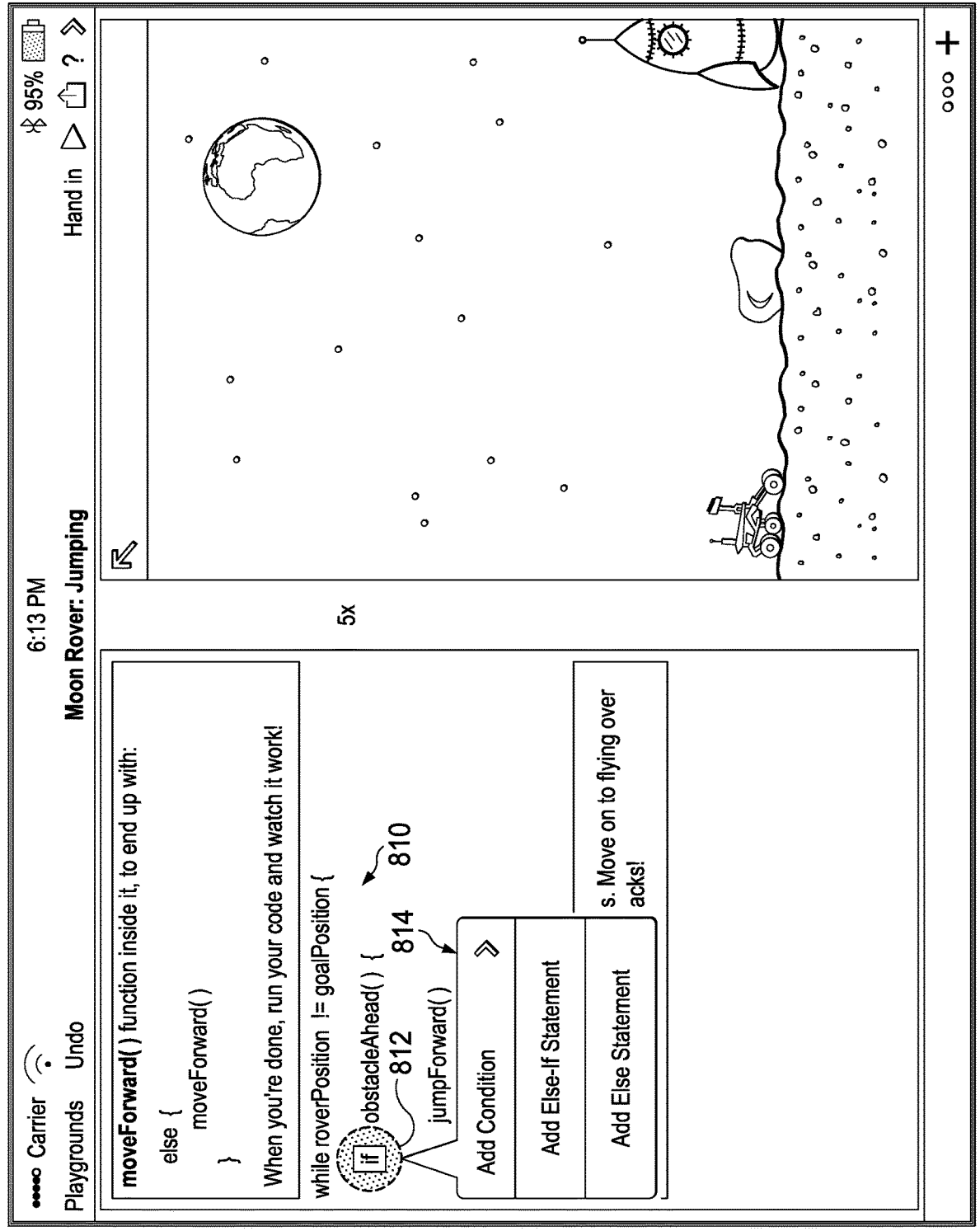
FIG. 8 illustrates an example user interface with a code modification element.

In some cases, a user can modify sequences of software code displayed in a code editing area by pressing and holding a particular sequence of software code (e.g., the name of a function or loop). In response, the code editing area can display a code modification element that allows a user to modify or add to the selected sequence of software code (e.g., by modifying or adding to the function or loop). As an example, FIG. 8 shows a user interface 800 having a code editing area 810. The user can modify an "if" loop displayed in the code editing area 810 by pressing and holding the name of the "if" loop (signified as the dotted circle 812). In response, the user interface 800 displays a code modification element 814 that presents a list of modifications that can be made with respect to the selected "if" loop (e.g., adding an "else-if" statement or an "else" statement to the "if" loop). The user can select one of the modifications (e.g., by tapping on the desired modification) to introduce that modification into the code editing area 810.

Although the modification of an "if" loop is shown in FIG. 8, this is merely an illustrative example. In practice, other programming constructs also can be modified in a similar manner. For example, in some cases, a user can press and hold an operator, and in response, the user interface can present a code modification element that includes a list of alternative operators that can replace the selected operator. As another example, in some cases, a user can press and hold a function name, and in response, the user interface can present a code modification element that includes a list of alternative functions that can replace the selected functions. Similarly, a user can press and hold any programming construct, and in response, the user interface can present a code modification element that includes a list of modifications that can be made with respect to the selected construct (e.g., a list of alternative functions, sub-routines, variables, parameters, values, operators, or syntax to replace the selected programming construct, or a list of modifications that can be made with respect to the selected programming construct).

Figure 9:
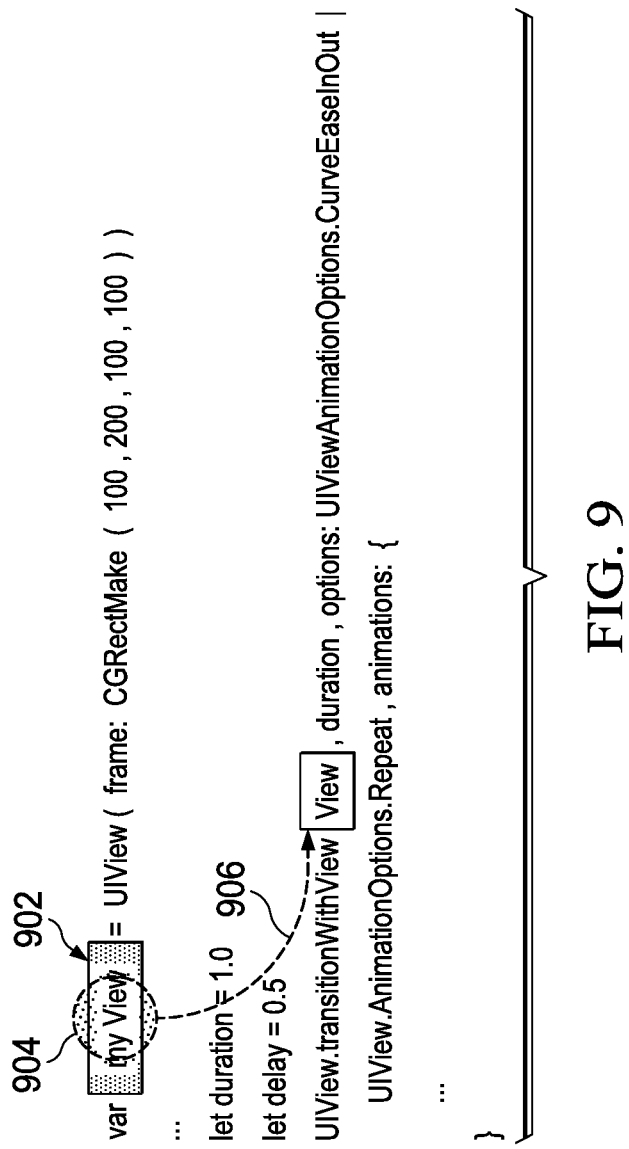
FIG. 9 illustrates an example gesture for copying a sequence of software code.

In some cases, a user can copy a sequence of software code by dragging the sequence of code from one portion of the software code to another. As an example, as shown in FIG. 9, a user can press and hold a particular programming construct 902 (e.g., a function), and drag that selected programming construct 902 to a different portion of the software call (illustrated as the dotted circle 904 and dotted arrow 906). When the user releases his touch, the selected programming construct is copied to the new location. In this manner, a user can quickly and intuitively copy sequences of code without manually re-inputting those sequences of code using a physical or virtual keyboard.

As described above, in some cases, a user can select an icon to invoke a list of suggested sequences of software code, and then select a suggested sequence of software code by touching and holding one of the sequence of software code and dragging the sequence of software code to the code editing area. When the user releases his touch, the selected sequence of software code is inserted into the code editing area. In some cases, a bracketed function can be inserted in this manner. A bracketed function is a function that encloses one or more characters between a beginning bracket and an end bracket. Example bracketed functions include loop functions (e.g., "for" loops, "do" loops, "while" loops), conditional statements (e.g., "if" statements, "if-then" statements, "if-then-else" statements), or any other programming constructs in which characters are enclosed between two brackets. To insert a bracket function, the user can select a bracketed function, drag the selected bracketed function over a particular line of code. When the user releases his touch, the selected bracketed function is inserted around that the line of code (e.g., such that the line of code is enclosed by the bracketed function). The user can enclose additional lines of code within the bracketed function by dragging and repositioning an end bracket associated with the bracketed function.

Figure 10A:
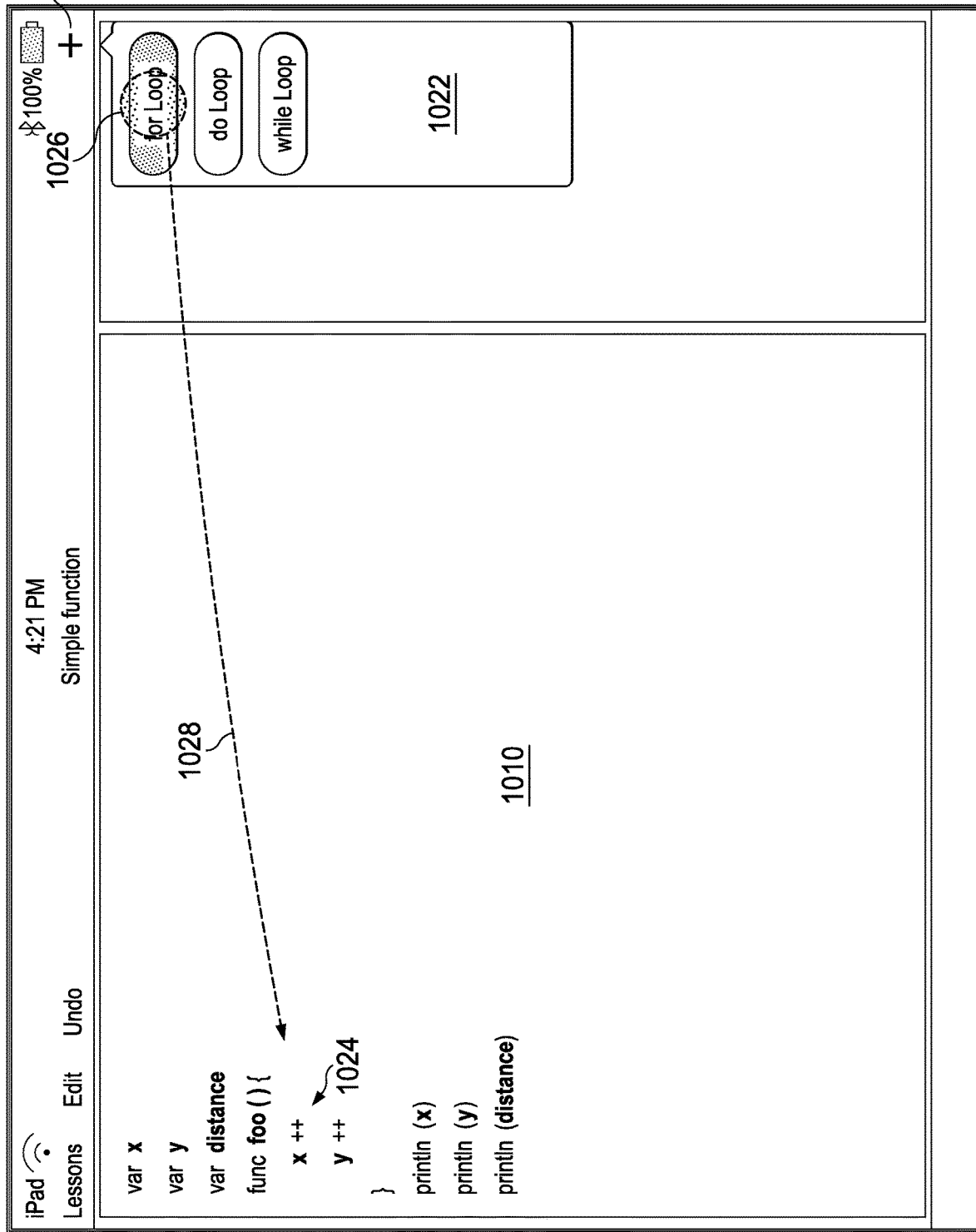
FIGS. 10A-C illustrate another example user interface for a touch-based, interactive learning environment for software programming.
Figure 10B:
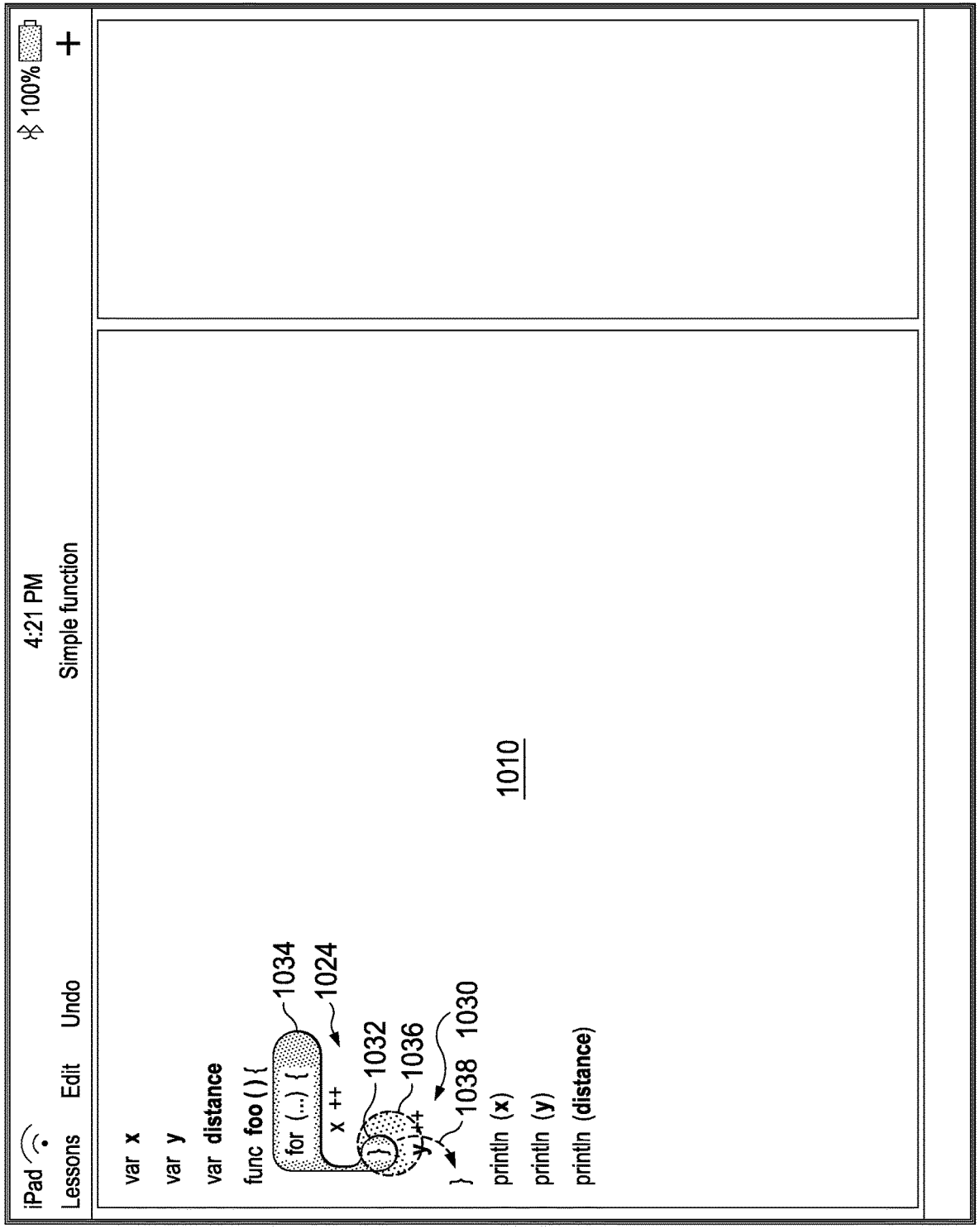
Figure 10C:
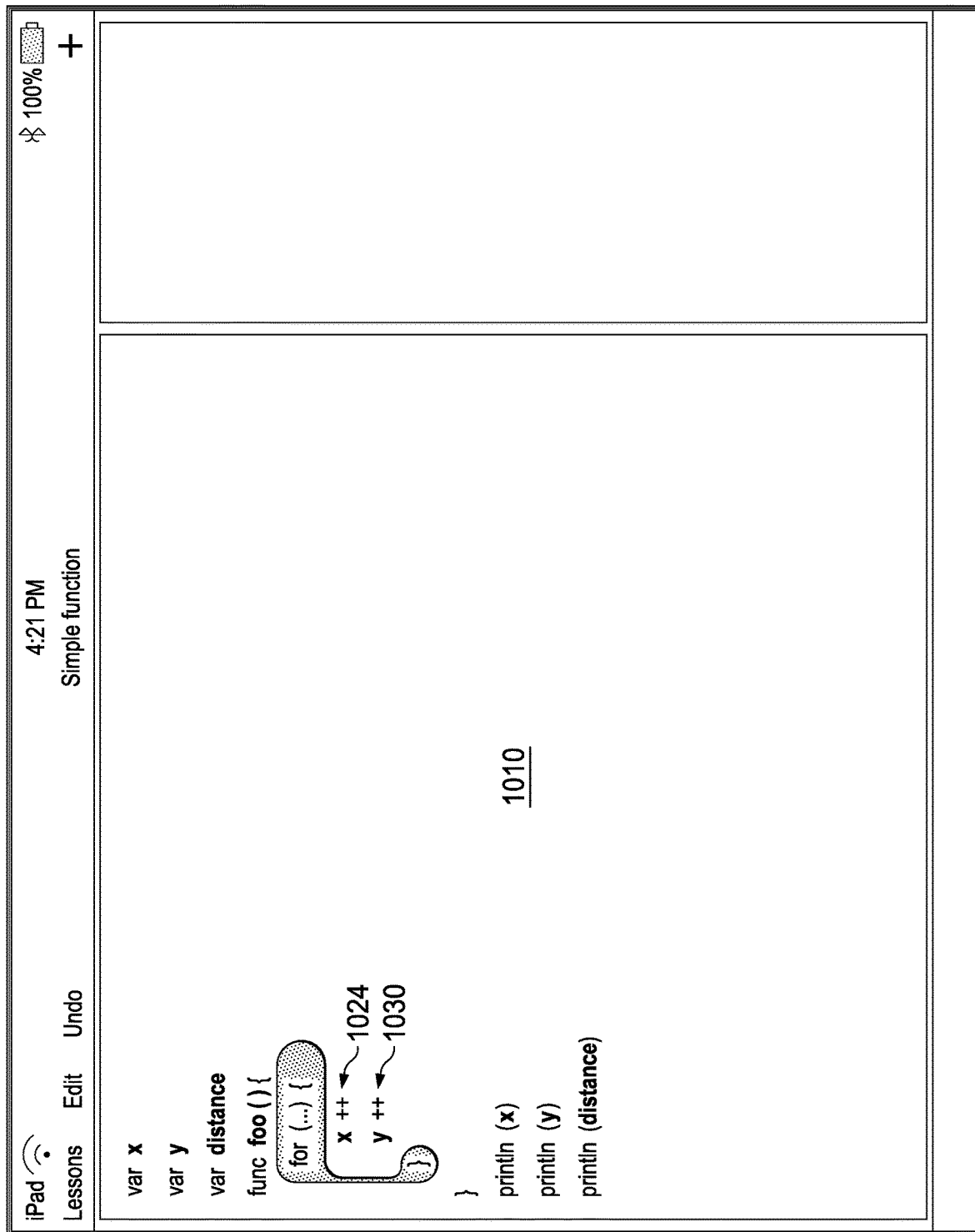

As an example, FIG. 10A shows a user interface 1000 having a code editing area 1010 and an icon 1020. The user can select an icon 1020 to invoke a list 1022 of suggested bracketed functions. The user can then select a suggested bracketed function by touching and holding one of the bracketed functions and dragging the bracketed function to the code editing area 1010 over a line of code 1024 (illustrated as the dotted circle 1026 and the dotted arrow 1028). As shown in FIG. 10B, when the user releases his touch, the bracketed function is inserted into the code editing area 1010 such that the line of code 1024 is enclosed by the bracketed function. The user can enclose an additional line of code 1030 within the bracketed function by touching and holding an end bracket 1032 associated with the bracketed function, and dragging the end bracket 1032 so that the end bracket 1032 and a beginning bracket 1034 enclose the additional line of code 1030 (illustrated as the dotted circle 1036 and the dotted arrow 1038). As shown in FIG. 10C, when the user releases his touch, the bracketed function is modified such that it encloses the additional line of code 1030. In this manner, the user can quickly and intuitively insert a bracketed function, and then adjust the lines that code that are enclosed by the bracketed function. The end bracket 1032 and the beginning bracket 1034 can be visually linked (e.g., using a display element or highlighting the code or area between the two brackets), such that the user can easily determine that the brackets are associated with the same bracketed function.

In some cases, a user can insert a bracketed function and adjust the lines of code that are enclosed by the bracketed function using a multi-touch gesture (e.g., a gesture involving presses or gestures by multiple fingers and/or styluses). For example a user can select and drag a bracketed function over a line of code, and then perform a reverse pinching gesture (e.g., by moving two fingers or styluses away from each other) to enclose the lines of code between the two fingers or styluses within the bracketed function. The user can increase the space between his two fingers or styluses into order to enclose a greater number of lines within the bracketed function, or reduce the space between his two fingers or styluses into order to enclose a lesser number of lines within the bracketed function. When the user releases his touch, the bracketed function is inserted such that it encloses the selected lines of code.

In some cases, a user interface can include a virtual keyboard (e.g., a touch-based keyboard displayed on a touch-sensitive display screen) that allows a user to select images of keys to input characters. In some cases, each key on the virtual keyboard can represent multiple different characters. A user can select from among these characters by pressing and holding the key, and performing a diagonal swiping gesture (e.g., a sliding gesture in a diagonal direction along the touch-sensitive surface). The user then releases his touch to confirm the selection.

Figure 11A:
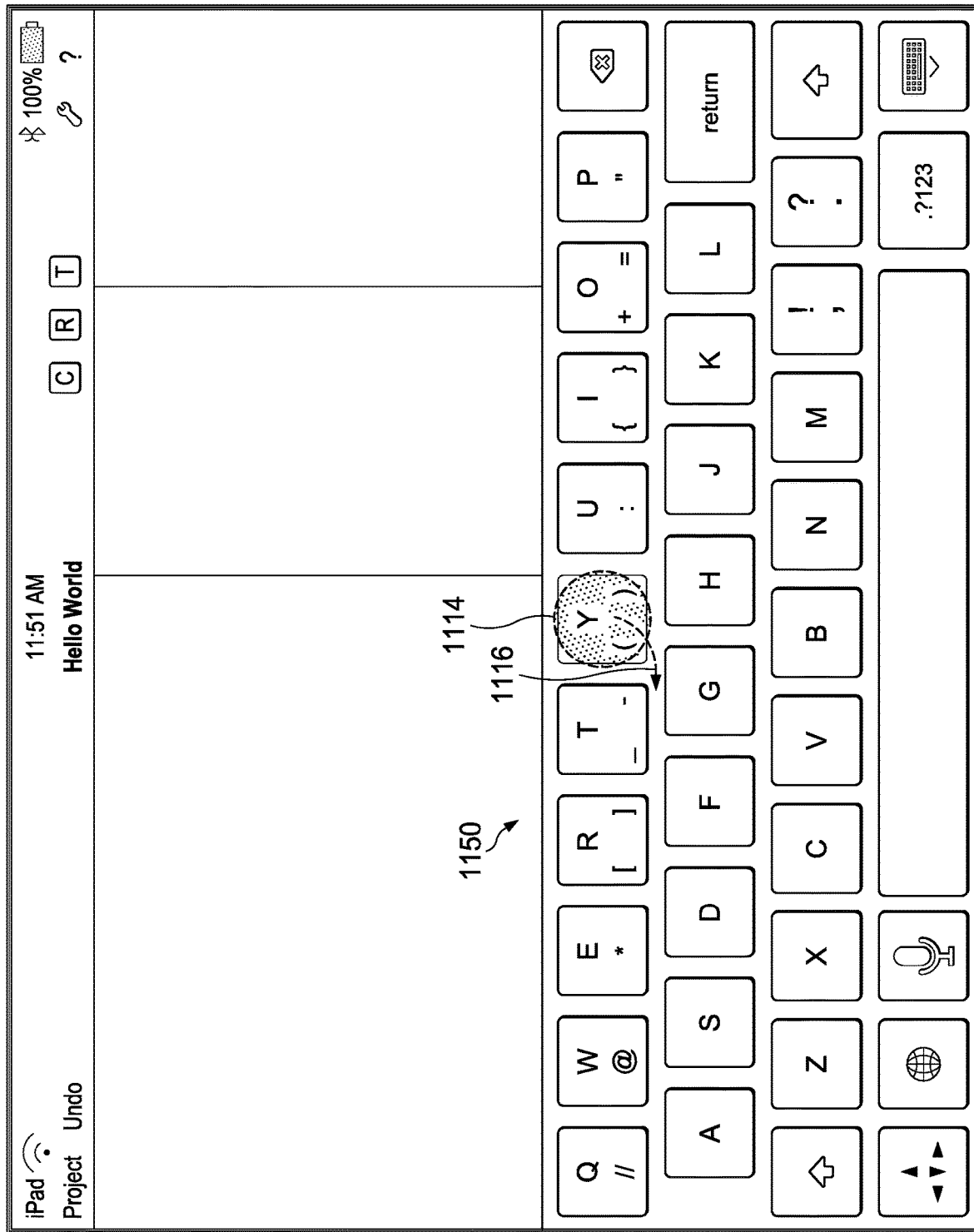
FIGS. 11A-D illustrate example user interfaces including virtual keyboards.
Figure 11B:
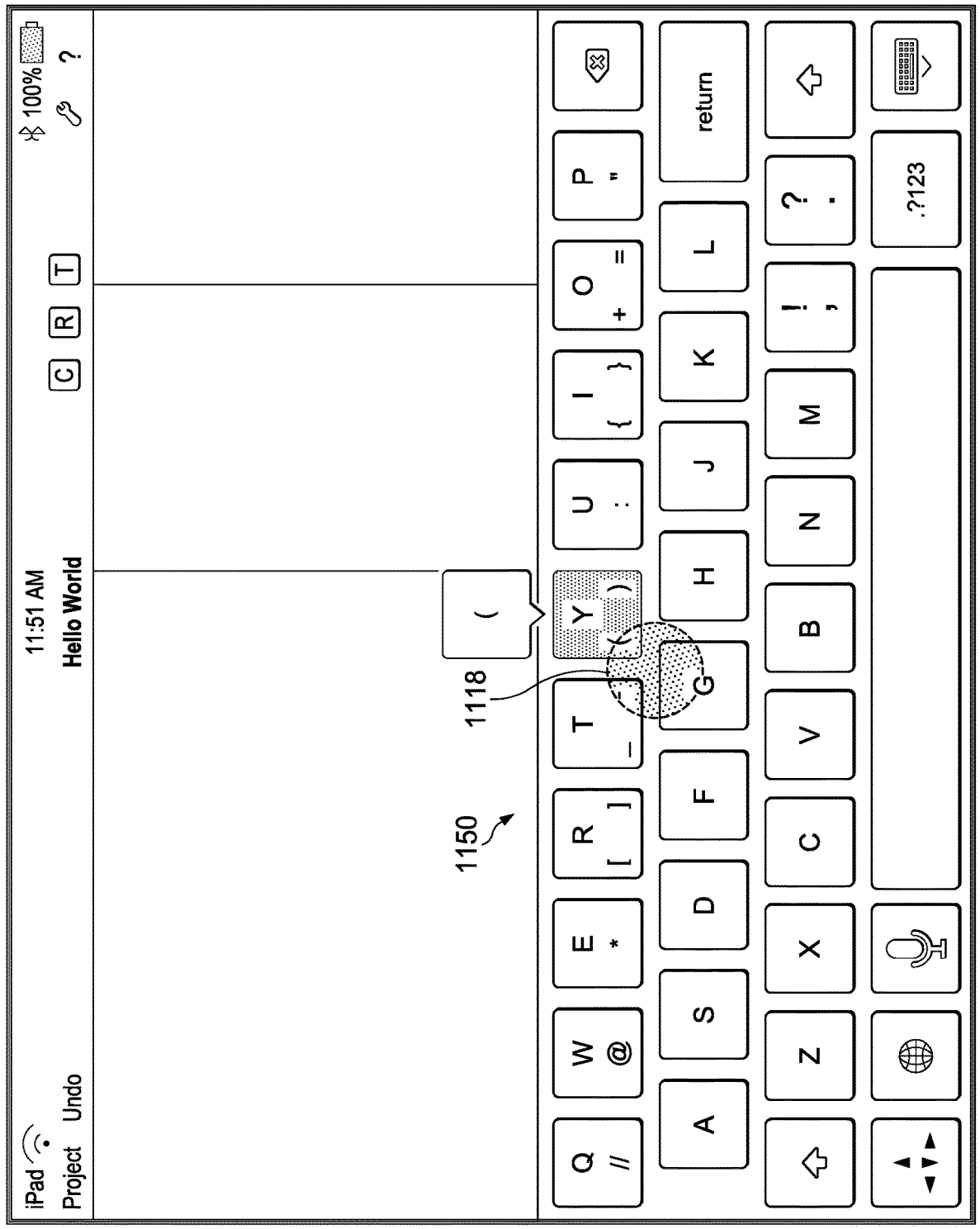

For example, as shown in FIG. 11A, a user interface 1100 can include a virtual keyboard 1150 having several keys 1112. Each the keys 1112 can represent several different characters. In this example, the "Y" key represents three different characters: a "Y" character, a left parenthesis character (displayed on the bottom left corner of the "Y" key), and a right parenthesis character (displayed on the bottom right corner of the "Y" key). The user can select the "Y" character by tapping on the "Y" key. Alternatively, the user can select the left parenthesis character by pressing and holding the "Y" key (illustrated as the dotted circle 1114), and while maintaining his touch, performing a diagonal gesture across the face of the key in the bottom-left direction (illustrated as the dotted arrow 1116). As shown in FIG. 11B, at the end of the gesture (illustrated as the dotted circle 1118), the virtual keyboard 1150 indicates that the left parenthesis character has been selected by displaying the left parenthesis character above the "Y" key. The user can then release his touch to confirm the selection. Alternatively, the user can select the right parenthesis character by pressing and holding the "Y" key, and while maintaining his touch, performing a diagonal gesture across the face of the key in the bottom-right direction. At the end of the gesture, the virtual keyboard 1150 can indicate that the right parenthesis character has been selected by displaying the right parenthesis character above the "Y" key. The user can then release his touch to confirm the selection.

Although the operation of a single "Y" key is shown above, this is merely an illustrative example. In practice, any number of keys of a virtual keyboard (e.g., one, two, three, four, or more keys) each can be used to represent multiple different characters. A user can select a desired character by tapping an appropriate key, or by pressing and holding a key and performing an appropriate diagonal gesture.

Further, although diagonally downward gestures are described above, diagonally upward gestures are also possible, either instead of or in addition to diagonally downward gestures. For example, in some cases, a user can select another character by holding a key, and while maintaining his touch, performing a diagonal gesture across the face of the key in the upper-right direction. As another example, in some cases, a user can select yet another character by holding a key, and while maintaining his touch, performing a diagonal gesture across the face of the key in the upper-left direction. Allowing swiping in both upward and downward directions allows a user to select from 5 different characters while maintaining touch on a single key face.

Figure 11C:
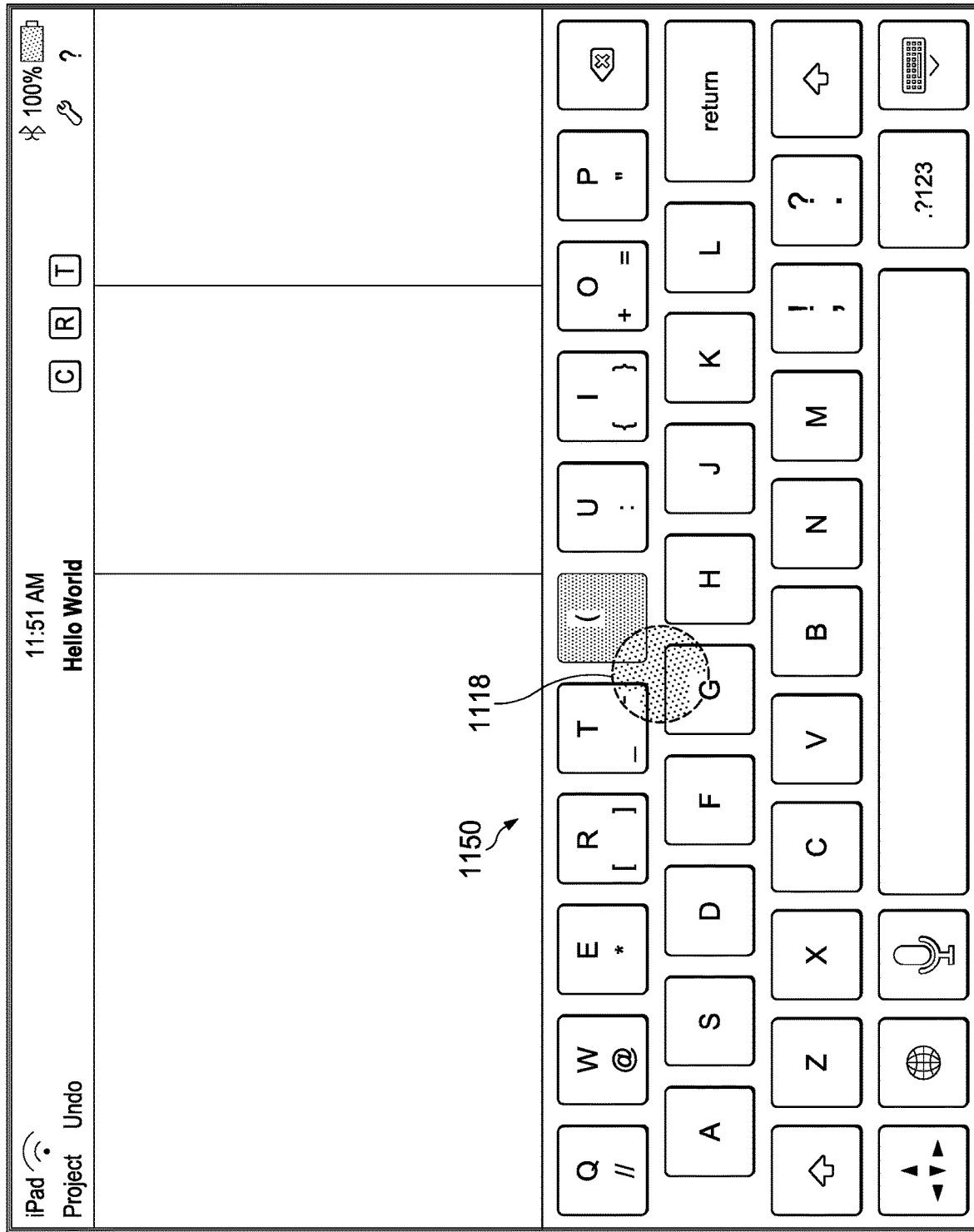
Figure 11D:
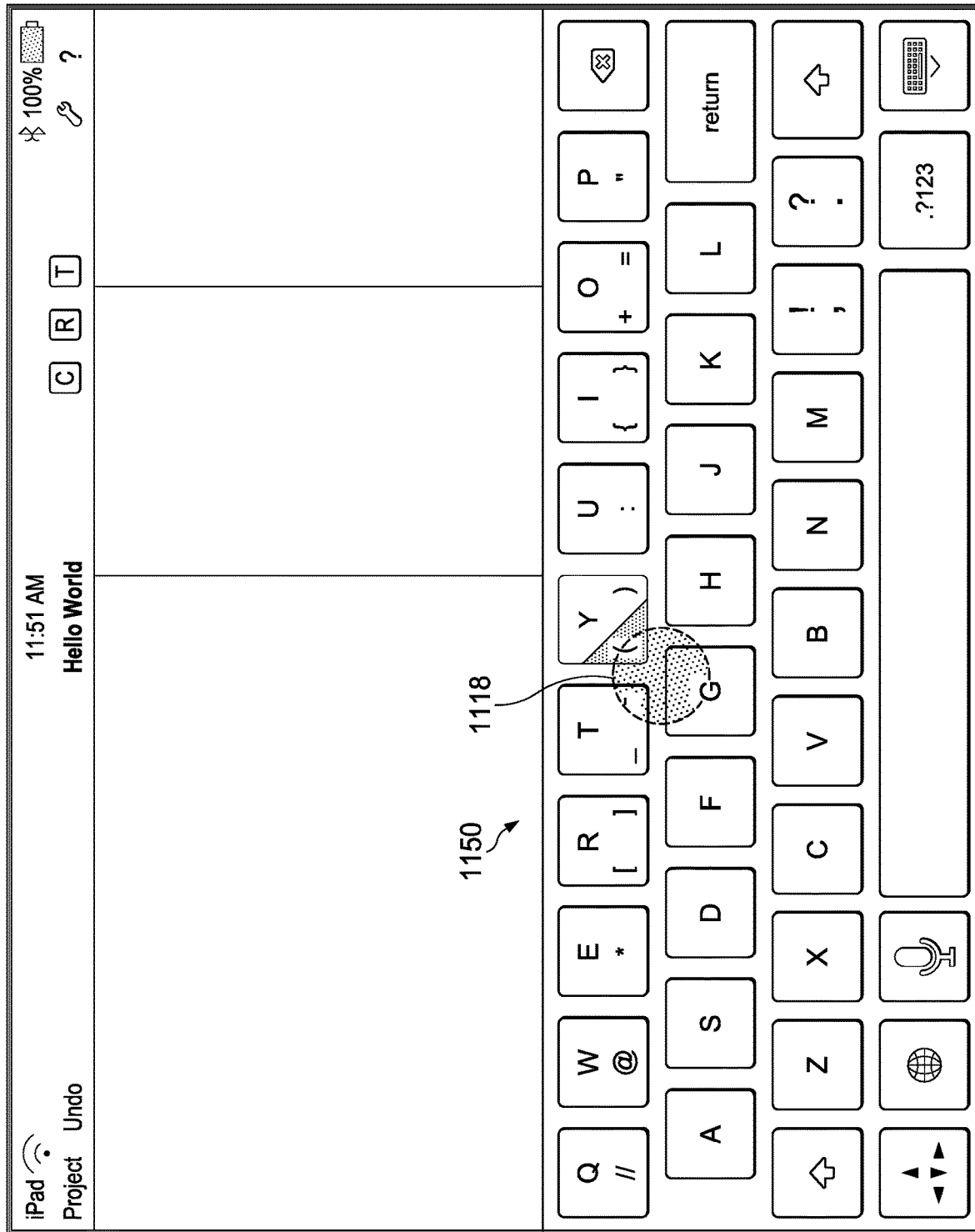

In the example above, the selected character is indicated by displaying the character above the key. However, the selected character can also be indicated in other ways. For example, in some cases, the selected character can be indicated by displaying the character below the key, or to the side of the key. As another example, as shown in FIG. 11C, the selected character can be indicated by directly displaying the selected character on the key (e.g., by replacing the originally displayed character with the selected character). As yet another example, as shown in FIG. 11D, the selected can be indicated by highlighting the selected character on the key (e.g., by highlighting the corner corresponding to the selected character).

In the example shown in FIGS. 11A and 11B, alternate characters are shown below the primary character. However, this is merely an illustrative example. In some cases, alternate characters can be shown above, to the left, and/or to the right of the primary character. Accordingly, a user can perform a sliding gesture towards a particular alternate character to select that alternate character.

In some cases, a user can perform a sliding gesture away from a particular alternate character to select that alternate character. This can simulate the user "dragging" one of the alternate characters towards the center of the face of the key to select that alternate character. For example, FIG. 11E shows a "Y" key representing three different characters: a "Y" character, a left parenthesis character (displayed on the left corner of the "Y" key), and a right parenthesis character (displayed on the top right corner of the "Y" key).

The user can select the "Y" character by tapping on the "Y" key. Alternatively, the user can select the right parenthesis character by pressing and holding the "Y" key (illustrated as the dotted circle 1120), and while maintaining his touch, performing a diagonal gesture across the face of the key in the bottom-left direction (illustrated as the dotted arrow 1122). As the user is performing the gesture, the right parenthesis character is moved closer and closer to the center of the key face (e.g., to simulate the user "dragging" the right parenthesis character towards the center of the key face). As shown in FIG. 11F, at the end of the gesture (illustrated as the dotted circle 1120), the virtual keyboard indicates that the right parenthesis character has been selected by displaying the right parenthesis character within the key face (e.g., simulating that the right parenthesis character has been "dragged" into the center of the key face). The user can then release his touch to confirm the selection. Alternatively, the user can select the left parenthesis character by pressing and holding the "Y" key, and while maintaining his touch, performing a diagonal gesture across the face of the key in the bottom-right direction. At the end of the gesture, the virtual keyboard 1150 can indicate that the left parenthesis character has been selected by displaying the left parenthesis character within the key face (e.g., simulating that the left parenthesis character has been "dragged" into the center of the key face). The user can then release his touch to confirm the selection.

Figure 11E:
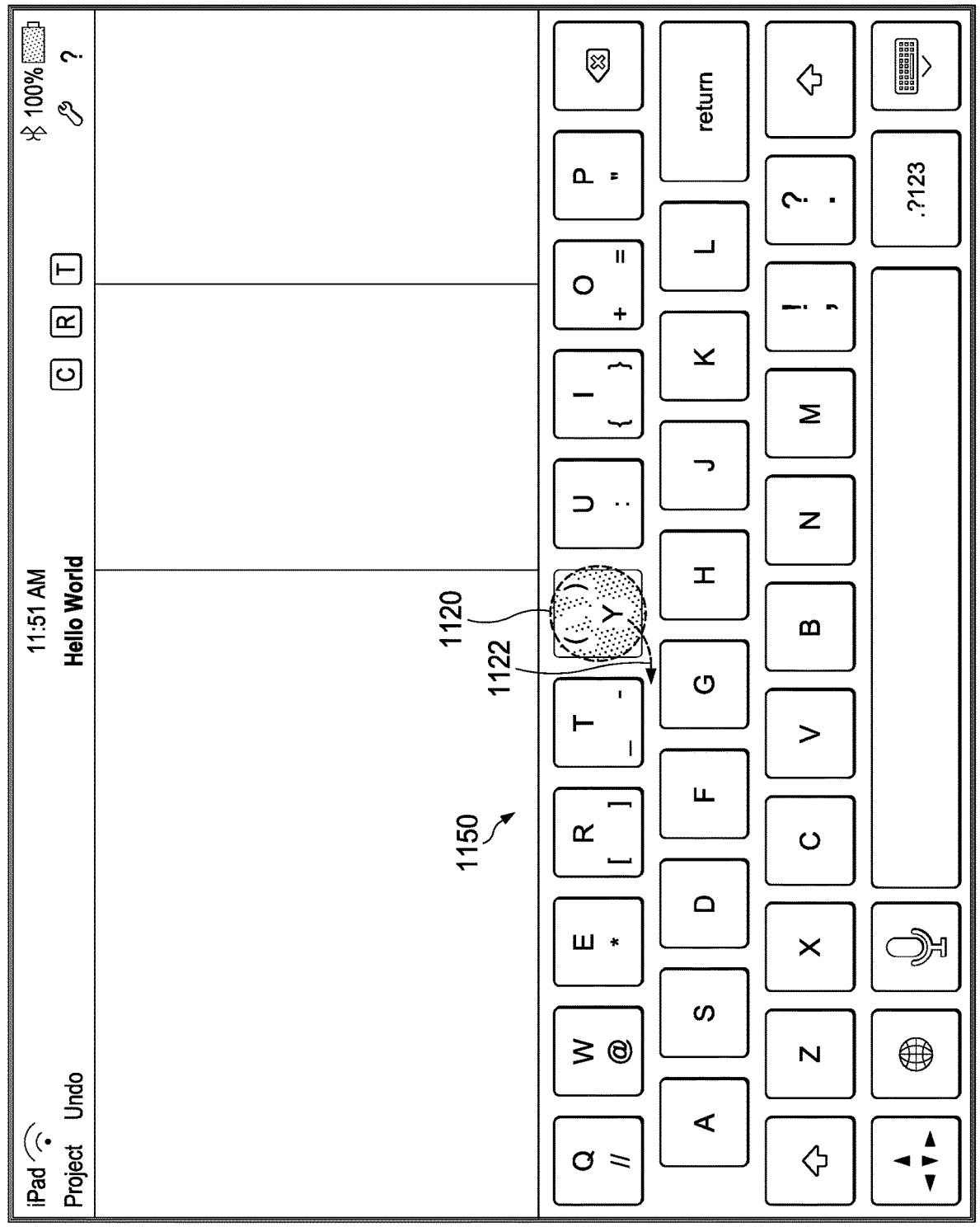
FIGS. 11E and F illustrate an example key of another virtual keyboard.
Figure 11F:
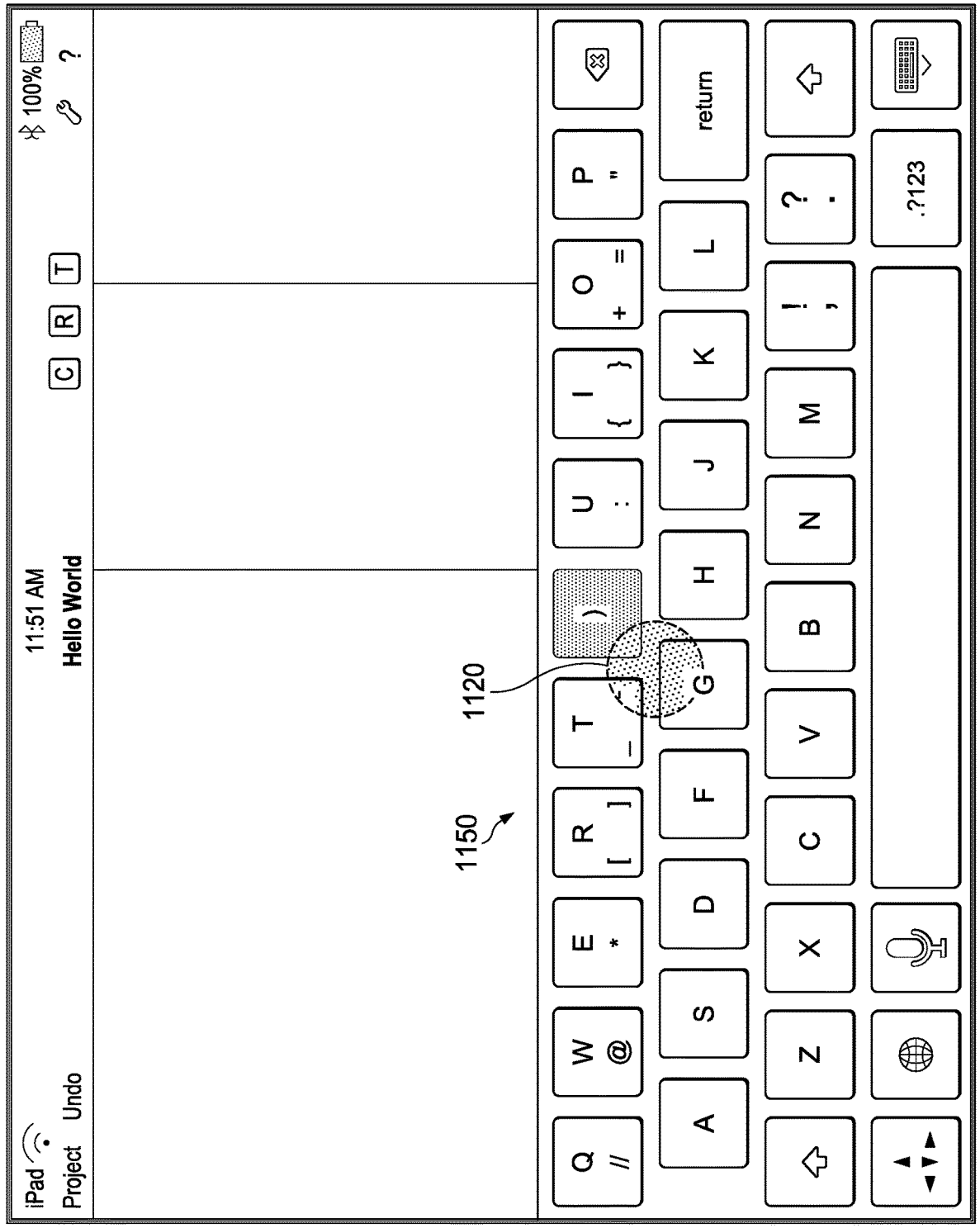

In the example shown in FIGS. 11E and 11F, alternate characters are shown above the primary character. However, this is merely an illustrative example. In some cases, alternate characters can be shown below, to the left, and/or to the right of the primary character. Accordingly, a user can perform a sliding gesture away a particular alternate character to select that alternate character (e.g., to "drag" the alternative character towards the center of the key face).

Figure 12:
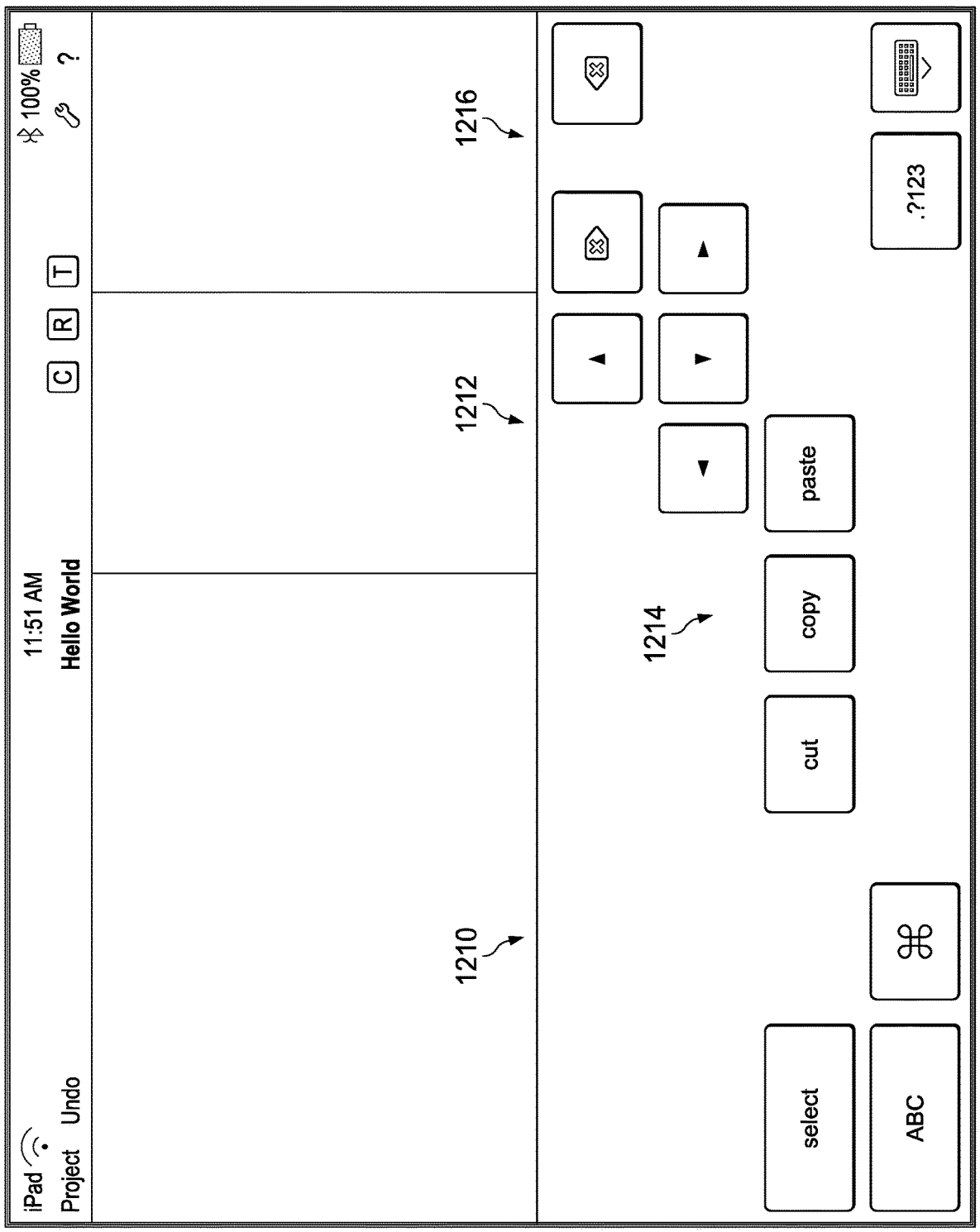
FIG. 12 illustrates an example user interface including another virtual keyboard.

In some cases, in addition to having keys representing characters, a virtual keyboard can also include keys representing non-character inputs. For example, FIG. 12 shows an interface 1200 with a virtual keyboard 1210 having directional keys 1212 (e.g., up, down, left, and right) that allow a user to input directional commands (e.g., commands to move a cursor). A virtual keyboard 1210 can also include keys 1214 representing "cut," "copy," and "paste" commands that allow a user to transfer or reposition text between different locations. A virtual keyboard 1210 can also include keys 1216 representing backspace and delete commands that allow to user to remove text (e.g., to remove text behind a cursor or in front of a cursor, respectively). In some cases, a virtual keyboard can include several different sets of keys (e.g., one or more sets of character keys, and one or more sets of non-character command keys), and the user can switch between each of these sets of keys by selecting an appropriate keyset selection element on the virtual keyboard (e.g., by pressing a button to toggle or cycle between key sets).

Although diagonal gestures are described above, other gestures are also possible, depending on the implementation. For example, in some cases, each key on the virtual keyboard can represent multiple different characters, and a user can select from among these characters by pressing and holding a key, and performing a vertical gesture (e.g., a downward sliding gesture along the touch-sensitive surface). The user then releases his touch to confirm the selection.

Figure 13A:
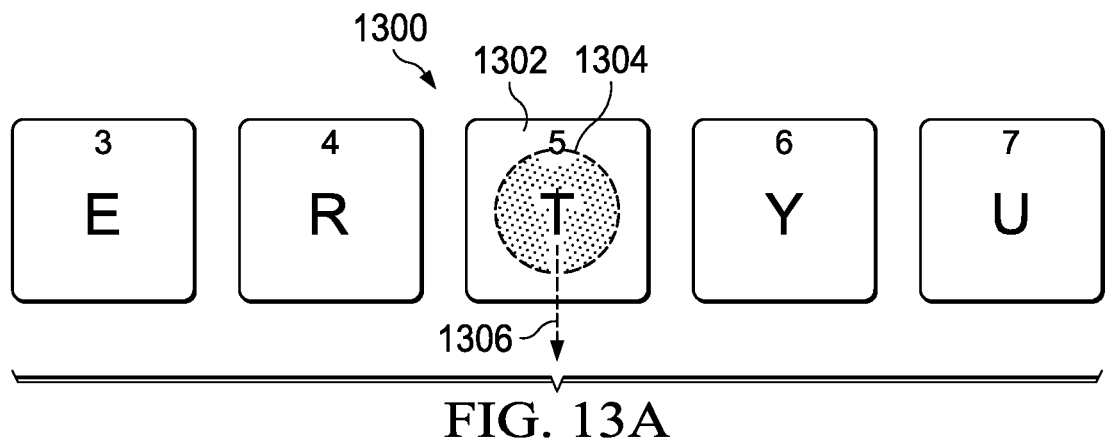
FIGS. 13A-C illustrate example keys of another virtual keyboard.
Figure 13B:
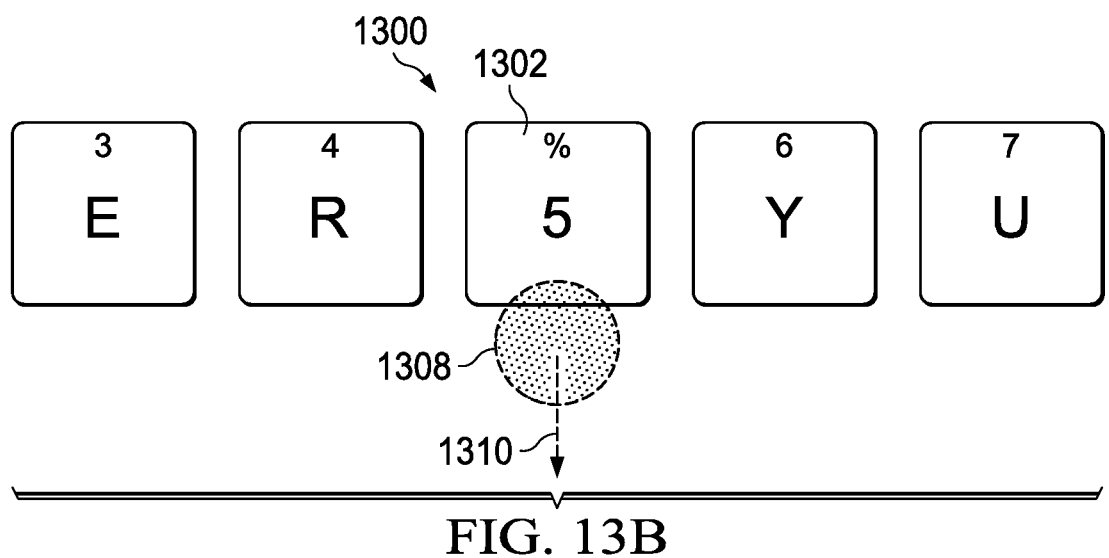
Figure 13C:
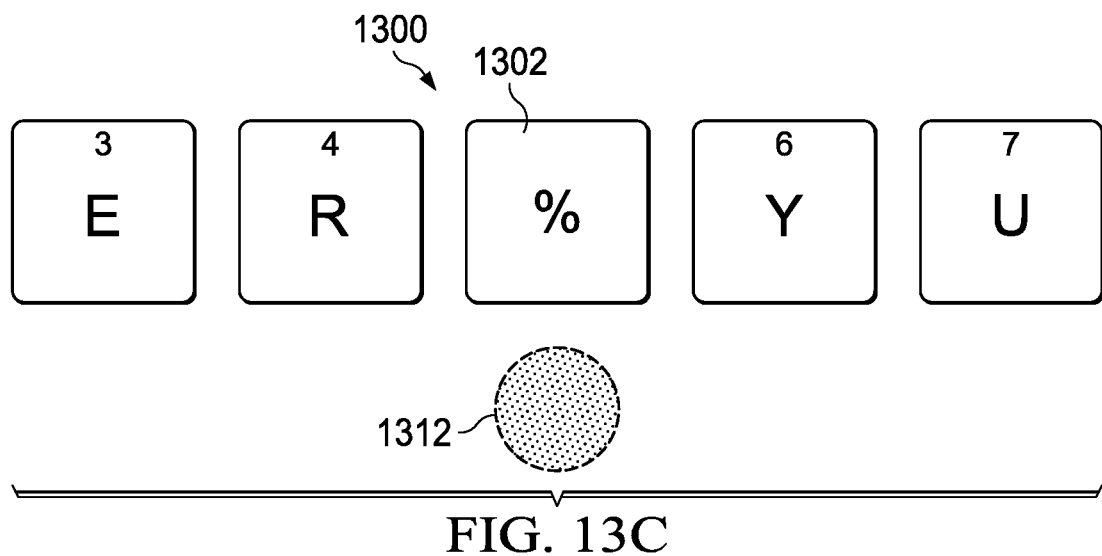

For example, as shown in FIG. 13A, a user interface can include a virtual keyboard 1300 (a portion of which is shown in FIG. 13A) having several keys 1302. One of the more of the keys 1302 can represent several different characters. In this example, the "T" key represents three different characters: a "T" character, a "5" character, and a "%" character. The user can select the "T" character by tapping on the "T" key. Alternatively, the user can select the "5" character by pressing and holding the "T" key (illustrated as the dotted circle 1304), and while maintaining his touch, performing a downward gesture (illustrated as the dotted arrow 1306). As the user is performing the gesture, the "5" character is moved closer and closer to the center of the key face (e.g., to simulate the user "dragging" the "5" character" towards the center of the key face). As shown in FIG. 13B, at the end of the gesture (illustrated as the dotted circle 1308), the virtual keyboard 1300 indicates that the "5" character has been selected by displaying "5" more prominently on the key 1302 (e.g., by displaying "5" such that it is larger than the other characters on the key). The user can then release his touch to confirm the selection. Alternatively, the user can select the "%" character by not releasing his touch when the "5" character is shown, and instead continuing the downward gesture (illustrated as the dotted arrow 1310). As the user is performing the gesture, the "%" character is moved closer and closer to the center of the key face (e.g., to simulate the user "dragging" the "%" character" towards the center of the key face). As shown in FIG. 13C, at the end of the gesture (illustrated as the dotted circle 1312), the virtual keyboard 1300 can indicate that the "%" character has been selected by displaying "%" more prominently on the key 1302 (e.g., by displaying "%" such that it is the only character on the key). The user can then release his touch to confirm the selection. In this manner, a single key can represent characters on several different "levels," and allow a user to select one of the characters by navigating to one of the levels using a downward gesture.

Although a key having three example levels is described above, this is merely an illustrative example. In practice, a key can have any number of different levels (e.g., one two, three, four, five, six, or more), depending on the implementation. Further, although the above examples describes that a selected character is displayed on a key such that it is larger than the other characters on the key, in some cases, a selected character can be indicated in other ways. For example, in some cases, a selected character can be the only character on the key, or differently highlighted, colored, weighted (e.g., indicated in bold), and/or animated than other characters on the key. Further, although the example depicts a user selecting an alternate character by performing a gesture away from a particular alternate character, in some cases, the user can select an alternate character by performing a gesture towards a particular alternate character.

In some cases, a user can navigate through a sequence of software code by pressing and holding a portion of the software code, and while maintaining his touch, dragging his finger or stylus along the software code. As the user drags his finger or stylus along the software code, the user interface can select and highlight the programming constructs that are beneath the user's finger or stylus. The user interface can also display a contextual copy of the selected software code (e.g., the selected software code and the surrounding software code) above the user's finger or stylus, such that the user can more readily see what code has been selected in an unobscured manner.

Figure 14:
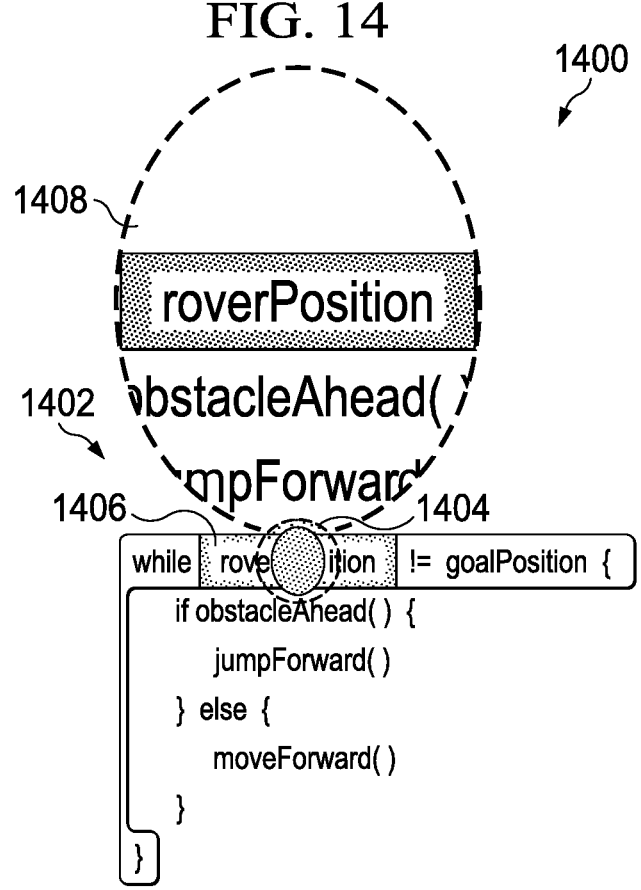
FIG. 14 illustrates an example user interface for presenting and selecting sequences of code.

For example, FIG. 14 shows an example user interface 1400 presenting a sequence of code 1402. When the user presses and maintains his touch on the sequence of code (illustrated as the dotted circle 1404), the user interface selects the programming construct beneath the user's finger or stylus, and indicates the selection using a highlight 1406. The user interface 1400 also presents a contextual copy 1408 of the selected software code (e.g., the selected software code and the surrounding software code) above the user's finger or stylus, such that the user can more readily see what code has been selected. As the user maintains his touch and slides his finger or stylus along the software code, the user interface 1400 highlights the programming construct beneath the user's finger or stylus, and updates the contextual copy 1408 to display the new selection. In this manner, a user can select programming constructs by simply pressing the user interface 1400, and while maintaining his touch, dragging his finger or stylus until a desired programming construct is selected.

Figure 15A:
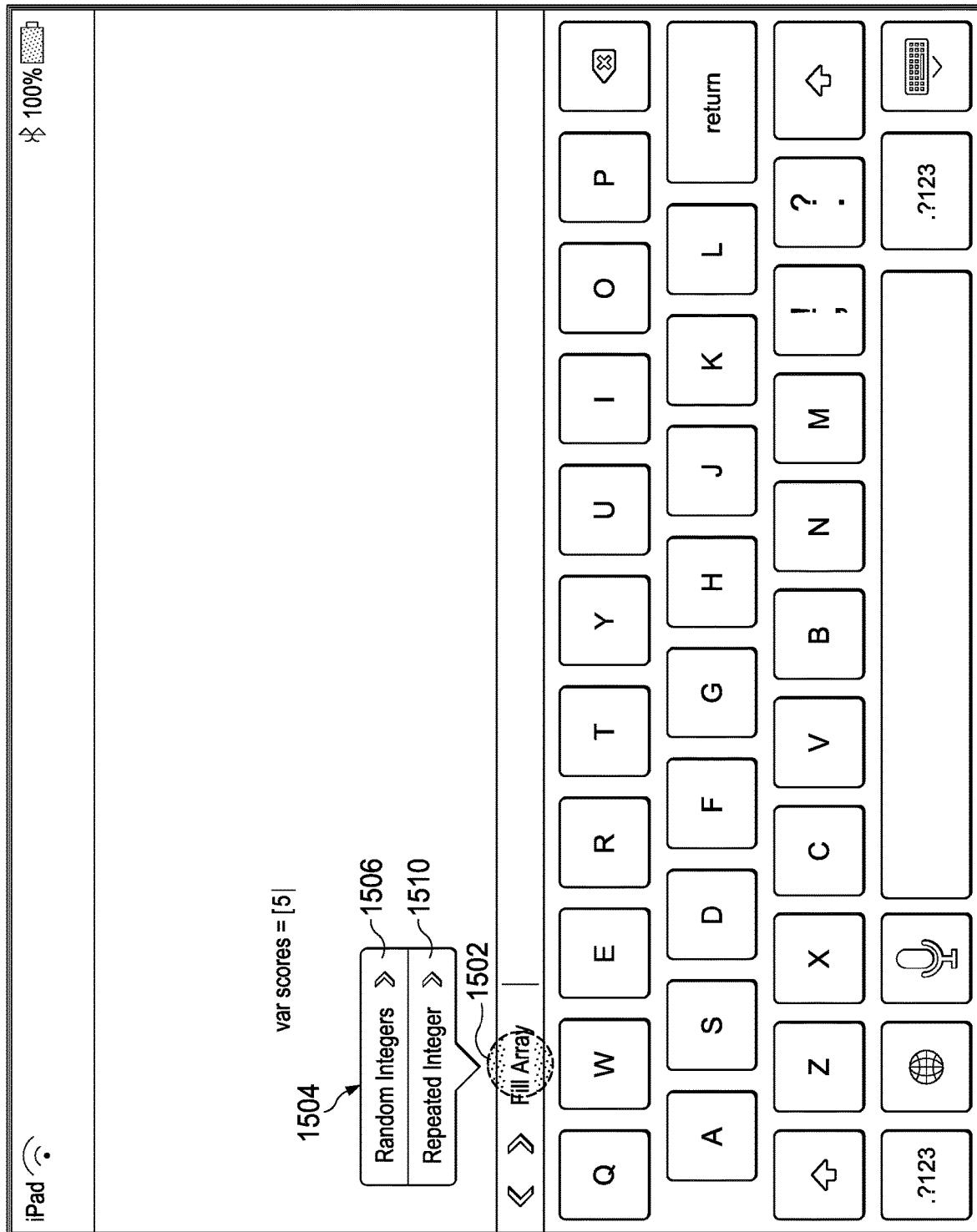
Figure 15B:
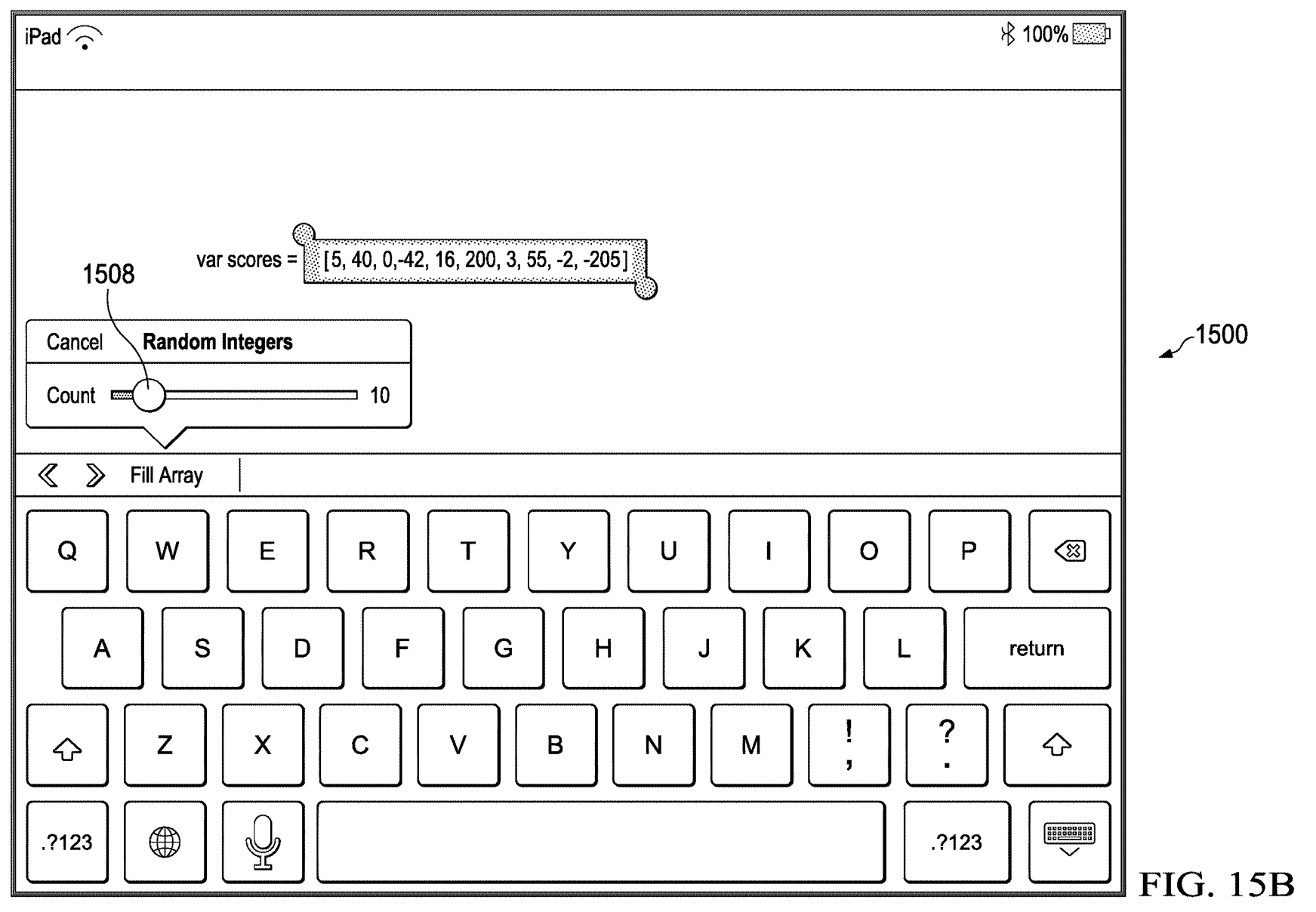
Figure 15C:
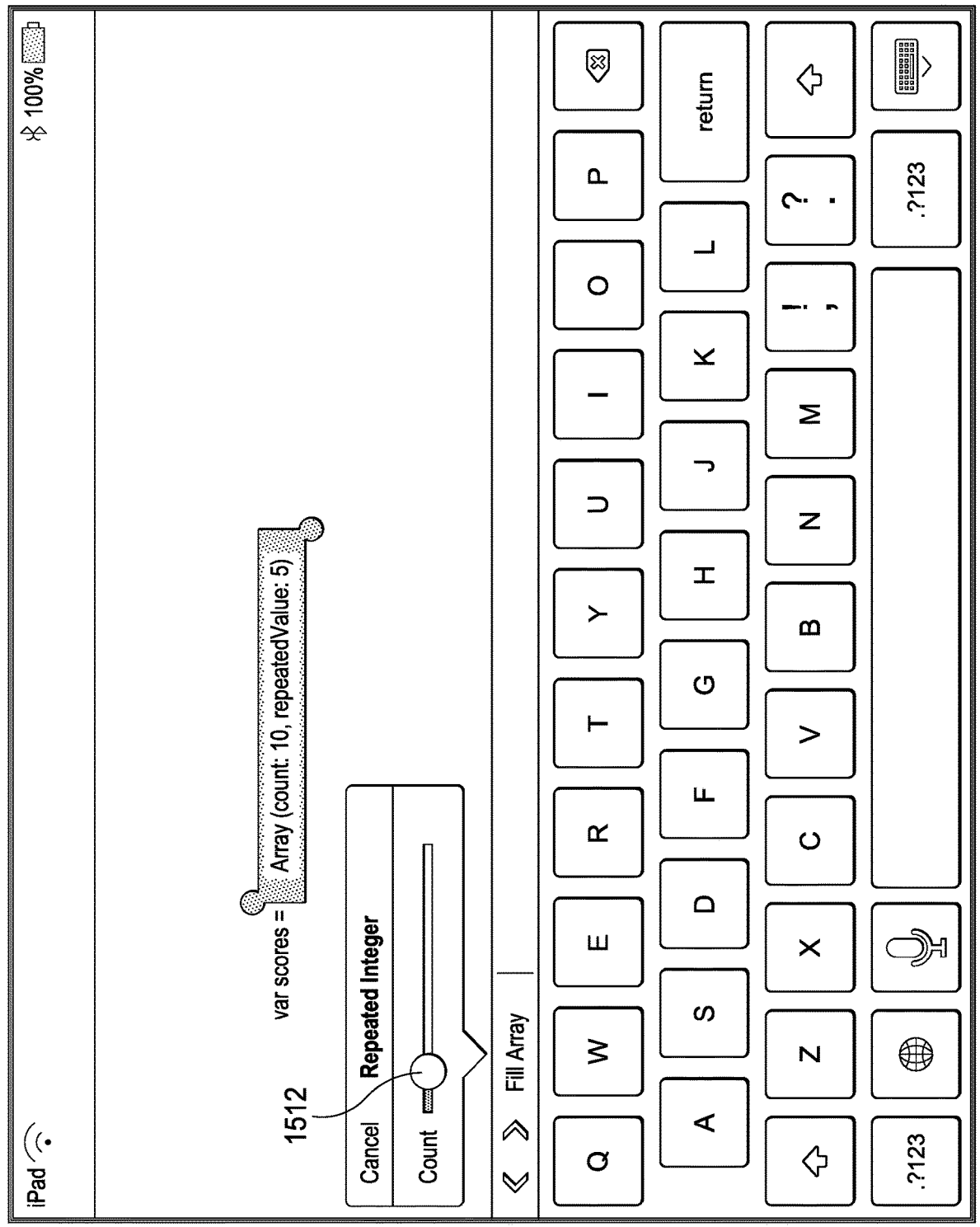

In some cases, a sequence of code can include one or more arrays (e.g., a series of objects sharing a similar size and type). A user can add objects to the array using a touch-based interface. For example, as shown in FIG. 15A, a user interface 1500 includes a sequence of code that includes a partially defined array. The user can fill the array by positioning the cursor within the array, and then selecting a "fill array" option (e.g., by tapping the "fill array" option, as illustrated as the dotted circle 1502). In response, the user interface 1500 displays a list 1504 of options to fill the array. In this example, the array is an array of integers. Accordingly, the user can select the "random integers" option 1506 to fill the array with randomly generated integers (e.g., as shown in FIG. 15B). The user interface 1500 also presents the user with an adjustment element 1508 that allows the user to increase or decrease the size of the array (e.g., by dragging the adjustment element 1508 to the right or left to increase or decrease the size of the array, respectively). The user can also select the "repeated integer" option 1510 to fill the array with a repeated series of integers (e.g., as shown in FIG. 15C). The user interface also presents the user with an adjustment element 1512 that allows the user to increase or decrease the size of the array (e.g., by dragging the adjustment element 1512 to the right or left to increase or decrease the size of the array, respectively).

In some cases, the user can insert additional objects into an array by positioning a cursor or highlight box over an existing object of an array. The user can then select an option to add an additional object to an array, and while maintaining his touch, drag his finger or stylus in a left or right direction. When the user releases his touch, the user interface can update to include an additional object in the array.

Figure 16A:
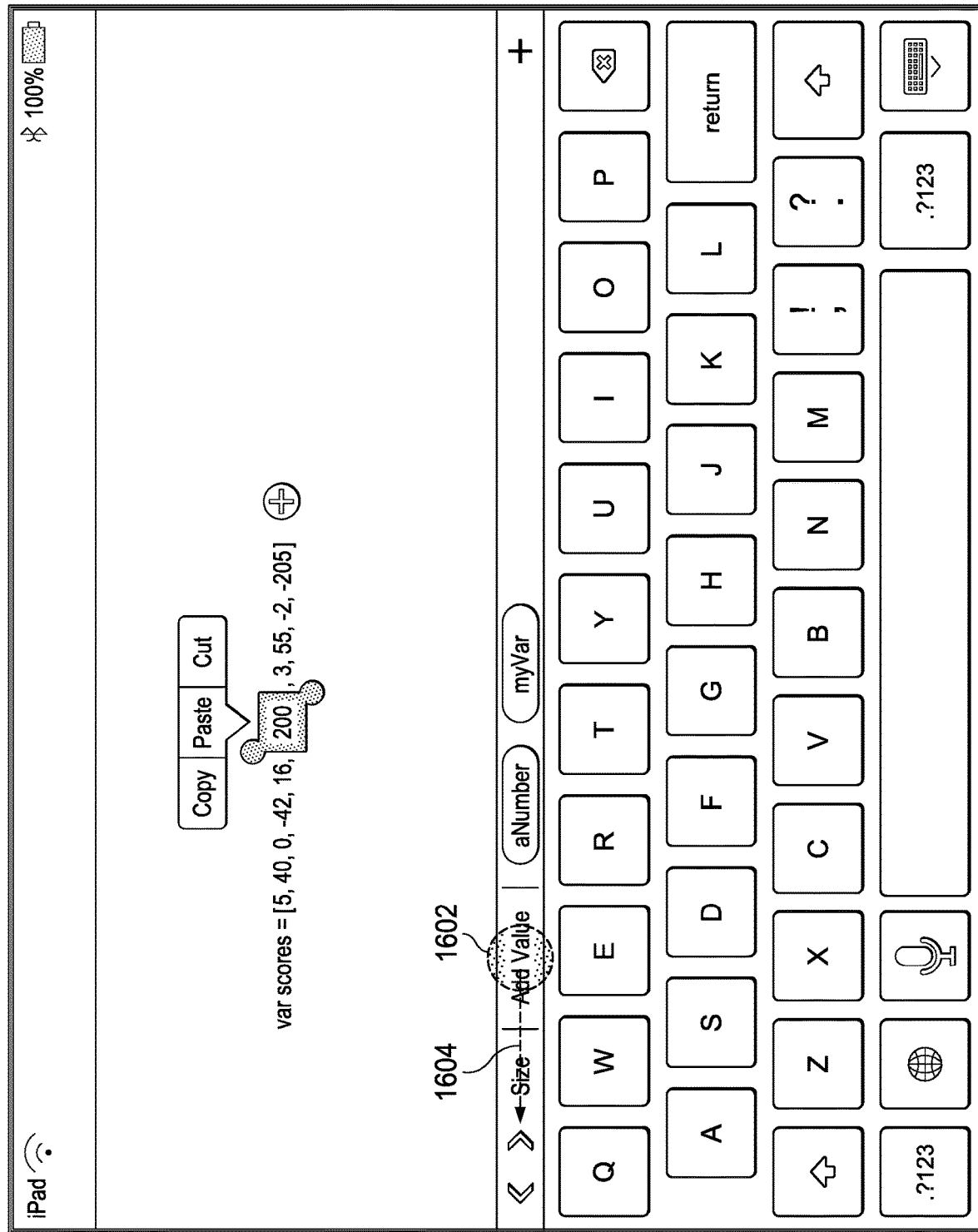
FIGS. 16A and 16B illustrate an example user interface for adding objects into an array.
Figure 16B:
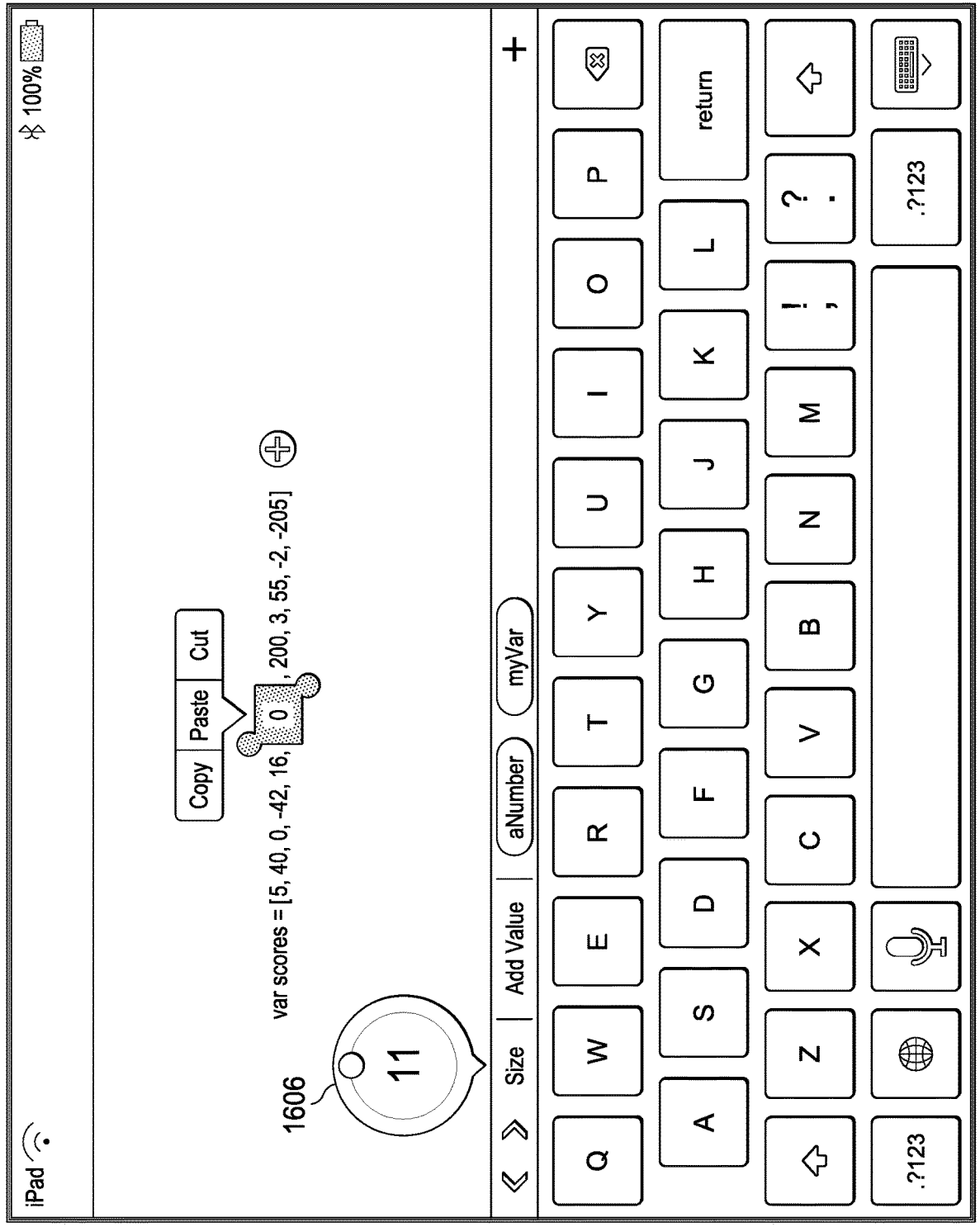

For example, as shown in FIG. 16A, a user interface 1600 can include a sequence of code having an array of integers. A user can select one of the integers in the array (e.g., by pressing, holding, and releasing one of the integers). The user can then insert an additional integer before the selected integer by pressing and holding an "add value" option (illustrated as the dotted circle 1602). The user maintains his touch, and performs a leftward gesture (illustrated as the dotted arrow 1604). As shown in FIG. 16B, when the user releases his touch, the user interface 1600 updates to include an additional object before the selected object. In some cases, the user interface 1600 can also present a rotary element 1606 (e.g., similar to the rotary elements shown and described with respect to FIGS. 2D-E and FIGS. 4A-b) to allow the user to modify the additional object without using a physical or virtual keyboard.

Similarly, the user can then insert an additional integer after the selected integer by pressing and holding the "add value" option. The user maintains his touch, and performs a leftward gesture. When the user releases his touch, the user interface 1600 updates to include an additional object after the selected object. Thus, a user can insert additional objects using an intuitive directional gesture.

In some cases, a user can change the size of an array by dragging an end bracket associated with the array. For example, a user can drag the end bracket away from the array's beginning bracket to increase the size of the array, or drag the end bracket towards the array's beginning bracket to decrease the size of the array.

Figure 17A:
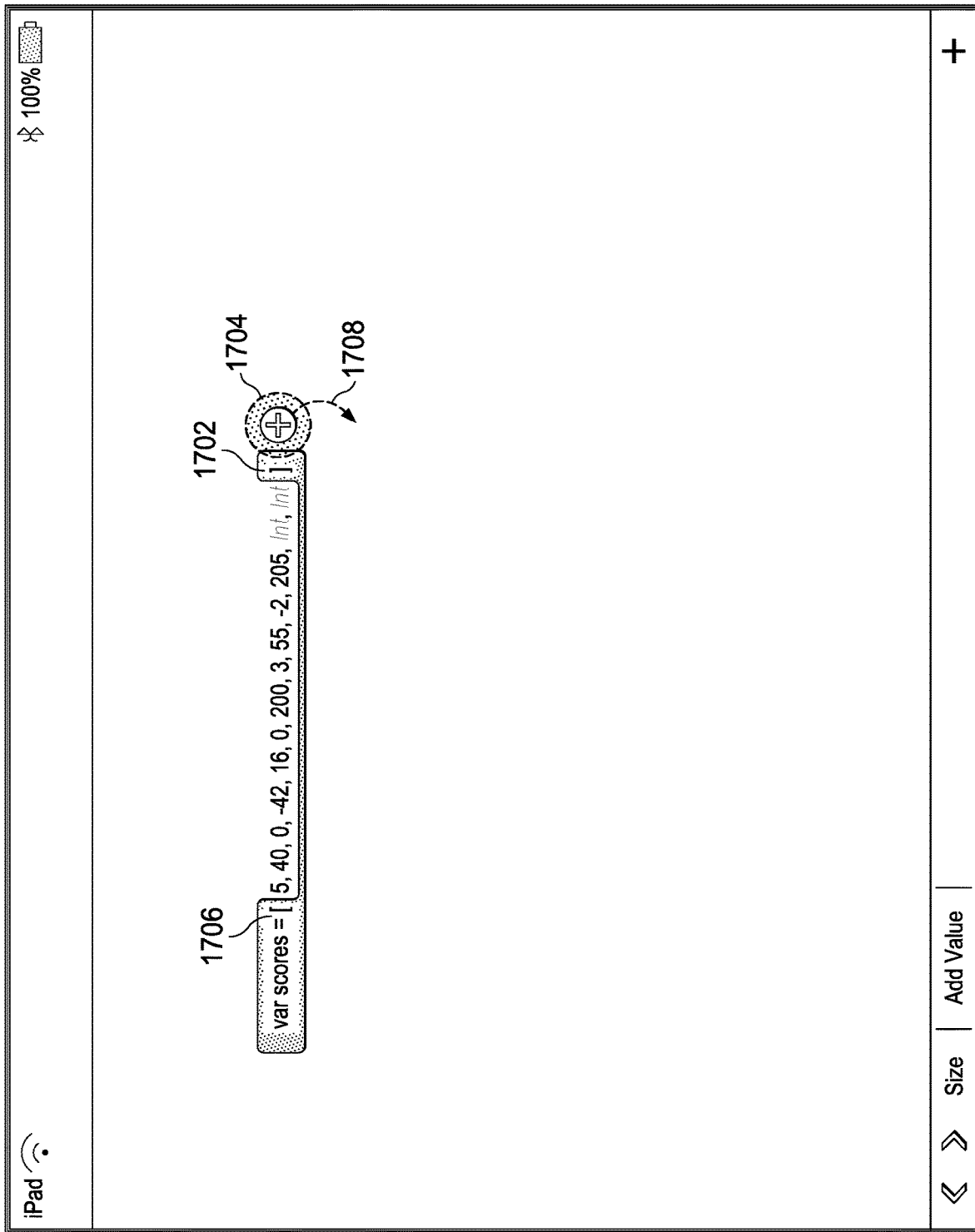
Figure 17B:
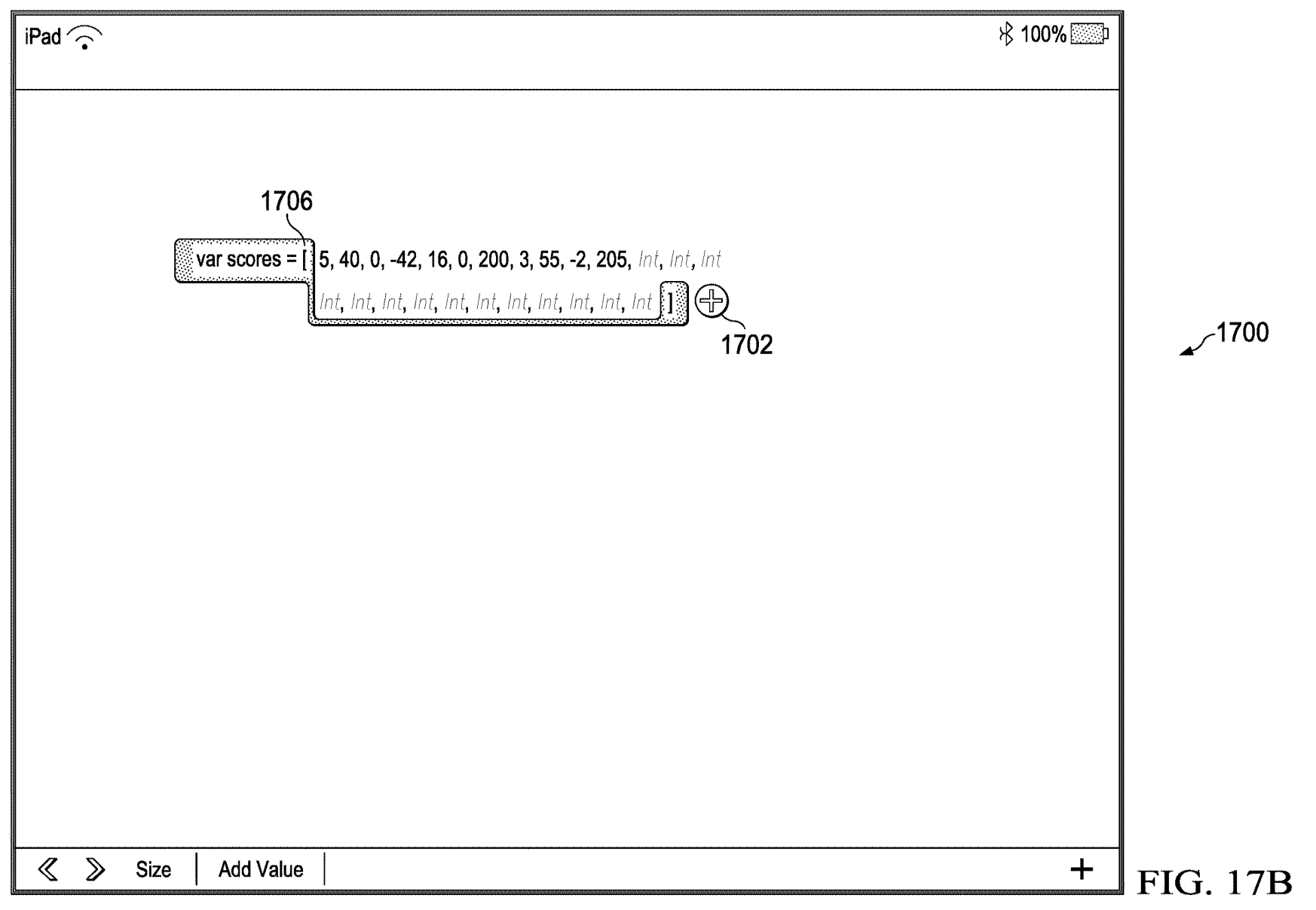

For example, as shown in FIG. 17A, a user interface 1700 can include a sequence of code having an array of integers. The user interface can select an end bracket 1702 of the array (illustrated as a dotted circle 1704), and drag it away from a beginning bracket 1706 of the array (e.g., downward) to create more "space" for objects in the array (illustrated as the dotted arrow 1708). As shown in FIG. 17B, when the user releases his touch, the user interface 1700 updates by increasing the number of objects in the array. Similarly, a user can reduce the number of objects in an array by selecting the end bracket 1702 and dragging it towards the beginning bracket 1702 to reduce the amount of "space" for objects in the array. When the user releases his touch, the user interface 1700 can update by decreasing the number of objects in the array. In this manner, a user can adjust the size of an array in an intuitive and touch-based manner.

Although integer arrays are shown and described, these are merely illustrative examples. In practice, any type of array (e.g., a character array, a floating-point array, a Boolean array, or any other type of array) also can be filled and modified in a similar manner.

In some cases, a user can add blank lines (e.g., line breaks) in a sequence to code by performing a reverse-pinching gesture (e.g., by moving two fingers or styluses away from each other) over a sequence of code. As the user's fingers or styluses are moved further and further apart, additional lines breaks are added between the fingers or styluses. In a similar manner, a user can remove blank links (e.g., deleting line breaks) in a sequence to code by performing a pinching gesture (e.g., by moving two fingers or styluses towards from each other) over a sequence of code. As the user's fingers or styluses are moved closer and closer together, lines breaks are removed from between the fingers or styluses.

Figure 25A:
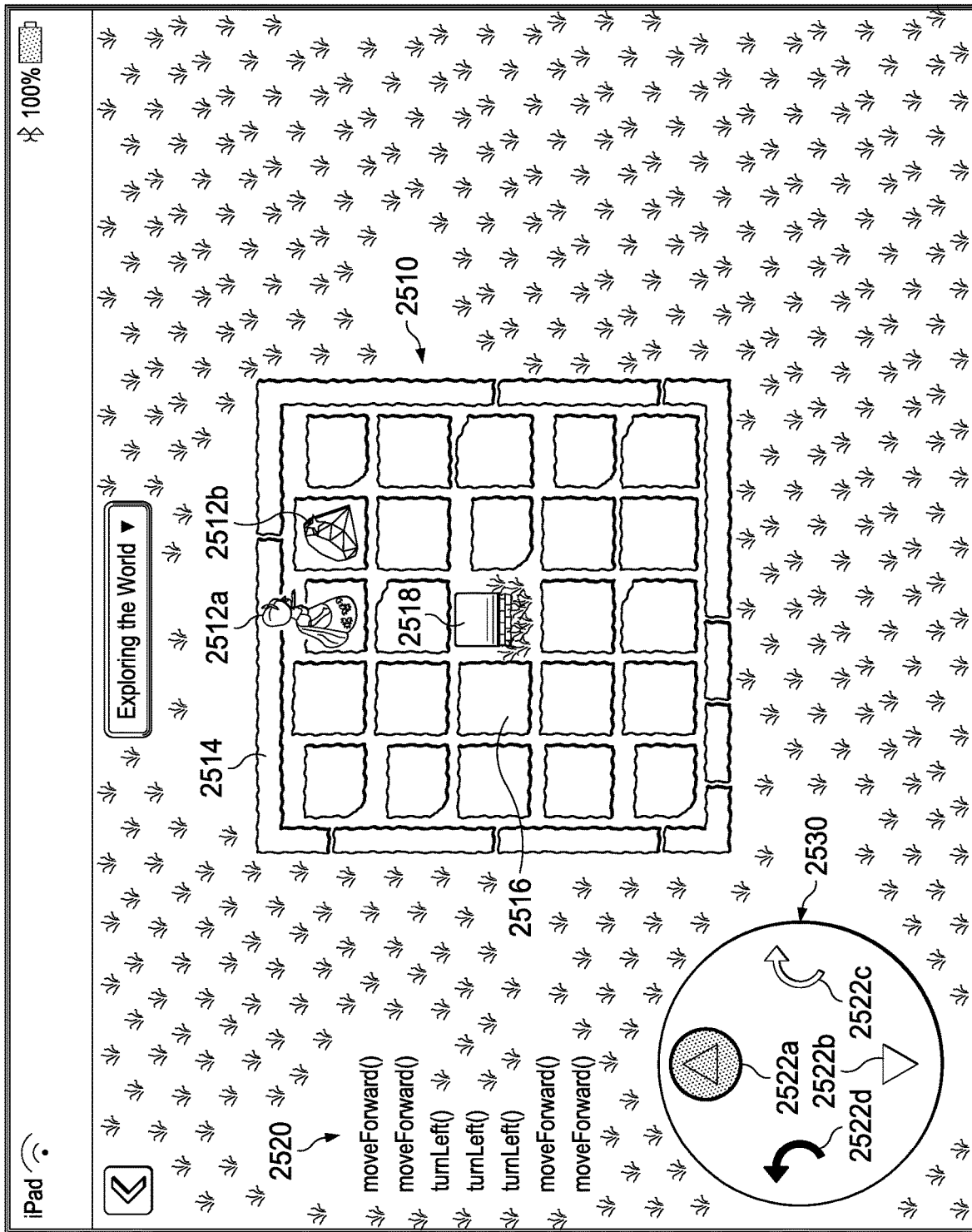
FIGS. 25A and 25B illustrate a user interface for a touch-based, interactive learning environment for software programming.

FIG. 25A illustrates another example user interface 2500 for a touch-based, interactive learning environment for software programming. The user interface 2500 can present educational guides or other materials pertaining to a lesson plan in the form of an interactive game. In the example lesson shown, the user is learning how to impart motion or animate a figure (e.g., a figure of a princess), and how to navigate the figure through an environment to reach an objective (e.g., a gem). In some cases, the user interface 200 can be presented as a part of the user interface 106a-c described with respect to FIG. 1.

The user interface 2500 includes a game portion 2510, a control portion 2520, and a code portion 2530.

In general, a game portion 2510 depicts various interactive game elements within a game environment. In this example, the game portion 2510 depicts a player game element 2512a (e.g., a figure of a princess), and a non-player game element 2512b (e.g., a gem), each positioned within a game environment 2514 (e.g., a maze). The game environment 2514 includes several spaces 2516 arranged in a grid, and an obstacle 2518. In this example, the objective of the game is to navigate the player game element 2512a through the spaces 2516 of the game environment 2514 until it reaches the non-player element 2512b.

The player game element 2512a is controlled by the user (e.g., a "player character"). For example, the user can interact with the control portion 2520 to manipulate the player game element 2512a within the game environment 2514 (e.g., to navigate or guide the player game element 2512a through the game environment 2514). Example ways that the user can manipulate the player game element 2512a are described in further detail below. Although a player game element 2512a is depicted as a figure of a princess in FIG. 25A, this is merely an illustrative example. The appearance of the player game element 2512a can differ, depending on the implementation. For example, in some cases, the player game element 2512a can be depicted as a robot, a vehicle, a shape, or any other figure.

As noted above, the objective of the game is to navigate the player game element 2512a through the spaces 2516 of the game environment 2514 until it reaches the non-player element 2512b (e.g., the "objective" element). As an example, the user can manipulate the player game element so that the position of the player game element 2512a coincides with the non-player game element 2512b (e.g., so that they occupy the same space in the game environment 2514). In some cases, after the player game element 2512a reaches the non-player element 2512b, the non-player element 2512b can be removed from the game environment 2514 (e.g., to simulate the player game element 2512a collecting or picking up the non-player element 2512b). Although one non-player game element 2512b is shown, this is merely an illustrative example. In some cases, there may be any number of non-player game elements (e.g., one, two, three, four, or any other number), and the user can manipulate the player game element 2512a to "collect" some or all of the non-player game elements. For example, there may be multiple non-player game elements, and the user may be required to collect all of the non-player game elements to succeed in the game. As another example, there may be multiple non-player game elements, and the user may be required to collect at least a minimum number of the non-player game elements to succeed in the game (e.g., collect at least 4 out of 8 of the non-player game elements). As another example, there may be multiple non-player game elements, and the user may be required to collect a specific number of the non-player game elements to succeed in the game (e.g., collect exactly 6 out of 8 of the non-player game elements).

The obstacle 2518 impedes the progress of the player game element 2512. For example, the obstacle 2518 can occupy a space in the game environment 2514, and prevent the player game element 2512 from occupying that space. Thus, the user must guide the player game element 2512 around the obstacle 2518 to reach each of the objectives. Although an obstacle 2518 is depicted as a pillar in FIG. 25A, this is merely an illustrative example. The appearance of the obstacle 2518 can differ, depending on the implementation. For example, in some cases, the obstacle 2518 can be depicted as a wall, a rock, a tree, or any other object. Further, although one obstacle 2518 is shown, this is merely an illustrative example. In some cases, there may be any number of obstacles (e.g., zero, one, two, three, four, or any other number), and the user can manipulate the player game element 2512a to avoid each of these obstacles in pursuit of the objectives.

In some cases, the game environment 2514 can include additional game elements that either impede or assist the user in reaching each of the objectives.

For example, in some cases, the game environment 2514 can include one or more switch elements that modify the game environment 2514. For instance, the user can navigate the player game element 2512 to a switch element (e.g., so that the player game element 2512 and the switch element occupy the same space in the game environment 2514). In response, the game environment 2514 can be modified to remove one or more obstacles (e.g., to simulate the opening of a door, the retraction of a retractable wall, the destruction of an obstacle, and so forth), move one or more obstacles (e.g., to simulate the movement of a moveable wall, the shifting of an object, and so forth), and/or add one or more obstacles (e.g., to simulate the appearance of an object). In some cases, the switch element can simulate a pressure pad switch (e.g., by modifying the game environment in response to the user's character "stepping" on the switch).

As another example, in some cases, the game environment can include one or more lock elements that impede the movement of the player game element 2514 until it is "unlocked" using a corresponding key element. For instance, if the user navigates the player game element 2512 to the lock element, the lock element might act as an obstacle, and impede the progress of the player game element 2512. However, if the user has previously collected a corresponding key element using the player game element 2514 (e.g., by previously manipulating the player game element 2512 so that the player game element 2512 and the key element occupied the same space in the game environment 2514), the lock element can be removed and allow free passage (e.g., to simulate the use of a key to unlock a locked door).

As another example, in some cases, the game environment can include one or more companion character elements that assist the user in reaching the objectives. For instance, if the user navigates the player game element 2512 to the companion character element, the companion character element can subsequently follow the player game element 2512 as it moves throughout the game environment 2514 (e.g., to simulate a companion following the user's character). The companion character element can assist the user's character in various ways. For example, the companion character can remove one or more obstacles on behalf of the player (e.g., to simulate a powerful character destroying one or more obstacles). As another example, the companion character can move one or more obstacles on behalf of the player (e.g., to simulate a strong character moving one or more obstacles). As another example, the companion character can open one or more lock elements (e.g., to simulate a locksmith defeating a locked door). As another example, the companion character can actuate one or more switch elements (e.g., to simulate a skilled character operating a control panel). As another example, the companion character can move the player game element 2512 (e.g., to simulate a wizard teleporting the user's character to a new location). As another example, the companion character can reveal a path for the play game element 2512 (e.g., to simulate a builder constructing a bridge for the user's character). In some cases, the companion character can automatically perform certain tasks without direct instructions from the user (e.g., automatically "construct" a bridge when the user's character is next to a particular obstacle). In some cases, the companion character can perform certain tasks based on instructions provided by the user (e.g., "construct" a bridge when the user specifically commands the companion character to do so). Although example companion characters (and their corresponding effects) are described, these are merely illustrative examples. Other companion characters and effects are possible, depending on the implementation.

In some cases, the game environment can include one or more stair elements. If the user navigates the player game element 2512 to the stair element, the game environment 2514 can be modified, such that the game environment 2514 takes on a new appearance and layout (e.g., by adding, removing, and/or repositioning each of the elements of the game environment 2514). This can be used to simulate the user's character walking up or down a flight of stairs, and accessing a new floor or level of a building. If the user subsequently navigates to the stair element again, the game environment 2514 can be reverted to the original arrangement. This can be used to simulate the user's character returning to the original floor or level of the building.

Although an example game portion 2510 is shown, this is merely an illustrative example. In practice, a game portion 2510 can include different arrangements of game elements and game environments. Further, the game elements and game environments can also different (e.g., different in number, size, shape, appearance, and so forth), depending on the implementation.

The control portion 2520 depicts one or more commands for manipulating the player game element 2512a within the game environment 2514. In this example, the control portion 2520 depicts a "forward" command 2522a to move the player game element 2512a forward, a "backwards" command 2522b to move the player game element 2512a backward, a "clockwise" command 2522c to rotate the play game element 2512a clockwise, and a "counter-clockwise" command 2522d to move the play game element 2512a counter-clockwise.

A user can select one of the commands depicted in the control portion 2520 (e.g., by tapping on or otherwise selecting a particular command), and in response, the game portion 2510 updates in accordance with the selected command. For example, if the user selects the "forward" command 2522a, the game portion 2510 updates to depict the player game element 2512a moving forward within the game environment 2514 (e.g., forward one step). As another example, if the user selects the "clockwise" command 2522c, the game portion 2510 updates to depict the player game element 2512a rotating clockwise within the game environment 2514 (e.g., rotating 90 degrees clockwise while remaining in the same space). If the user selects a command that cannot be performed (e.g., if the user selects a command that would cause the player game element 2512a to collide with the obstacle 2518 or exit the boundaries of the game environment 2514), the game portion 2510 can prevent the command from being executed, and indicate the error to the user (e.g., by presenting an error message, sound effect, or animation).

Each command shown in the control portion 2520 is also associated with a respective sequence of software code. These sequences of software code can be, for example, sequences of code that can be directly executed in a programming environment, or simplified representations of sequences of software code (e.g., "pseudo-code"). In some cases, the sequences of software code can include executable or simplified function calls representing functions that are available in a programming environment. For example, the "forward" command 2522a can be associated with a pseudo-code function call "moveForward( )," the "backwards" command 2522b can be associated with a pseudo-code function call "moveBackwards( )," the "clockwise" command 2522c can be associated with a pseudo-code function call "turnRight( )," and the "counter-clockwise" command 2522d can be associated with a pseudo-code function call "turnLeft( )." The association between each command and its respective sequence of code can be defined, for example, by a developer of the lesson plan (e.g., an instructor or a lesson plan author). Further, each pseudo-code function call can correspond to a respective executable sequence of code defined by the developer of the lesson plan. In turn, each executable sequence of code, when executed, can have a corresponding effect on the game environment 2514. For example, the pseudo-code function call "moveForward( )" can correspond to a executable sequence of code that, when executed, cases the player game element 2512a to move forward. As another example, the pseudo-code function call "moveBackwards( )" can correspond to a executable sequence of code that, when executed, cases the player game element 2512a to move backwards. In some cases, the pseudo-code function calls can depict a simplified or abstracted version of an underlying sequence of executable code, such that the user is not confused or intimidated by the underlying code.

When the user select one of the commands depicted in the control portion 2520, the code portion 2530 updates to display the sequence of software code associated with the selected command. For example, if the user selects the "forward" command 2522a, the game portion 2510 updates to depict the player game element 2512a moving forward within the game environment 2514, and the control portion 2530 updates to display the pseudo-code function call "moveForward( )." If the user subsequently selects the "counter-clockwise" command 2522d, the game portion 2510 updates to depict the player game element 2512a turning counter-clockwise within the game environment 2514, and the control portion 2530 updates to additionally display the pseudo-code function call "turnLeft( )." Thus, the user can use the control portion 2520 to manipulate the player game element 2512a in an intuitive manner (e.g., in a manner similar to using a game controller in a video game), and associate a particular sequence of software code with each of his actions. In this manner, the user can more easily understand the effect of each sequence of software code. Similarly, the control portion 2520 can provide commands for controlling a companion character (e.g., commands corresponding to specific abilities of the companion character), and the code portion 2530 can update to display the sequence of software code associated with a selected command.

Figure 25B:
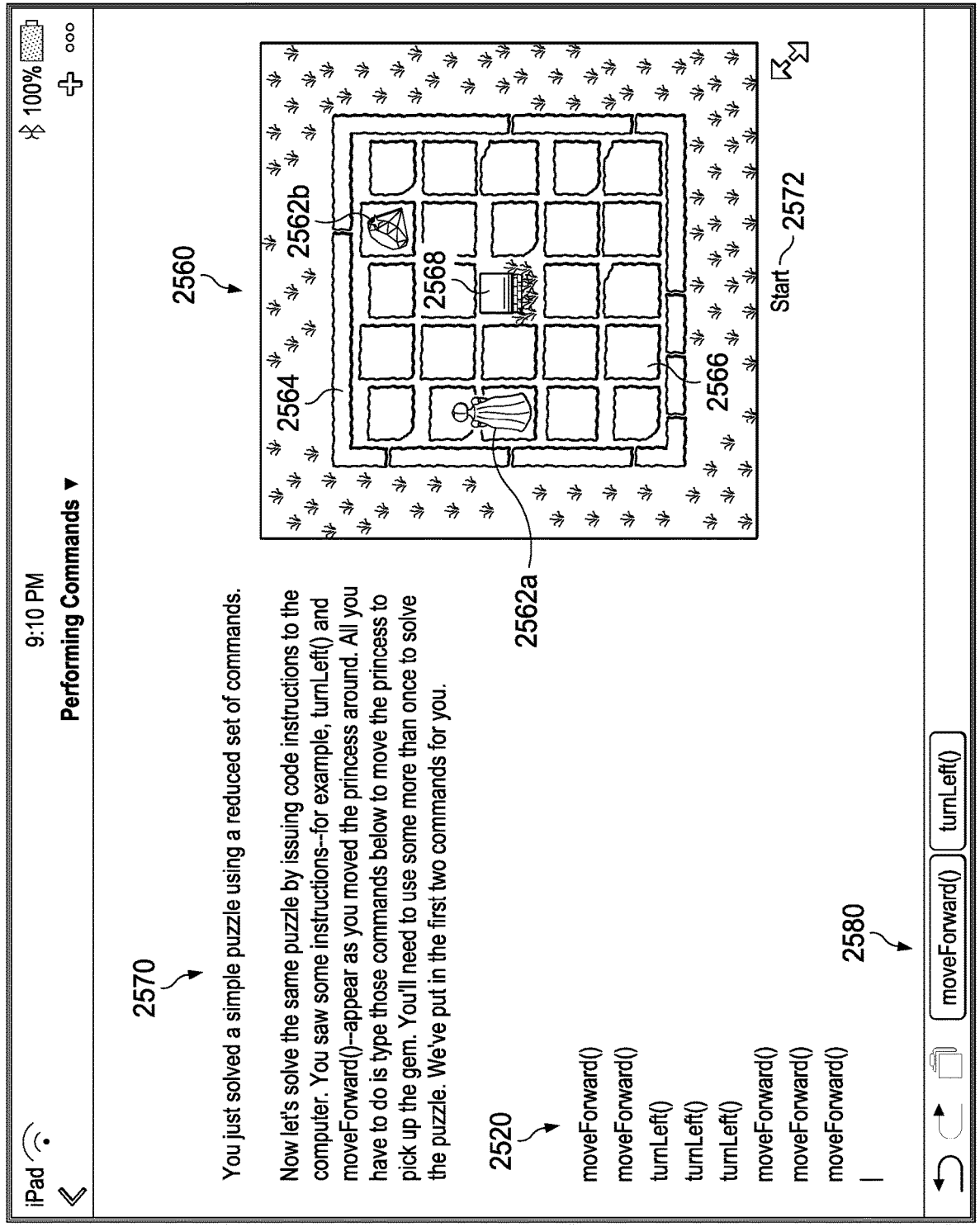

Once the player has completed the objectives of the game (e.g., by successfully moving the player game element 2512a to the non-player game element 2514b), the user is given the opportunity to apply these concepts in a programming environment. For example, as shown in FIG. 25B, once the player has completed the objectives of the game, a second user interface 2550 can be displayed to the user. In a similar manner as described above, the user interface 2550 can present instructions guiding a user through a software programming lesson in the context of an interactive game. In the example lesson shown, the user is tasked with a similar objective as described with respect to FIG. 25A: learning how to impart motion or animate a figure (e.g., a figure of a princess), and how to navigate the figure through an environment to reach an objective (e.g., a gem). Thus, the user can apply the concepts learned in playing the game to the current software programming lesson. In some cases, the user interface 2550 can be presented as a part of the user interface 106a-c described with respect to FIG. 1.

The user interface 2550 includes a game portion 2560, a code portion 2570, and a suggestion portion 2580.

The game portion 2560 is similar to that shown with respect to FIGS. 25A-B. In this example, the game portion 2560 depicts a player game element 2562a and a non-player game element 2562b, each positioned within a game environment 2564. The game environment 2564 also includes several spaces 2566 arranged in a grid, and an obstacle 2568. In a similar manner as before, the objective of the game is to navigate the player game element 2562a through the spaces 2566 of the game environment 2564 until it reaches the non-player element 2564b.

However, instead of a control portion, the user interface 2550 includes a code portion 2570. A user can input sequences of software code into the code portion 2570 to manipulate the player game element 2562a. When this code is executed, the game portion 2560 is updated in accordance with the executed code. The code can be executed automatically (e.g., as the user enters sequences of code), and/or manually (e.g., in response to a user manually specifying that the code be executed, such as by selecting a "start" command 2572). This can be similar, for example, to the functionality described with respect to FIGS. 2A-E (e.g., the code-previewing functionality provided by the code editing area and the live view area).

As an example, the user can input the pseudo-code function call "moveForward( )" into the code portion 2570. When this code is executed, the game portion 2560 updates to depict the player game element 2562a moving forward within the game environment 2564 (in a similar manner as described with respect to FIG. 25A). Similarly, the user can input the pseudo-code function call "moveForward( )" followed by the pseudo-code function call "turnLeft( )" into the code portion 2570. When this code is executed, the game portion 2560 updates to depict the player game element 2562a moving forward, then subsequently rotating counter-clockwise within the game environment 2564. Due to the similarities in manipulating the player game elements between user interface 2500 and 2550, the user can apply the concepts learned in playing a game to learning software programming.

The user can continue entering sequences of code into the code portion 2570, then executing that code to observe the code's effects on the game portion 2560. In some cases, if the executed sequences of code do not result in the user completing the objective, the user interface 2550 can indicate that the entered sequences of code was incorrect, and reset the game portion 2560 to its original position. The user can subsequently modify the sequences of code in the code portion 2570 to refine his work, then execute the code again to observe the effects of the modified code on the game portion 2560. In this manner, the user can iteratively revise his work until the objective is completed.

The suggestion portion 2580 displays suggested portions of software code that can be inserted into the code portion 2570. The suggestion portion 2580 can be similar to the universal content bar described above. For example, in some cases, the suggestion portion 2580 can suggest one or more contextually-determined sequences of software code based on a user's inputs (e.g., characters or keystroke that were previously entered by the user) and the already-entered software code. The user can select one or more of these suggested sequences of code by tapping on a particular selection or dragging a particular selection onto the code portion 2570 to insert the suggest sequence of code into the code portion 2570.

In some cases, the user interface 2550 can present hints to the user for interacting with the user interface 2550. For example, the user interface 2550 can present a hint that identifies one or more suggested sequences of software code to the user (e.g., a suggestion to try a particular sequence of code), or a hint that describes an effect of one or more suggested sequences of software code to the user. This can be useful, for example, if the user is confused about a particular aspect of the lesson plan, and requires assistance in completing the objective. In some cases, one or more hints can be sequentially provided, where each hint is progressively more specific and/or detailed than the last. This can be useful, for example, as it can first provide a user with a small amount of guidance such that the user can still substantially complete the objective on his own. However, if the user continues to have difficulty with the objective, more and more help can be provided until the user is able to successfully complete the objective. These hints can be defined, for example, by the developer of the educational plan (e.g., an instructor or a lesson plan author).

Although the interfaces 2500 and 2550 are shown with simplified input options, any of the code input implementations described herein can be used as well. For example, the interfaces 2500 and 2550 can include some or all of the functionality described herein, including a keypad or rotary element for inputting information, a universal content bar for viewing and selecting suggested sequences of software code, and/or a virtual keyboard for entering primary and alternate characters. As another example, the interfaces 2500 and 2550 can allow a user to modify sequences of software code using the touch-based inputs described herein.

In some cases, a code portion can present several sequences of software code to the user, but only allow the user to revise particular portions of the code. This can be useful, for example, to focus the user on a specific portion of the code that is relevant to the lesson, and to prevent the user from modifying other portions of the code in an unintended manner. These limits can be defined, for example, by the developer of the educational plan (e.g., an instructor or a lesson plan author).

Figure 26:
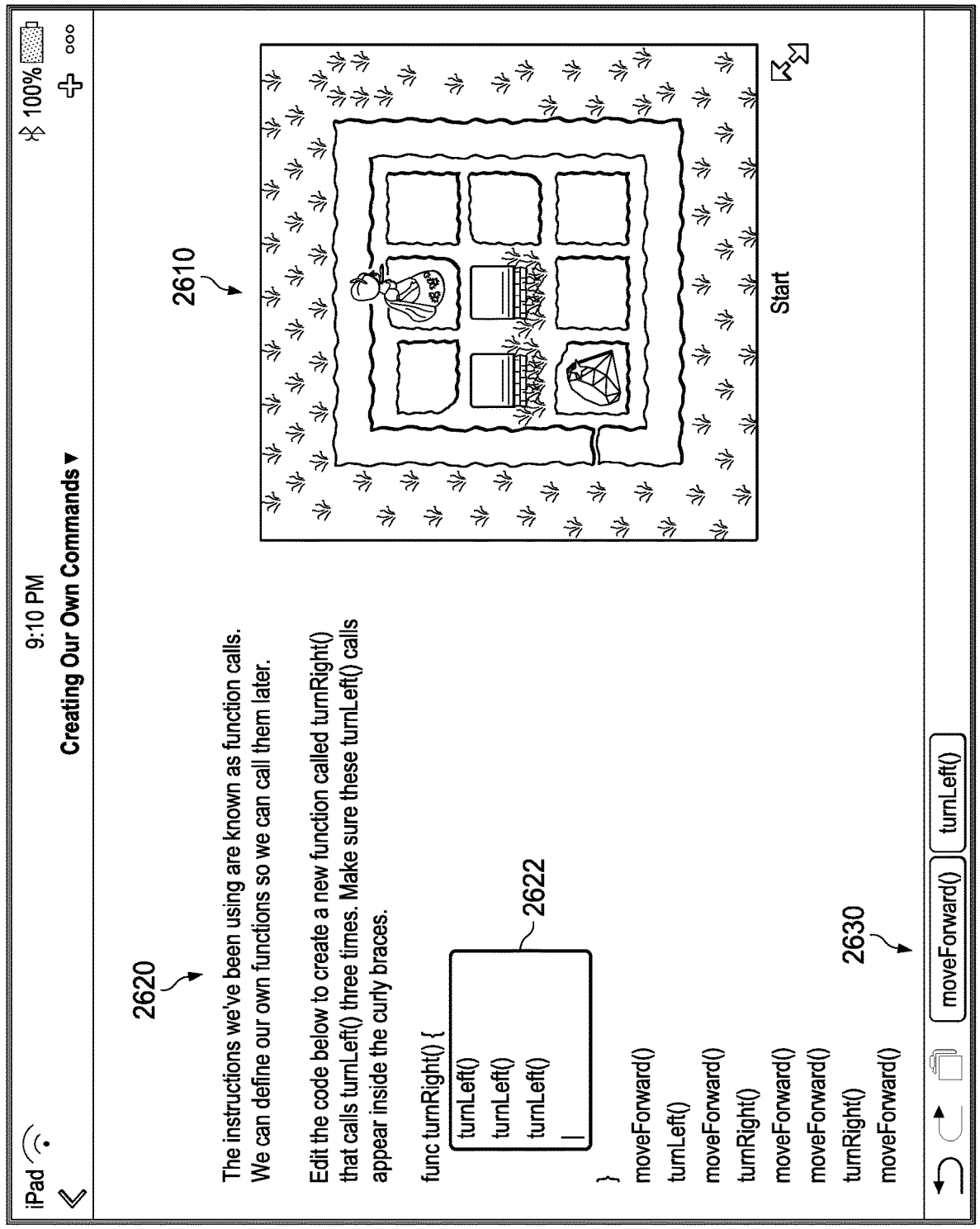
FIG. 26 illustrates another user interface for a touch-based, interactive learning environment for software programming.

As an example, FIG. 26 shows another user interface 2600 that presents instructions guiding a user through a software programming lesson in the context of an interactive game. The user interface 2600 is generally similar to that shown in FIG. 25B. For example, the user interface 2600 includes a game portion 2610, a code portion 2620, and a suggestion portion 2630. In a similar manner as described above, a user can input sequences of software code into the code portion 2620 to interact with the game portion 2610 and complete the objective.

In this example, however, the code portion 2620 includes a boundary element 2622 positioned within the sequences of software code. The boundary element 2622 indicates a portion of the software code than can be revised by the user. In this example, the boundary element 2622 surrounds the body of a function "turnRight( )" indicating that the user can revise the code within this function. The user can select this portion (e.g., by tapping on the boundary element 2622), and in a similar manner as described above, input sequences of software code (e.g., by inputting characters, performing touch-based gestures, selecting input suggestions, so forth), delete the code, or otherwise revise the code contained within the boundary element 2622. However, the user cannot revise the code outside the boundary element 2622. As a result, the user is focused on modifying the body of the function to complete the objective, and cannot modify other portions of the code in an unintended manner. These boundary element 2622 can be positioned, for example, by the developer of the education plan.

In FIG. 26, the boundary element 2622 is depicted as an outline (e.g., a box) surrounding a particular portion of code. In practice, however, the boundary element 2622 can be depicted in other ways. For example, in some cases, the boundary element 2622 can be depicted as a colored, shaded, or patterned shape. As another example, in some cases, the boundary element 2622 can be depicted using a contrasting highlight, a contrasting text color, and/or a contrasting background color.

Although a single boundary element is shown, this is merely an illustrative example. In practice, a code portion can include any number of boundary elements (e.g., zero, one, two, three, four, or more) as defined by the developer of the education plan. Further, in implementations where a code portion contains multiple boundary elements, the boundary elements can be depicted similarly (e.g., using a similar color or pattern), or depicted differently (e.g., using different colors or patterns). Different colors of patterns can be useful, for example, in distinguishing different portions of editable code to a user.

Figure 27:
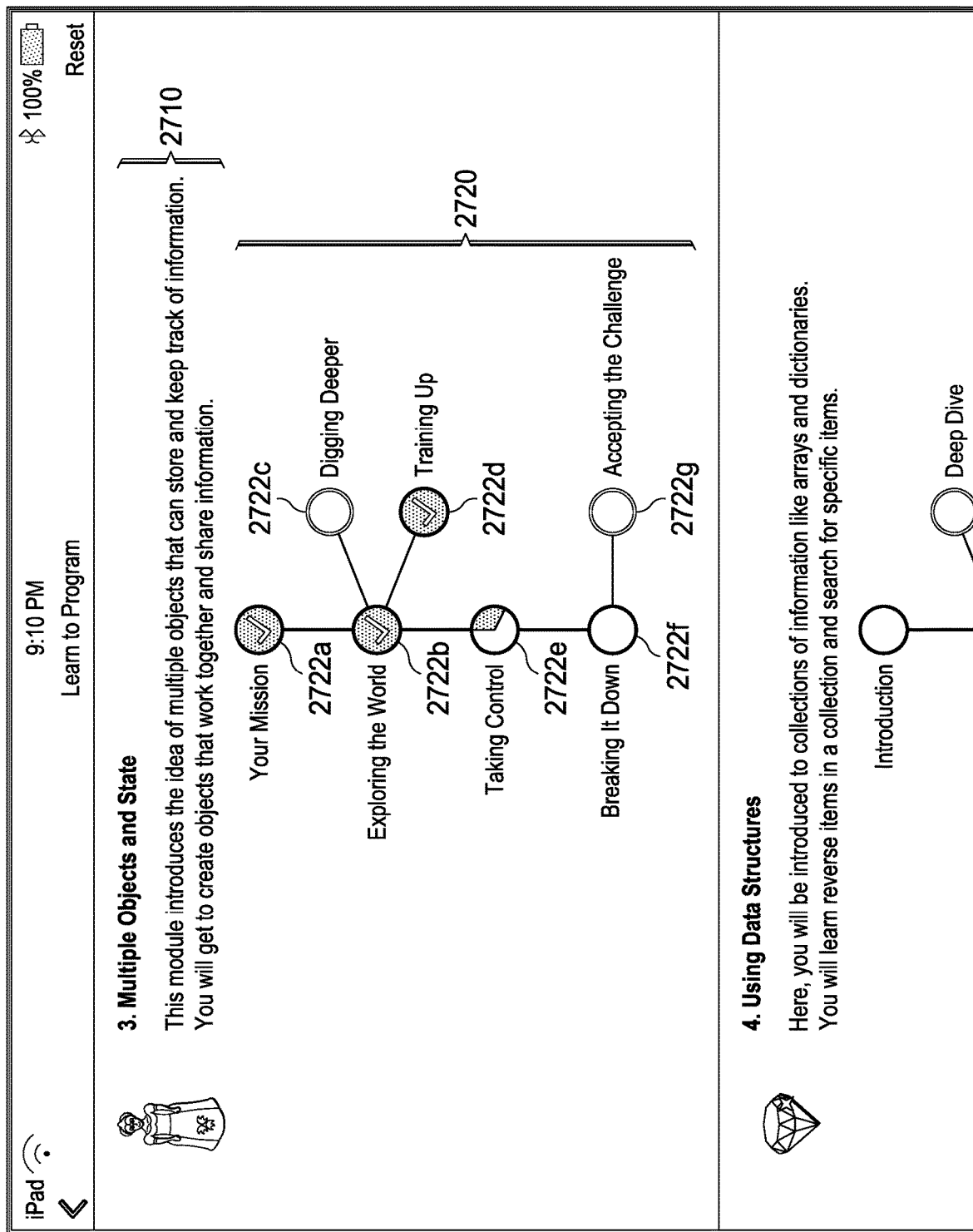
FIG. 27 illustrates a user interface for displaying a user's progress through an education lesson plan.

In some implementations, a user's progress through an education lesson plan can be graphically presented, such that the user can quickly and intuitively track his progress. For example, FIG. 27 shows a user interface 2700 for presenting information regarding a user's progress.

The user interface 2700 includes a section portion 2710 that identifies sections of a lesson plan (e.g., sections of a lesson plan that pertain to particular concepts, analogous to a "chapter" in a textbook). As shown in FIG. 27, the section portion 2710 can include, for example, a title of the section, and a brief description that section.

The user interface 2700 includes a progress indicator portion 2720 that identifies individual lessons within a section, and the user's progress in each of these lessons. In the example shown in FIG. 27, the progress indicator portion 2720 includes several node elements 2722*a-g*, each corresponding to a particular lesson within the section. The node elements 2722*a-g* visually indicate a user's progress in that lesson. For example, when a user is not yet eligible to participate in a lesson, the node element can be depicted as a thin unfilled circle (e.g., node element 2722g). When a user is eligible to participate in a lesson, but has not yet begun, the node element can be depicted as a thick unfilled circle (e.g., node element 2722f). When a user has begun a lesson, the node element can be depicted as a partially filled circle (e.g., node element 2722e). When a use has completed the lesson, the node element can be depicted as a fully filled circle, or as a fully filled circle with a symbol signifying completion overlaid on top (e.g., a check mark, as with node element 2722a).

In some cases, when a user has begun a lesson, the node element can be depicted as a partially filled circle, where the fraction of the circle that is filled corresponds to portion of the lesson completed by the user. For example, when the user has completed 10% of the lesson, the node element can be 10% filled (e.g., 10%, represented in the form of a pie chart). When the user completes more of the lesson, such as 70%, the node element is updated such that 70% is filled (e.g., 70%, represented in the form of a pie chart).

Further, each node is connected using connective elements (e.g., lines). These connective elements illustrate the relationship between the elements, and indicate the order in which a user can participate in the lessons. In some cases, when a user has completed a lesson associated with a node, he can be eligible to begin any of the lessons associated with interconnected nodes. For example, when the user has completed a lesson associated with the node 2722b, he can be eligible to begin the lessons associated with the nodes 2722c, 2722d, and 2722e. In some cases, when a user has merely begun a lesson associated with a node, he can be eligible to begin any of the lessons associated with interconnected nodes. For example, when the user has begun the lesson associated with the node 2722b, he can be eligible to begin the lessons associated with the nodes 2722c, 2722d, and 2722e.

Although a single section portion and progress portion and described, this is merely an illustrative example. In practice, any number of section portions and progress portions can be used, depending in the implementation.

As described herein (e.g., with respect to FIGS. 25A-B and 26), a game environment can include one or more game elements (e.g., one or more player game elements, non-player game elements or "objective" elements, obstacles, switch elements, lock elements, key elements, companion character elements, and/or other game elements). Each of these elements can be arranged in a grid (e.g., as shown in FIGS. 25A-B and 26). In some cases, the size of the grid, the number of game elements, and/or the position of some or all of the game elements can be randomized. This can be beneficial, for example, as it discourages users from simply memorizing a solution to a lesson (as the solution to the lesson may differ which each instance), and instead encourages users to practice the underlying concepts taught by the lesson. Further, this can be beneficial, as it allows a user to repeat the lesson multiple times under different conditions (e.g., to practice a particular concept taught by the lesson). Further, this can be beneficial, as it discourages users from exchanging solutions with one another instead of solving the lesson for themselves (as the solution to one user's lesson may differ from the solutions for other user's lessons).

Figure 28:
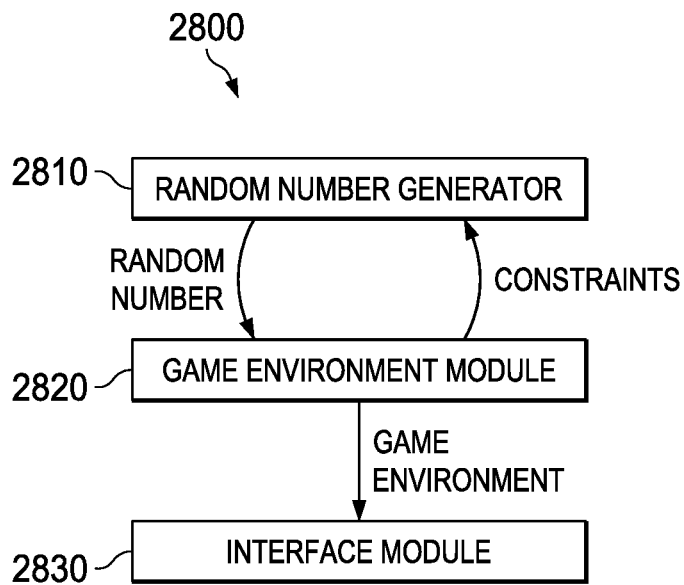
FIG. 28 is a block diagram of an example system for randomizing a lesson.

An example system 2800 for randomizing a lesson is shown in FIG. 28. The system 2800 includes a random number generator 2810, a game module 2820, and an interface module 2830.

The random number generator 2810 is configured to produce one or more random or substantially random numbers. As an example, a random number generator 2810 can include a module or device that measures a physical phenomenon that is expected to be random, then compensates for possible biases in the measurement process. For instance, a random number generator can measure atmospheric noise, thermal noise, and other external electromagnetic and quantum phenomena, then output a random number in accordance with the measurement. As another example, a random number generator 2810 can include a device that uses computation algorithms to produce long sequences of apparently random results (e.g., "pseudorandom" numbers) based on an initial value (e.g., a seed value or key).

The random number generator 2810 outputs one or more random numbers to the game environment module 2820. Based on the random numbers, the game environment module 2820 generates a game environment for use in a lesson. As an example, based on the random numbers, the game environmental module 2820 can determine a size of the game environment itself (e.g., the x-dimension of a grid and a y-dimension of the grid). As another example, based on the random numbers, the game environmental module 2820 can determine how many of each type of game element to include in the game environment, and the position of each game element within that game environment (e.g., a particular indexed space on a grid). As another example, based on the random numbers, the game environmental module 2820 can determine when certain game element are added or removed from the game environment (e.g., after a particular number of seconds have elapsed since the beginning of the game, or during a particular "turn" or "step" in the game).

As an example, a first random number can be used to determine the x-dimension of a grid (e.g., 8), and a second random number can be used to determine the y-dimension of the grid (e.g., 9). Based on these random numbers, the game environment module can generate a game environment having an 8×9 grid. As another example, a third random number can be used to determine the quantity of "objective" elements in the game environment (e.g., 2), and a series of fourth random numbers can be used to determine the location of each "objective" element in the game environment (10 and 20). Based on these random numbers, the game environment module can generate two "objective" elements, and place those objective elements in the $10^{th}$ and $20^{th}$ indexed spaces of the grid. Similarly, additional random elements can be used to determine the quantity and/or locations of each of the other game elements.

In some cases, the random numbers generated by the random number generator 2810 can be constrained based on constraint information provided by the game environment module 2820. This can be useful, for example, as it allows the game environment module 2820 to produce randomized game environments, while also limiting the game environment to particular sizes, compositions, and/or arrangements. For example, the game environment module 2820 can instruct the random number generator 2810 to generate random numbers between 8 and 15 for the x and y-dimensions of a grid. Thus, the grid will have a random size between 8 and 15 each in each of its dimensions. As another example, the game environment module 2820 can instruct the random number generator 2810 to generate a random number between 1 and 5 for the quantity of "objective" elements in the game environment. Thus, the grid will contain between 1 and 5 "objective" elements for the user to collect. As another example, the game environment module 2820 can instruct the random number generator 2810 to generate a random number for each of the "objective" elements, where each random numbers is between 1 and the total number of spaces in the grid. Thus, given these constraints, the random number generator 2810 might randomly generate numbers 10 and 15 (resulting in a 10×15 grid), randomly generate a number 2 (resulting in two "objective" elements), and randomly generate numbers 39 and 62 (resulting in the "objective" elements being placed in the 39$^{th}$ and 62$^{nd}$ spaces of the grid).

Although example constraints are described above, these are merely illustrative examples. In practice, the game environment module 2820 can provide any number of different constraints to the random number generator, with respect to any characteristic to be randomized with respect to the game environment. In some cases, these constraints can be defined by the author of the lesson plan, an instructor, and/or a user to customize a lesson as desired.

In some cases, some or all of the characteristics of a game environment can be randomized, and the remaining characteristics (if any) can be pre-defined by the author of the lesson plan, an instructor, and/or a user to customize a lesson as desired. In some cases, none of characteristics are randomized, and the game environment can be entirely pre-defined (e.g., the game environment can be entirely "constructed" by the author of the lesson plan, an instructor, or the user).

In some cases, the game environment module 2820 can maintain a history of the generated game environments, and re-generate a game environment if it is identical or sufficiently similar to already generated game environments. This can be useful, for example, as it provides the user with new challenges that he has not seen before.

In some cases, the game environment module 2820 can generate game environments based on input provided by the user. For example, a particular game environment may require one or more companion characters to complete the objectives of the lesson. Accordingly, the user can instruct the game environment module 2820 to insert one or more companion characters into the game environment, such that he can access them during the game. As another example, a particular game environment may require one or more switch elements to complete the objectives of the lesson. Accordingly, the user can instruct the game environment module 2820 to insert one or more switch elements into particular positions within the game environment, such that he can utilize them during the game. This can be beneficial, for example, as it tests the user's understanding of particular types of game elements, and tests the user's ability to apply that understanding in solving a problem.

After the game environment module 2820 generates the game environment, the game environment module 2820 transmits information regarding the generated game environment to the interface module 2830. Based on this information, the interface module 2830 presents the game environment to the user, and monitors the user's interactions with respect to the game environment (e.g., monitoring for commands or other inputs from the user). Based on a user's interactions, the interface module 2830 modifies the game environment to reflect the user's inputs and commands with respect to the lesson. As an example, the interface module 2830 can present the user interfaces 2500, 2550, and/or 2600 shown in FIGS. 25A-B, and 26, respectively to a user, monitor the user's interactions with respect to the controls displayed in each user interface, and modify the game environment to reflect the commands selected by the user.

Example Processes

Figure 18:
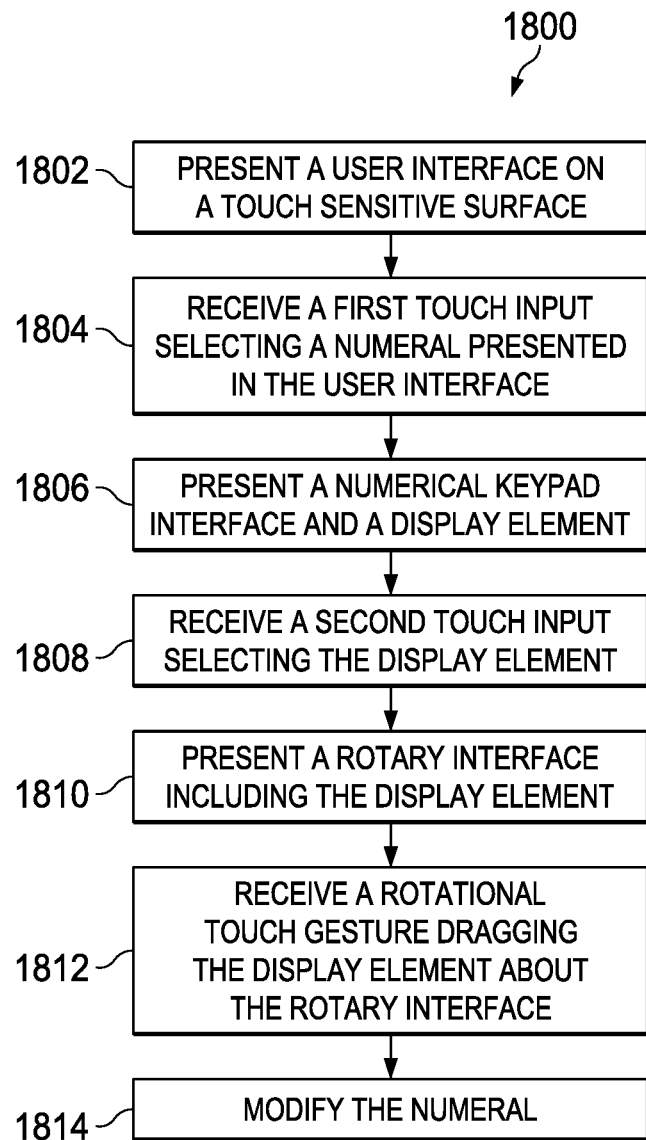
FIG. 18 is a flow diagram of an example process for adjusting a numerical value on a user interface.

FIG. 18 is a flow diagram of an example process 1800 for adjusting a numerical value on a user interface. In some implementations, the process 1800 can be implemented using, for example, the device architecture 2200 shown in FIG. 22.

The process 1800 begins by presenting, by an electronic device, a user interface on a touch sensitive surface of the electronic device (step 1802). The text editing interface can be similar to the user interface 200 described above. For example, in some implementations, a text editing interface can include a menu bar, a code editing area, a short form results area, a live view area, and a universal content bar that allow a user to directly touch and/or perform touch-based gestures with respect to the user interface in an intuitive manner. In some cases, a user can touch a user interface 106a-c and/or perform touch-based gestures using one or more fingers, styluses, or combinations thereof.

The electronic device receives a first touch input selecting a numeral presented in the user interface (step 1804). As described above, in some cases, this can be performed by a user pressing and holding a portion of the touch sensitive surface corresponding to the numeral.

Responsive to receiving the first touch input, the electronic device presents a numeric keypad interface and a display element (step 1806). As described above, in some cases, the electronic device can present a numeral selection element including a keypad and control element, as described with respect to FIGS. 2A-E and FIGS. 4A-B).

The electronic device receives a second touch input selecting the display element (step 1808). As described above, in some cases, the user can select the display element by touching and holding a portion of the touch sensitive surface corresponding to the control element of the numeral selection element, as described with respect to FIGS. 2A-E and FIGS. 4A-B.

Responsive to receiving the second touch input, the electronic device presents a rotary interface including the display element (step 1810). As described above, in some cases, the electronic device can display a rotary element that includes the control element positioned on a circle, as described with respect to FIGS. 2A-E and FIGS. 4A-B. In some cases, the electronic device can hide the keypad interface, such that the keypad interface is replaced by the rotary interface.

While the user is maintaining physical contact with the touch sensitive surface, the electronic device receives a rotational touch gesture dragging the display element about the rotary interface (step 1812). As described, in some cases, the user can perform the rotational touch gesture by dragging the control element around the circle of the rotary element, as described with respect to FIGS. 2A-E and FIGS. 4A-B.

Responsive to receiving the rotational touch gesture, the electronic device modifies the numeral (step 1814). As described above, this can be performed by determining the angular distance that a control element has been dragged around a circle of the rotary element with respect to an origin, and modifying the numeral based on the angular distance. In some cases, when the control element is dragged in a first direction around the circle (e.g., clockwise), the electronic device can increase the numeral. In some cases, when the control element is dragged a second distance around the circle (e.g., counter-clockwise), the electronic device can decrease the numeral. In some cases, the rotary interface can include multiple concentric circles, and the control element can be dragged about each of the circles to modify different place values of the numeral. In some cases, the numeral can represent an angular value, and the position of the control element on the circle can correspond to the angular value.

Figure 19:
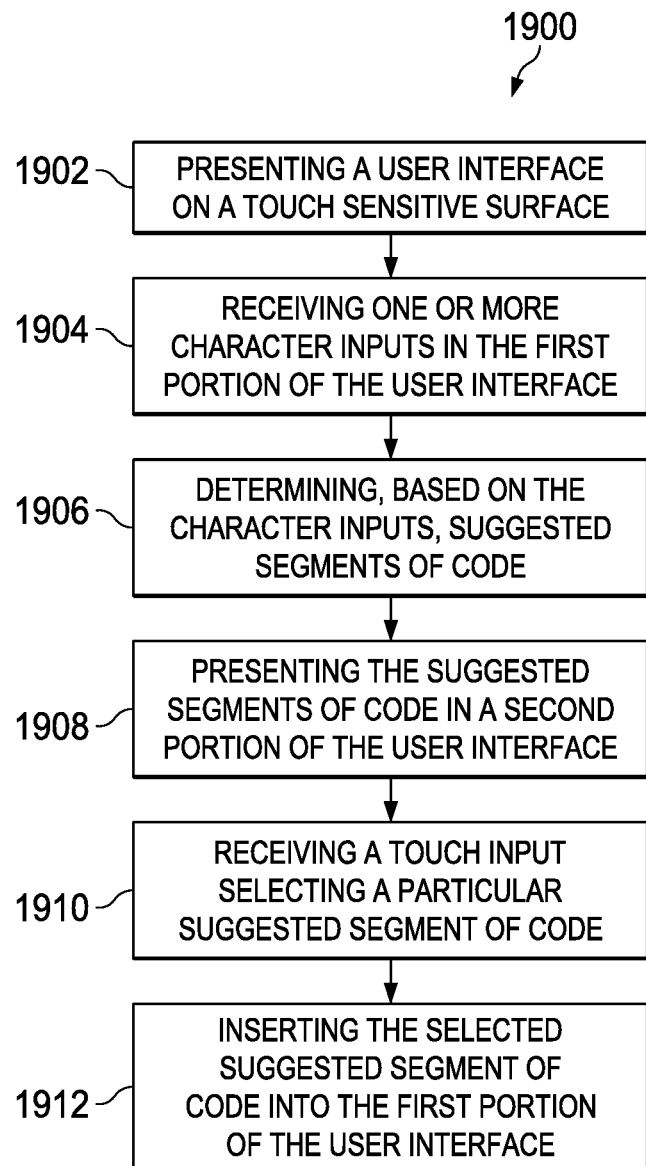
FIG. 19 is a flow diagram of an example process for presenting and inserting suggested segments of code using a user interface.

FIG. 19 is a flow diagram of an example process 1900 for presenting and inserting suggested segments of code using a touch-sensitive user interface. In some implementations, the process 1900 can be performed using the architecture 2200, as described reference to FIG. 22).

The process 1900 begins by presenting, by an electronic device, a user interface on a touch sensitive surface of the electronic device (step 1902). The user interface can have a first portion for displaying a sequence of code, and a second portion for displaying suggested segments of code. For example, in some implementations, a user interface can include a code editing area and a live view area that allow a user to directly touch and/or perform touch-based gestures to edit software code in the code editing area in an intuitive manner and see the results of the executing code in real-time in the live view area. In some cases, a user can touch a user interface 106a-c and/or perform touch-based gestures to edit code using one or more fingers, styluses, or combinations thereof.

The electronic device receives one or more character inputs in the first portion of the user interface (step 1904). As described above, in some cases, this can be performed by a user entering character inputs using a physical or virtual keyboard. As also described above, in some cases, this can also be performed by a user inputting, inserting, and/or relocating characters or sequences of characters (e.g., names of functions, variables, parameters, or other programming constructs) through one or more touch-based gestures.

The electronic device determines, based on the one or more character inputs, one or more suggested segments of code (step 1906). As described above, in some cases, the electronic device can determine suggested segments of code based, at least in part, on a user's inputs (e.g., characters or keystroke that were previously entered by the user) and the already-entered software code (e.g., the software code surrounding an insertion cursor in the code editing area). In some cases, the electronic device can determine suggested sequences of code according to a list of suggestions that were created by an instructor. For example, an instructor can design a lesson plan involving a particular set of functions, and the electronic device can suggest those particular functions to the user.

The electronic device presents the one or more suggested segments of code in the second portion of the user interface (step 1908). As described above, in the some cases, the electronic device can present suggested segments of code in a universal content bar, such that the user can view each of the suggested segments of code in an organized manner. In some cases, the suggested segments of code can be truncated (e.g., by removing one or more characters from the second of code), and the truncated code can be presented to the user. This can be useful, for example, as it allows the user to view suggested segments of code that might otherwise be too lengthy to fit on the user interface in their entirety.

The electronic device receives, from the user, a touch input selecting a particular suggested segment of code (step 1910). As described above, in some cases, a user can tap a portion of the touch sensitive surface corresponding to a suggested segment of code, as described with respect to FIGS. 5B-G. As also described above, in some cases, a user can touch and hold a portion of the touch sensitive surface corresponding to a suggested segment of code, and drag the segment of code onto a code editing area, as described with respect to FIG. 5A).

The electronic device inserts the selected suggested segment of code into the first portion of the user interface area. As described above, in some cases, the selected suggested segment of code can be inserted into a sequence of code displayed in the code editing area. In some cases, the electronic device can suggest additional segments of code based on the selected suggested segment of code, such the user can continue to view, and if desired, insert additional segments of code into the code editing area.

FIG. 20 is a flow diagram of an example process 2000 for presenting and inserting suggested bracketed functions using a user interface. In some implementations, the process 2000 can be performed by the device architecture 2200, as described in reference to FIG. 22.).

The process 2000 begins by presenting, by an electronic device, a user interface on a touch sensitive surface of the electronic device (step 2002). The user interface can have a first portion for displaying a sequence of code, and a second portion for displaying suggested bracketed functions. For example, in some implementations, a user interface can include a code editing area and a live view area that allow a user to directly touch and/or perform touch-based gestures in the code editing area in an intuitive manner and to review the results in real-time in the live view area. In some cases, a user can touch a user interface 106a-c and/or perform touch-based gestures using one or more fingers, styluses, or combinations thereof.

The electronic device receives a first touch gesture dragging a suggested bracketed function from the second portion to the first portion of the user interface (step 1904). As described above, in some cases, a user can touch and hold a portion of the touch sensitive surface corresponding to a suggested bracketed function, and drag the bracketed function onto a code editing area (e.g., as described with respect to FIG. 10A).

Responsive to receiving the first touch gesture, the electronic device inserts the suggested bracketed function into the sequence of code, where the bracketed function encloses at least a portion of the sequence of code (step 1906). As described above, in some cases, when a user releases his touch above a particular line of code, the electronic device can insert the bracketed function such that that particular line of code is enclosed by the bracketed function (e.g., as described with respect to FIGS. 10B-C). In some cases, the user can perform a multi-touch gesture (e.g., a pinching or reverse pinching gesture to control the lines of text that are enclosed by the bracketed function).

The electronic device receives a second touch gesture dragging an end bracket associated with the inserted bracketed function (step 1908), and in response, modifies the sequence of code such that the bracketed function encloses an additional portion of the sequence of code (step 1910). As described above, in some cases, the user can press and hold a portion of the touch sensitive surface corresponding to the end bracket, and drag the end bracket such that additional lines of code are enclosed between the end bracket and a beginning bracket, as described with respect to FIGS. 10A-B.

FIG. 21 is a flow diagram of an example process 2100 for presenting and selecting characters or other inputs using a virtual keyboard. In some implementations, the process 2100 can be performed by the device architecture 2200, as described in reference to FIG. 22.

The process 2100 begins by presenting, by an electronic device, a keyboard image on a touch sensitive surface of the electronic device (step 2102). As described above, the keyboard image can be presented as a part of a "virtual keyboard" that allows a user to enter characters and non-character commands using touch-inputs on the touch sensitive surface. In some cases, a user can touch a user interface 106a-c and/or perform touch-based gestures using one or more fingers, styluses, or combinations thereof.

The electronic device receives a first touch selecting a key of the keyboard image (step 2104). As described above, in some cases, a user can touch and hold a portion of the touch sensitive surface corresponding to the key (e.g., as described with respect to FIG. 11A).

Responsive to receiving the first touch gesture, the electronic device displays a primary character associated with the selected key (step 2106). As described above, in some cases, the electronic device can display the primary character above the selected key.

While the user is maintaining physical contact with the touch sensitive surface, the electronic device receives a touch gesture starting at the key of the keyboard image and continuing in a diagonal direction along a face of the key (step 2108).

Responsive to receiving the touch gesture, the electronic device displays an alternative character associated with the selected key (step 2110). As described above, in some cases, the user can perform a downward-left swipe gesture along a face of the key, and in response, the electronic device can display a first alternative character. In some cases, the user can perform a downward-right swipe gesture along a face of the key, and in response, the electronic device can display a second alternative character. In some cases, the user can perform an upward-left swipe gesture or an upward-right swipe gesture along the face of the key, and in response, the electronic device can display other alternative characters. As described above, in some cases, the electronic device can display the alternative character above the selected key. In some cases, the electronic device can replace a text label of the selected key with the alternative character, or highlight the alternative character on the selected key.

Figure 29:
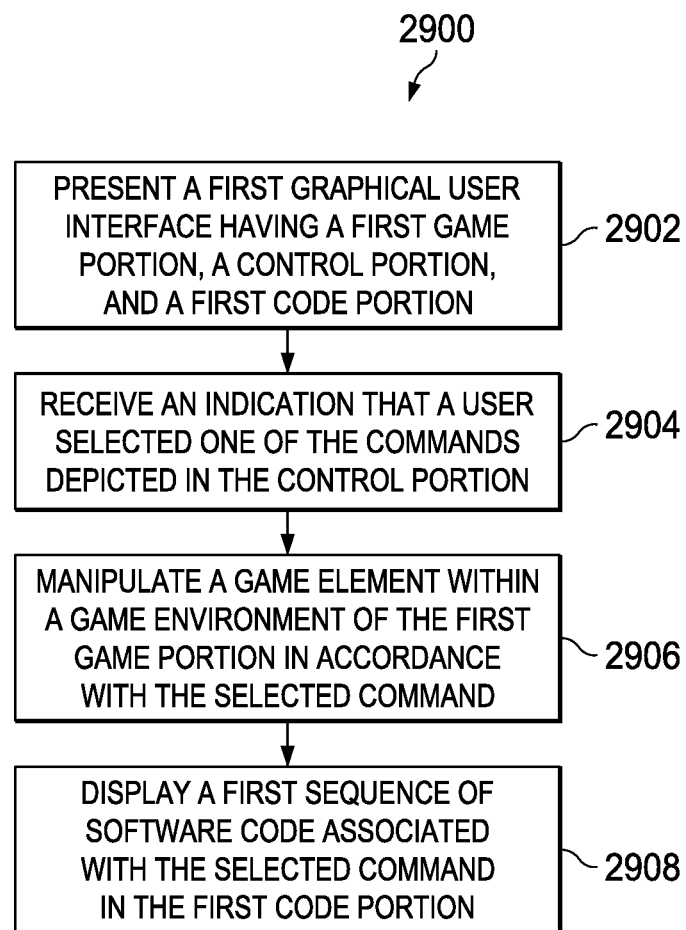
FIG. 29 is a flow diagram of an example process for providing an electronic interactive learning environment.

FIG. 29 is a flow diagram of an example process 2900 for providing an electronic interactive learning environment. In some implementations, the process 2900 can be performed by the device architecture 2200, as described in reference to FIG. 22.

The process 2900 begins by presenting, on a display device of a computer system, a first graphical user interface (GUI) to a user (step 2902). As described above, the first GUI can be associated with an education lesson plan. The first GUI can include a first game portion visually depicting a first game element and one or more second game elements disposed within a game environment, a control portion visually depicting one or more commands for manipulating the game element within the game environment, and a first code portion. At least one of a position of the first game element, a position of each of the one more second game elements, and a number of second game elements can be randomized in accordance with a random number generator. The first game element can be, for example, a player controlled character (e.g., a player game element). The second game elements can be, for example, objectives for the player controlled character (e.g., "objective" elements), obstacles for the player controlled character, companion characters for the player controlled character, switch elements, lock elements, and/or key elements. As an example, the first GUI can be similar to the user interface described with respect to FIG. 25A.

The computer system receives an indication that the user selected one of the commands depicted in the control portion (step 2904). As described above, in some cases, computer system can input a touch sensitive surface and allows the user to make a selection by performing touch-based gestures using one or more fingers, styluses, or combinations thereof. As described above, in some case, the command can be a command to manipulate the game element within the game environment. For example, the command can be a command to reorient the game element, change a position of the game element, rotate the game element, and/or otherwise manipulate the game element within the game environment.

In response to receiving the indication, the computer system manipulates the game element within the game environment in accordance with the selected command (step 2804). For example, the computer system can update the first game portion to depict the game element being manipulated in the manner specified by the user.

The computer system also displays a first sequence of software code associated with the selected command in the first code portion (step 2906). As described above, first GUI can be associated with an education lesson plan having a one or more suggested sequences of software code; the first sequence of software code can be selected from among these suggested sequences of software code. These suggested sequences of code can be specified by a developer of the education lesson plan. For example, a developer of an education lesson plan may specify that each of the commands depicted in the control portion are associated with a respective sequence of software code. These sequences of software code can be, for example, sequences of code that can be directly executed in a programming environment, or simplified representations of sequences of software code (e.g., "pseudo-code"). Accordingly, when the user selects one of the commands depicted in the control portion, the respective sequence of software code is displayed in the first code portion.

In some cases, the computer system can also present a second GUI to the user. The second GUI can include a second game portion visually depicting the game element disposed within the game environment, a second code portion displaying one or more sequences of software code, and a suggestion portion visually displaying one or more suggested sequences of software code. The game element and the environment can be the same as those depicted in the first GUI. As examples, the first GUI can be similar to the user interfaces described with respect to FIGS. 2A-E, 25B, and/or 26.

In some cases, at least some of the suggested sequences of software code are associated with the one or more commands depicted in the control portion of the first GUI. For example, a developer of an education lesson plan may specify that each of the commands depicted in the control portion of the first GUI are associated with a respective sequence of software code. One or more of these same suggestions can be displayed in the suggestion portion on the second GUI.

In some cases, the computer system can execute the one or more sequences software code displayed in the second code portion. As described above, in some cases, executing the one more sequences of software code displayed by the second code portion manipulates the game element within the game environment. For example, as described above, the sequences of software code can be commands to reorient the game element, change a position of the game element, rotate the game element, and/or otherwise manipulate the game element within the game environment.

In some cases, the computer system can allow the user to edit the contents of the second code portion. For example, the user can insert, revise, and/or delete sequences of software code contained within the second code portion (e.g., by inputting characters, performing touch-based gestures, selecting input suggestions, so forth).

In some cases, the second code portion can present several sequences of software code to the user, but only allow the user to revise particular portions of the code. For example, as described above with respect to FIG. 26, the second GUI further can include a boundary element positioned within the second code portion. In some cases, portions of the one or more sequences of software code contained within the boundary element can be edited by the user, while portions of the one or more sequences of software code outside of the boundary element cannot be edited by the user.

In some cases, the second GUI can present one or more hints to the user for interacting with the second GUI. For example, the second GUI can present a hint that identifies one or more suggested sequences of software code to the user, or a hint that describes an effect of one or more suggested sequences of software code to the user.

In some cases, the computer system can also present a third GUI for presenting information regarding a user's progress through the lesson plan. As described above, the third GUI can include one or more node elements, and one or more connective elements connecting the node elements. Each of the node elements can be associated with a lesson plan presented by the first GUI and the second GUI. In some cases, at least two of the node elements are associated with a lesson plan presented by the first GUI and the second GUI, and are arranged according to a sequence defined by the lesson plan As an example, the third GUI can be similar to the user interface described with respect to FIG. 27.

Each node element indicates the user's progress through a respective educational lesson. For example, in some cases, a shaded node element indicates that the user has completed a respective education lesson. As another example, in some cases, a partially shaded node element indicates that the user has partially completed a respective education lesson. In some cases, a proportion of the shaded node element that is shaded can correspond to a proportion of a respective education lesson that has been completed by the user. The note elements can be hierarchically arranged, or arranged according to a particular linear or branching path.

Example Client Device Architecture

Figure 22:
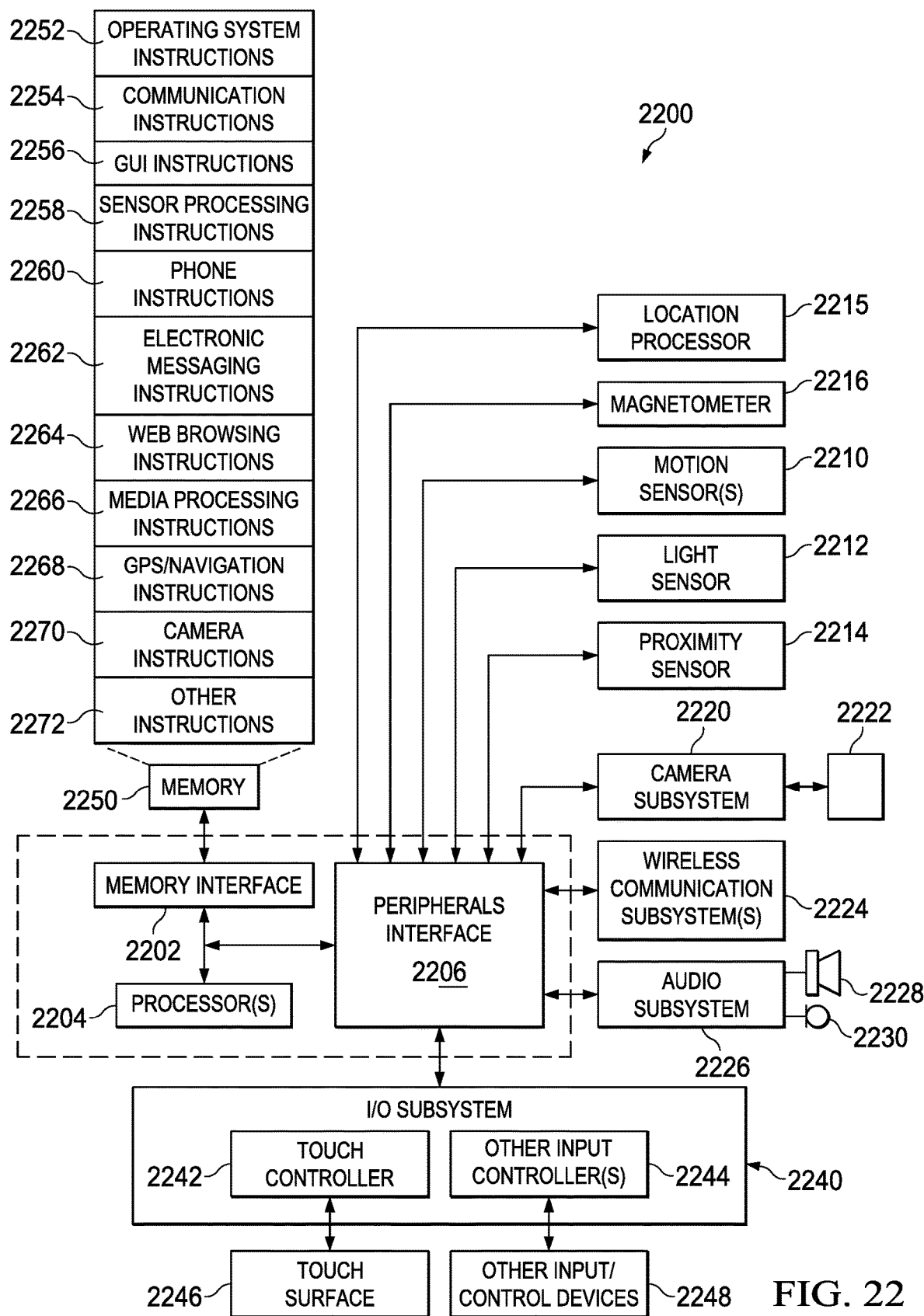
FIG. 22 is a block diagram of an example client device architecture for implementing the features and processes described in reference to FIGS. 1-21 and 24-29.

FIG. 22 is a block diagram of an example client device architecture 2200 for implementing the features and processes described in reference to FIGS. 1-21 and 24-29. Architecture 2200 may be implemented in any mobile device for generating the features described in reference to FIGS. 1-21 and 24-29, including but not limited to portable computers, smart phones, tablet computers, game consoles, wearable computers and the like. Architecture 2200 may include memory interface 2202, data processor(s), image processor(s) or central processing unit(s) 2204, and peripherals interface 2206. Memory interface 2202, processor(s) 2204 or peripherals interface 2206 may be separate components or may be integrated in one or more integrated circuits. One or more communication buses or signal lines may couple the various components.

Sensors, devices, and subsystems may be coupled to peripherals interface 2206 to facilitate multiple functionalities. For example, motion sensor 2210, light sensor 2212, and proximity sensor 2214 may be coupled to peripherals interface 2206 to facilitate orientation, lighting, and proximity functions of the device. For example, in some implementations, light sensor 2212 may be utilized to facilitate adjusting the brightness of touch surface 546. In some implementations, motion sensor 2210 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 2206, such as a temperature sensor, a biometric sensor, or other sensing device, to facilitate related functionalities.

Location processor 2215 (e.g., GNSS receiver chip) may be connected to peripherals interface 2206 to provide geo-referencing. Electronic magnetometer 2216 (e.g., an integrated circuit chip) may also be connected to peripherals interface 2206 to provide data that may be used to determine the direction of magnetic North. Thus, electronic magnetometer 2216 may be used as an electronic compass.

Camera subsystem 2220 and an optical sensor 2222, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 2224. Communication subsystem(s) 2224 may include one or more wireless communication subsystems. Wireless communication subsystems 2224 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 2224 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 2224 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 2226 may be coupled to a speaker 2228 and one or more microphones 2230 to facilitate voice-enabled functions, such as voice recognition, voice replication, digital recording, and telephony functions.

I/O subsystem 2240 may include touch controller 2242 and/or other input controller(s) 2244. Touch controller 2242 may be coupled to a touch surface 2246. Touch surface 2246 and touch controller 2242 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 2246 may display virtual or soft buttons and a virtual keyboard, which may be used as an input/output device by the user.

Other input controller(s) 2244 may be coupled to other input/control devices 2248, such as one or more buttons, rocker switches, thumb-wheel, infrared port, USB port, and/or a pointer device such as a stylus. The one or more buttons (not shown) may include an up/down button for volume control of speaker 2228 and/or microphone 2230.

In some implementations, device 2200 may present recorded audio and/or video files, such as MP3, AAC, and MPEG video files. In some implementations, device 2200 may include the functionality of an MP3 player and may include a pin connector for tethering to other devices. Other input/output and control devices may be used.

Memory interface 2202 may be coupled to memory 2250. Memory 2250 may include high-speed random access memory or non-volatile memory, such as one or more magnetic disk storage devices, one or more optical storage devices, or flash memory (e.g., NAND, NOR). Memory 2250 may store operating system 2252, such as Darwin, RTXC, LINUX, UNIX, OS X, WINDOWS, or an embedded operating system such as VxWorks. Operating system 2252 may include instructions for handling basic system services and for performing hardware dependent tasks. In some implementations, operating system 2252 may include a kernel (e.g., UNIX kernel).

Memory 2250 may also store communication instructions 2254 to facilitate communicating with one or more additional devices, one or more computers or servers, including peer-to-peer communications. Communication instructions 2254 may also be used to select an operational mode or communication medium for use by the device, based on a geographic location (obtained by the GPS/Navigation instructions 2268) of the device. Memory 2250 may include graphical user interface instructions 2256 to facilitate graphic user interface processing, including a touch model for interpreting touch inputs and gestures; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes; camera instructions 2270 to facilitate camera-related processes and functions; and other instructions 2272 for performing some or all of the processes, as described in reference to FIGS. 1-21 and 24-29.

Each of the above identified instructions and applications may correspond to a set of instructions for performing one or more functions described above. These instructions need not be implemented as separate software programs, procedures, or modules. Memory 2250 may include additional instructions or fewer instructions. Furthermore, various functions of the device may be implemented in hardware and/or in software, including in one or more signal processing and/or application specific integrated circuits (ASICs).

Example Network Server Architecture

Figure 23:
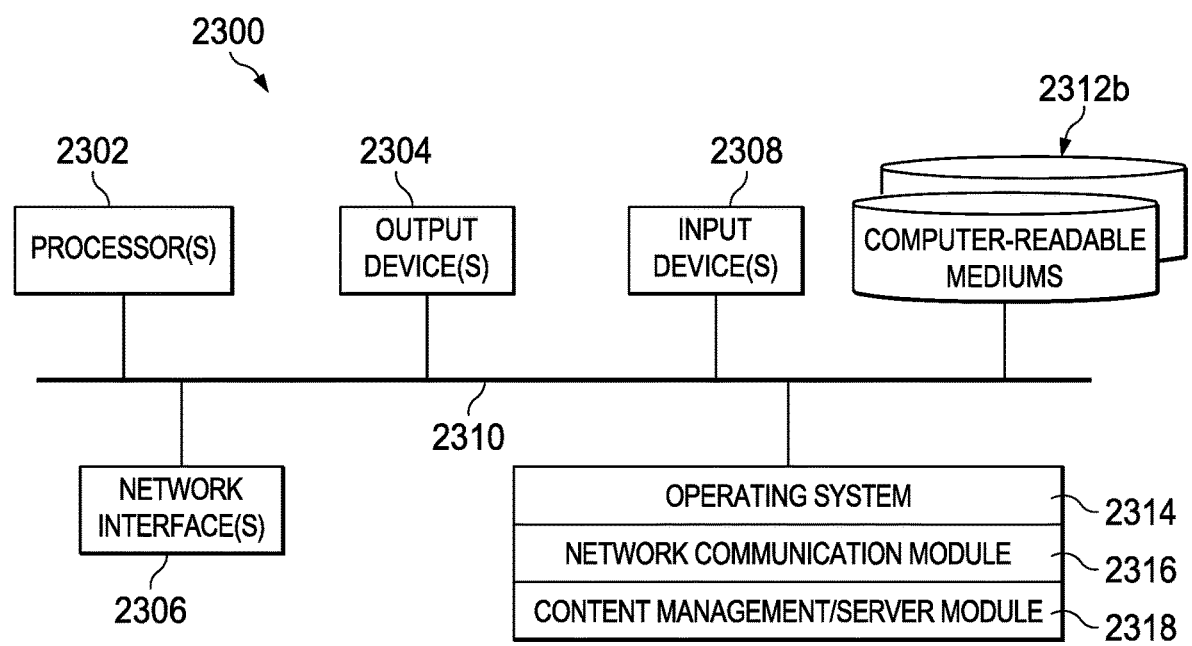
FIG. 23 is a block diagram of an example network server architecture for implementing the features and processes described in reference to FIGS. 1-21 and 24-29.

FIG. 23 is a block diagram of an example network server architecture 2300 for implementing the features and processes described in reference to FIGS. 1-21 and 24-29. Other architectures are possible, including architectures with more or fewer components. In some implementations, architecture 2300 includes one or more processors 2302 (e.g., dual-core Intel® Xeon® Processors), one or more output devices 2304 (e.g., LCD), one or more network interfaces 2306, one or more input devices 2308 (e.g., mouse, keyboard, touch-sensitive display) and one or more non-transitory computer-readable mediums 2312b and memory 2312a (e.g., RAM, ROM, SDRAM, hard disk, optical disk, flash memory, etc.). These components can exchange communications and data over one or more communication channels 2310 (e.g., buses), which can utilize various hardware and software for facilitating the transfer of data and control signals between components.

The term "non-transitory computer-readable medium" refers to any medium that participates in providing instructions to processor 2302 for execution, including without limitation, non-volatile media (e.g., optical or magnetic disks) and volatile media (e.g., memory).

Computer-readable mediums 2312b or memory 2312a can further include operating system 2314 (e.g., Mac OS® server, Windows® NT server), network communication module 2316 and content management/server module 618. Operating system 2314 can be multi-user, multiprocessing, multitasking, multithreading, real time, etc. Operating system 2314 performs basic tasks, including but not limited to: recognizing input from input devices 2308 and providing output to output devices 2304; keeping track and managing files and directories on storage devices 2312b and memory 2312a; controlling peripheral devices; and managing traffic on the one or more communication channels 2310. Network communications module 2316 includes various components for establishing and maintaining network connections (e.g., software for implementing communication protocols, such as TCP/IP, HTTP, etc.). Content management/server module 2318 manages content stored in computer-readable mediums 2312b and downloads content to requesting client devices, such as client devices 104a-c described in reference to FIG. 1. In some implementations, content management/server 2318 is a Web server or online digital media store.

Architecture 2300 can be included in any computer device, including one or more server computers each having one or more processing cores. Architecture 2300 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
presenting, by a device, a keyboard image on a touch sensitive surface of the device; receiving, by the device, a first touch input selecting a key of the keyboard image; responsive to receiving the first touch input, displaying a primary character associate with the selected key;
while maintenance of physical contact is detected by the touch sensitive surface, receiving, by the device, a touch gesture starting at a center of a face of the key of the keyboard image and continuing in a direction along the face of the key and away from the face of the key in a direction; and
responsive to receiving the touch gesture, displaying a representation of an alternative character associated with the selected key, the representation of the alternative character displayed to simulate moving the representation of the alternative character towards the center of the face of the key in the direction.

2. The method of claim 1, further comprising:
subsequent to receiving the touch gesture, receiving, by the device, an indication that physical contact with the touch sensitive surface has been released; and
responsive to receiving the indication, inserting the alternative character into a text input area.

3. The method of claim 1, wherein the face of the key comprises: an indication of the primary character; and
an indication of the alternative character.

4. The method of claim 3, wherein the indication of the alternative character is diagonally above the indication of the primary character.

5. The method of claim 3, wherein the indication of the alternative character is diagonally below the indication of the primary character.

6. The method of claim 3, wherein the touch gesture continues towards the indication of the alternative character on the face of the key.

7. The method of claim 3, wherein the touch gesture continues away from the indication of the alternative character on the face of the key.

8. The method of claim 1, further comprising:
while maintenance of physical contact is detected by the touch sensitive surface, receiving, by the device, a second touch gesture starting at the face of the key of the keyboard image and continuing in a second diagonal direction along the face of the key; and
responsive to receiving the second touch gesture, displaying a second alternative character associated with the selected key.

9. The method of claim 8, further comprising:
subsequent to receiving the second touch gesture, receiving, by the device, an indication that physical contact with the touch sensitive surface has been released; and
responsive to receiving the indication, inserting the second alternative character into a text input area.

10. A system comprising:
a touch sensitive surface;
one or more processors;
a non-transitory computer-readable medium including one or more sequences of instructions which, when executed by the one or more processors, causes:
presenting, by the system, a keyboard image on the touch sensitive surface;
receiving, by the system, a first touch input selecting a key of the keyboard image; responsive to receiving the first touch input, displaying a primary character associated with the selected key;
while maintenance of physical contact is detected by the touch sensitive surface, receiving, by the system, a touch gesture starting at a center of a face of the key of the keyboard image and continuing in a direction along the face of the key and away from the face of the key in a direction; and
responsive to receiving the touch gesture, displaying a representation of an alternative character associated with the selected key, the representation of the alternative character displayed to simulate moving the representation of the alternative character towards the center of the face of the key in the direction.

11. The system of claim 10, wherein the one or more sequences of instructions, when executed by the one or more processors, further causes:
subsequent to receiving the touch gesture, receiving, by the system, an indication that physical contact with the touch sensitive surface has been released; and
responsive to receiving the indication, inserting the alternative character into a text input area.

12. The system of claim 10, wherein the face of the key comprises:
an indication of the primary character; and
an indication of the alternative character.

13. The system of claim 12, wherein the indication of the alternative character is diagonally above the indication of the primary character.

14. The system of claim 12, wherein the indication of the alternative character is diagonally below the indication of the primary character.

15. The system of claim 12, wherein the touch gesture continues towards the indication of the alternative character on the face of the key.

16. The system of claim 12, wherein the touch gesture continues away from the indication of the alternative character on the face of the key.

17. The system of claim 10, wherein the one or more sequences of instructions, when executed by the one or more processors, further causes:
while maintenance of physical contact is detected by the touch sensitive surface, receiving, by the system, a second touch gesture starting at the face of the key of the keyboard image and continuing in a second diagonal direction along the face of the key; and
responsive to receiving the second touch gesture, displaying a second alternative character associated with the selected key.

18. The system of claim 17, wherein the one or more sequences of instructions, when executed by the one or more processors, further causes:
subsequent to receiving the second touch gesture, receiving, by the system, an indication that physical contact with the touch sensitive surface has been released; and
responsive to receiving the indication, inserting the second alternative character into a text input area.

19. A non-transitory machine-readable medium storing instructions to cause one or more processors to perform operations comprising:
presenting, by a device, a keyboard image on a touch sensitive surface of the device; receiving, by the device, a first touch input selecting a key of the keyboard image; responsive to receiving the first touch input, displaying a primary character associated with the selected key;

while maintenance of physical contact is detected by the touch sensitive surface, receiving, by the device, a touch gesture starting at a center of a face of the key of the keyboard image and continuing in a direction along the face of the key and away from the face of the key in a direction; and responsive to receiving the touch gesture, displaying a representation of an alternative character associated with the selected key, the representation of the alternative character displayed to simulate moving the representation of the alternative character towards the center of the face of the key in the direction.

20. The non-transitory machine-readable medium of claim 19, the operations further comprising:

subsequent to receiving the touch gesture, receiving, by the device, an indication that physical contact with the touch sensitive surface has been released;

responsive to receiving the indication, inserting the alternative character into a text input area;

wherein the face of the key comprises an indication of the primary character and an indication of the alternative character, wherein the alternative character is diagonally above or diagonally below the indication of the primary character; and wherein the touch gesture continues towards or away from the indication of the alternative character on the face of the key.

\* \* \* \* \*